US011388479B2

(12) United States Patent
Choi et al.

(10) Patent No.: US 11,388,479 B2
(45) Date of Patent: *Jul. 12, 2022

(54) DISPLAY APPARATUS FOR PROCESSING MULTIPLE APPLICATIONS AND METHOD FOR CONTROLLING THE SAME

(71) Applicant: LG ELECTRONICS INC., Seoul (KR)

(72) Inventors: Gowoon Choi, Seoul (KR); Jihe Suk, Seoul (KR); Changkyoon Kim, Seoul (KR); Ryoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/664,018

(22) Filed: Oct. 25, 2019

(65) Prior Publication Data

US 2020/0059695 A1 Feb. 20, 2020

Related U.S. Application Data

(63) Continuation of application No. 16/120,811, filed on Sep. 4, 2018, now Pat. No. 10,484,744, which is a
(Continued)

(30) Foreign Application Priority Data

May 26, 2011 (KR) .................. 10-2011-0049995
May 27, 2011 (KR) .................. 10-2011-0050631

(51) Int. Cl.
*H04N 7/173* (2011.01)
*H04N 21/478* (2011.01)
(Continued)

(52) U.S. Cl.
CPC ....... *H04N 21/478* (2013.01); *H04N 21/4316* (2013.01); *H04N 21/482* (2013.01); *H04N 21/4821* (2013.01); *H04N 21/8173* (2013.01)

(58) Field of Classification Search
CPC ............ H04N 21/478; H04N 21/4821; H04N 21/482; H04N 21/4316; H04N 21/8173
(Continued)

(56) References Cited

U.S. PATENT DOCUMENTS 6,141,003 A 10/2000 Chor et al.
6,182,287 B1 * 1/2001 Schneidewend ... H04N 21/4755
725/48
(Continued)

FOREIGN PATENT DOCUMENTS

CN 1281616 A 1/2001
CN 1581949 A 2/2005
(Continued)

OTHER PUBLICATIONS

IMDb. ER: Techincal Specifications. Web. Retrieved Apr. 8, 2016. <http://www.imdb.com/title/tt0108757/technical?ref_=tt_dt_spec>.
(Continued)

*Primary Examiner* — Michael B. Pierorazio
(74) *Attorney, Agent, or Firm* — Fish & Richardson P.C.

(57) ABSTRACT

A television having an Internet browsing function including a network interface configured to access a webpage on the Internet; a display module; a memory configured to store a URL of the accessed webpage; a user interface configured to receive a command signal from a remote controller; and a controller configured to control the display module to display a broadcast program in a first area, in which the broadcast program is received via the network interface, an external device interface or a tuner, control the display module to display a thumbnail list in a second area while displaying the broadcast program in the first area, wherein the thumbnail list includes a captured image of the accessed webpage, and the second area is within the first area, and control the display module to display a webpage correspond-
(Continued)

ing to the accessed webpage based on the URL stored in the memory in response to a command signal for selecting the captured image of the accessed webpage.

21 Claims, 49 Drawing Sheets

Related U.S. Application Data continuation of application No. 15/692,283, filed on Aug. 31, 2017, now Pat. No. 10,085,065, which is a continuation of application No. 14/663,259, filed on Mar. 19, 2015, now Pat. No. 9,762,969, which is a continuation of application No. 13/288,522, filed on Nov. 3, 2011, now Pat. No. 9,015,758.

(51) Int. Cl.
  *H04N 21/431* (2011.01)
  *H04N 21/482* (2011.01)
  *H04N 21/81* (2011.01)

(58) Field of Classification Search
  USPC .......................................................... 725/41
  See application file for complete search history.

(56) References Cited

U.S. PATENT DOCUMENTS

| | | | | |
|---|---|---|---|---|
| 6,239,794 | B1* | 5/2001 | Yuen | H04N 5/44543 348/565 |
| 6,564,378 | B1* | 5/2003 | Satterfield | H04N 5/44543 725/40 |
| 6,742,184 | B1* | 5/2004 | Finseth | H04N 5/44543 348/E5.105 |
| 6,904,408 | B1* | 6/2005 | McCarthy | A61B 5/6815 705/2 |
| 6,943,845 | B2* | 9/2005 | Mizutome | H04N 5/4401 348/555 |
| 6,978,472 | B1* | 12/2005 | Nashida | H04N 5/4403 348/734 |
| 7,100,123 | B1* | 8/2006 | Todd | G06F 16/30 715/862 |
| 7,552,458 | B1* | 6/2009 | Finseth | G06Q 30/0225 705/14.26 |
| 7,693,912 | B2 | 4/2010 | Rose et al. | |
| 7,797,635 | B1* | 9/2010 | Denise | G06F 16/9038 715/738 |
| 8,103,969 | B2 | 1/2012 | Gupta et al. | |
| 8,122,479 | B2* | 2/2012 | Britt | H04N 7/1675 725/93 |
| 8,321,401 | B2* | 11/2012 | Edwards | G06F 16/78 707/709 |
| 8,560,967 | B2* | 10/2013 | Heo | G06F 16/9535 715/838 |
| 8,966,525 | B2* | 2/2015 | Mehta | G06Q 30/0251 725/34 |
| 9,363,470 | B2* | 6/2016 | Jeong | H04N 21/426 |
| 9,584,844 | B2* | 2/2017 | Onno | H04N 21/2668 |
| 2002/0035727 | A1* | 3/2002 | Numata | H04N 21/4821 725/44 |
| 2002/0083451 | A1* | 6/2002 | Gill | H04N 21/8586 725/46 |
| 2003/0018971 | A1 | 1/2003 | McKenna, Jr. | |
| 2005/0235319 | A1* | 10/2005 | Carpenter | H04N 21/4314 725/52 |
| 2006/0022955 | A1* | 2/2006 | Kennedy | G06F 3/0416 345/173 |
| 2006/0103751 | A1* | 5/2006 | Lee | H04N 5/23293 348/333.02 |
| 2006/0277481 | A1* | 12/2006 | Forstall | G06F 16/957 715/764 |
| 2007/0101297 | A1* | 5/2007 | Forstall | G06F 3/0482 715/841 |
| 2007/0118813 | A1* | 5/2007 | Forstall | G06F 3/0488 715/805 |
| 2007/0157220 | A1* | 7/2007 | Cordray | H04N 21/43615 725/9 |
| 2007/0157247 | A1* | 7/2007 | Cordray | H04N 21/443 725/47 |
| 2007/0157248 | A1* | 7/2007 | Ellis | H04N 5/445 725/47 |
| 2007/0244894 | A1* | 10/2007 | St. Jacques | H04L 67/104 |
| 2008/0022310 | A1* | 1/2008 | Poling | H04N 21/4532 725/46 |
| 2008/0163119 | A1* | 7/2008 | Kim | G11B 19/025 715/840 |
| 2008/0276280 | A1* | 11/2008 | Nashida | H04N 21/4312 725/48 |
| 2009/0070820 | A1* | 3/2009 | Li | H04N 1/00209 725/62 |
| 2009/0083824 | A1* | 3/2009 | McCarthy | H04N 5/44591 725/151 |
| 2009/0113472 | A1* | 4/2009 | Sheth | G06F 16/958 725/34 |
| 2009/0199133 | A1 | 8/2009 | Deutsch et al. | |
| 2009/0217332 | A1* | 8/2009 | Hindle | H04N 5/781 725/109 |
| 2009/0260034 | A1* | 10/2009 | Friedlander | H04N 21/42204 725/44 |
| 2009/0290519 | A1* | 11/2009 | Griffin, Jr. | H04M 1/72527 370/310 |
| 2010/0153885 | A1* | 6/2010 | Yates | H04N 5/44543 715/841 |
| 2010/0186025 | A1* | 7/2010 | Thomas | H04L 67/06 725/5 |
| 2010/0262931 | A1* | 10/2010 | Woods | G06T 19/00 715/773 |
| 2010/0269134 | A1* | 10/2010 | Storan | H04N 21/4532 725/34 |
| 2011/0010699 | A1* | 1/2011 | Cooper | G06F 8/71 717/169 |
| 2011/0069940 | A1* | 3/2011 | Shimy | H04N 21/44218 386/296 |
| 2011/0078741 | A1* | 3/2011 | Elshocht | H04N 5/445 725/50 |
| 2011/0119611 | A1 | 5/2011 | Ahn et al. | |
| 2011/0119712 | A1 | 5/2011 | Choi et al. | |
| 2011/0247036 | A1* | 10/2011 | Adimatyam | H04N 5/44543 725/40 |
| 2011/0271304 | A1* | 11/2011 | Loretan | H04N 21/4438 725/41 |
| 2012/0019400 | A1* | 1/2012 | Patel | H04N 5/4403 340/870.15 |
| 2012/0139945 | A1* | 6/2012 | Choi | H04N 5/44543 345/660 |
| 2012/0266188 | A1* | 10/2012 | Ryu | H04N 21/42204 725/25 |
| 2012/0278831 | A1* | 11/2012 | van Coppenolle | H04L 65/4084 725/25 |
| 2013/0205312 | A1* | 8/2013 | Huang | H04N 21/4383 725/11 |
| 2014/0123191 | A1* | 5/2014 | Hahn | H04N 21/482 725/41 |

FOREIGN PATENT DOCUMENTS

| | | |
|---|---|---|
| CN | 101352035 A | 1/2009 |
| CN | 101902588 A | 12/2010 |
| CN | 101902601 A | 12/2010 |
| EP | 1168204 | 1/2002 |
| EP | 2257049 | 12/2010 |
| JP | 2000-305696 A | 11/2000 |
| JP | 2007286449 | 11/2007 |
| KR | 10-2005-0015038 A | 2/2005 |
| KR | 10-0511358 B1 | 8/2005 |
| KR | 10-0864412 B1 | 10/2008 |

(56) References Cited

FOREIGN PATENT DOCUMENTS

| KR | 10-2009-0105748 A | 10/2009 |
|----|----|----|
| KR | 10-2010-0056935 A | 5/2010 |
| KR | 10-2011-0043965 A | 4/2011 |
| KR | 10-2011-0049492 A | 5/2011 |
| KR | 20110049492 | 5/2011 |
| WO | WO 00/01142 A1 | 1/2000 |
| WO | WO 2009/057950 A2 | 5/2009 |
| WO | WO 2010/071269 A1 | 6/2010 |
| WO | WO 2011/059157 A1 | 5/2011 |

OTHER PUBLICATIONS

Extended European Search Report in European Application No. 19211575.6, dated Dec. 17, 2019, 8 pages.
Notice of Allowance in U.S. Appl. No. 16/664,018, dated Feb. 24, 2022, 9 pages.

\* cited by examiner

FIG. 3
| Type \ Order | System Application | Premium Application | Downloaded Application |
|---|---|---|---|
| 1 |  Home | 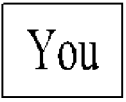 You too |  42 |
| 2 | 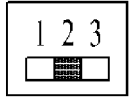 Num + | 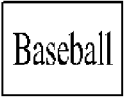 KBO |  Hokey |
| 3 | 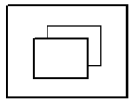 Recent |  MBC |  Acebook |
| 4 | 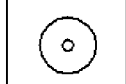 DVR |  Picaca |  Game |
| 5 |  Web Browser | ⋮ | ⋮ |
| ⋮ | ⋮ | ⋮ | ⋮ |

FIG. 18

| Metadata / Application | Title | Type |
|---|---|---|
| App. 1 | Baseball | Sports |
| App. 2 | News Flash | News |
| App. 3 | Poker | Games |
| ⋮ | ⋮ | ⋮ |

| Sports | News | Games |
|---|---|---|
| App 3  App 4<br><br>App 2 | App 10  App 1 | App 7  App 8<br><br>App 9  App 14<br><br>App 21  App 5 |

FIG. 23
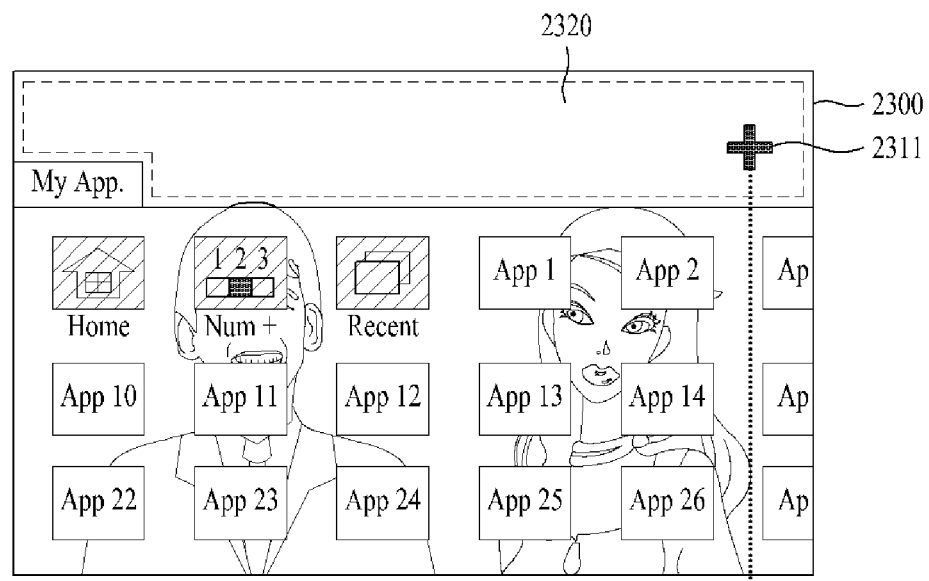
(a)
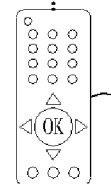
(b)

FIG. 24
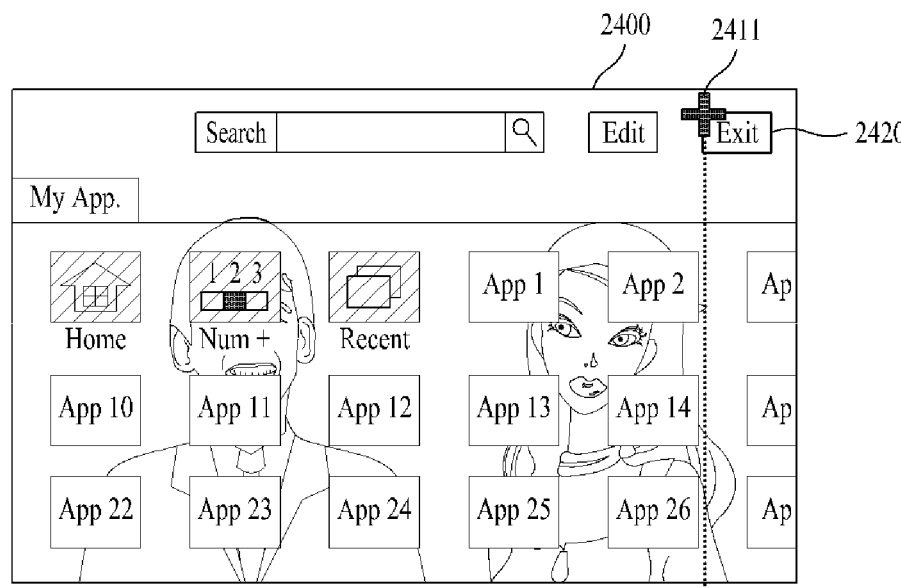
(a)
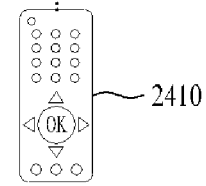
(b)

FIG. 26

| Item | | Extraction Standard | Displayed Information |
|---|---|---|---|
| Channel | | 10seconds or more | ① Thumbnail Image<br>② Channel Number<br>③ Channel Name |
| OTHER | Moving Picture | Execute | ① Thumbnail Image<br>② File Name |
| | Still Image | Execute | ① Image Icon<br>② Thumbnail Image<br>③ File Name |
| | Music | Execute | ① Music Icon<br>② Thumbnail Image<br>③ File Name |
| | Application | Execute | ① Icon<br>② Name |
| | Web | Execute | ① Main screen of last accessed webpage<br>② URL |
| | Setting | Execute | ① Setting Icon<br>② Setting Menu Name |
| | Input | Execute | ① Device Icon<br>② Device Name |

FIG. 27
| Priority Level | Graphic | |
|---|---|---|
| 1 | 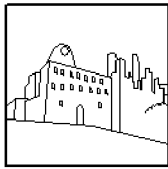 | Thumbnail image (From Capture) |
| 2 |  | Thumbnail image (From CP) |
| 3 | 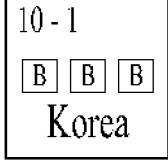 | Channel Logo |
| 4 | 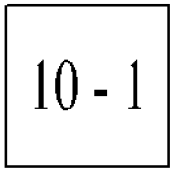 | Channel Number |

FIG. 28
| Recent Access Order \ Memory Address | 1st Address | 2nd Address | |
|---|---|---|---|
| 1 | CH7 (MBS) |  | Acebook |
| 2 | CH5 (KBC) | 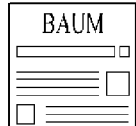 | www.BAUM.com |
| 3 | CH4 (TBS) |  | KIM.JPG |
| 4 | CH11 (ESP) | 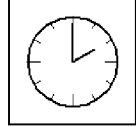 | Scheduled Sleep Mode |
| ⋮ | | | |
| 10 | CH9 (CNB) |  | YS.JPG |

FIG. 29
| Recent Access Order \ Memory Address | 1st Address | 2nd Address |
|---|---|---|
| 1 | CH8 (AAA) | 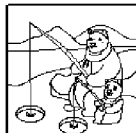 Movie.avi |
| 2 | CH7 (MBS) | 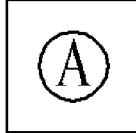 Acebook |
| 3 | CH5 (KBC) |  www.BAUM.com |
| 4 | CH4 (TBS) |  KIM.JPG |
| ⋮ | | |
| 10 | CH12 (BBB) |  USB |

FIG. 31
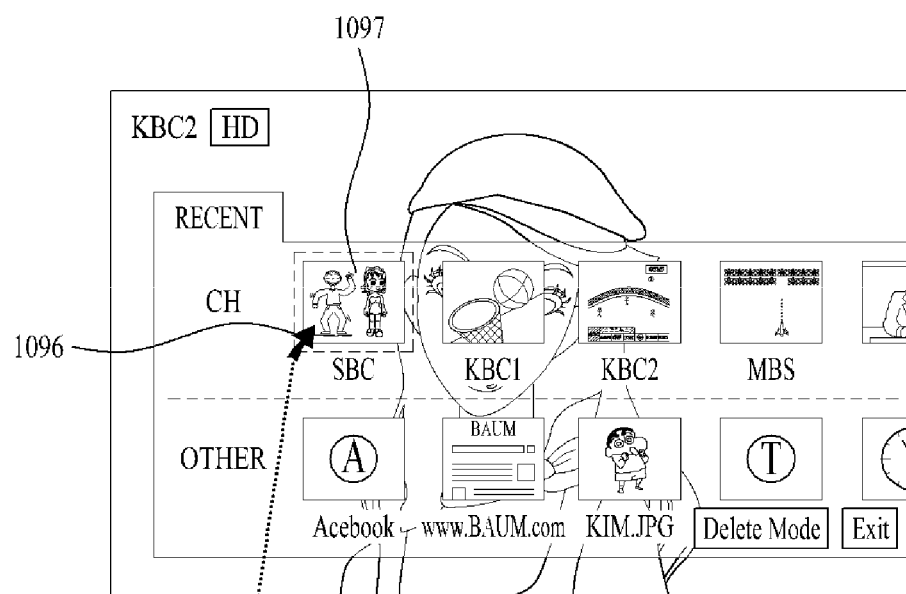
(a)
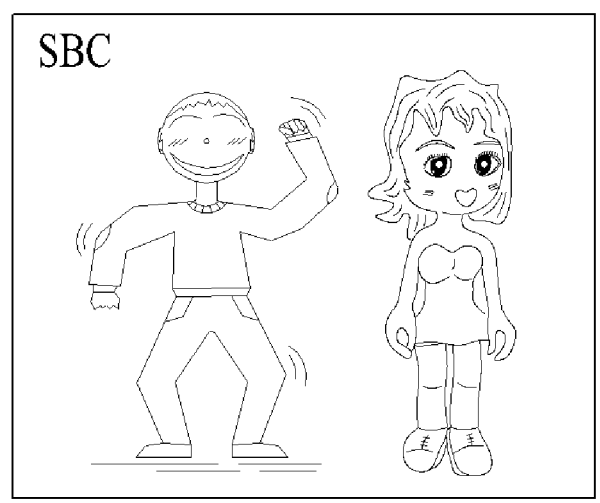
(b)

FIG. 32
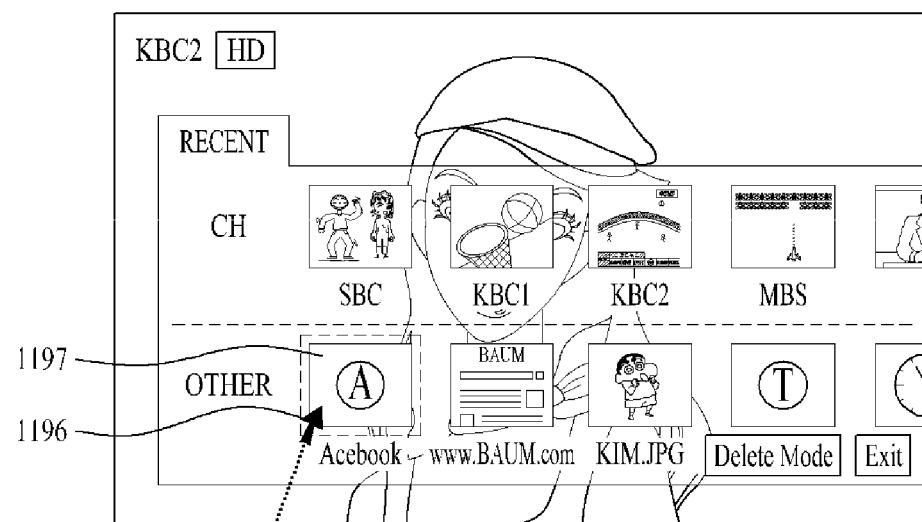
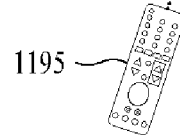
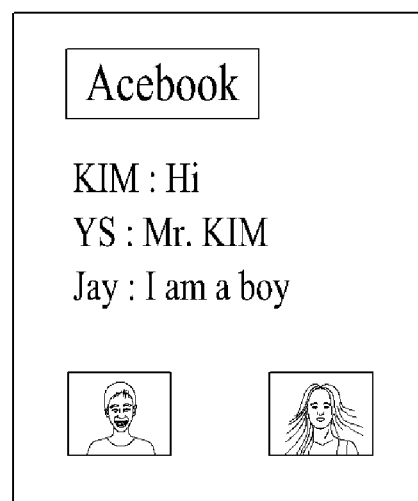

FIG. 33
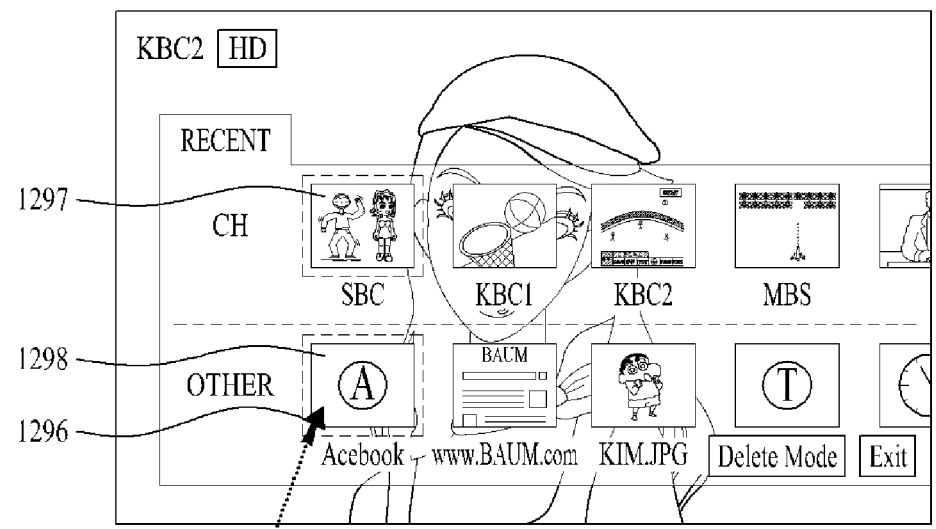
(a)
(Double Mode)
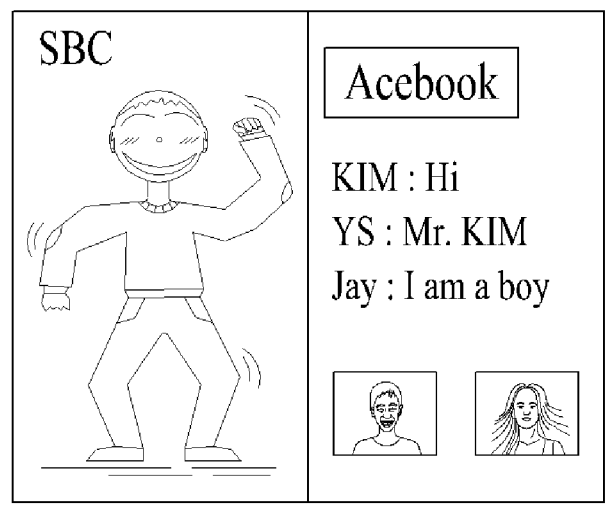
(b)

DISPLAY APPARATUS FOR PROCESSING MULTIPLE APPLICATIONS AND METHOD FOR CONTROLLING THE SAME

CROSS-REFERENCE TO RELATED APPLICATIONS

This Application is a Continuation of U.S. patent application Ser. No. 16/120,811 filed on Sep. 4, 2018, which is a Continuation of U.S. patent application Ser. No. 15/692,283 filed on Aug. 31, 2017 (now U.S. Pat. No. 10,085,065 issued on Sep. 25, 2018), which is a Continuation of U.S. patent application Ser. No. 14/663,259 filed on Mar. 19, 2015 (now U.S. Pat. No. 9,762,969 issued on Sep. 12, 2017), which is a Continuation of U.S. patent application Ser. No. 13/288,522 filed on Nov. 3, 2011 (now U.S. Pat. No. 9,015,758 issued on Apr. 21, 2015), which claims the priority benefit under 35 U.S.C. § 119(a) to Korean Patent Application Nos. 10-2011-0050631 filed in the Republic of Korea on May 27, 2011 and 10-2011-0049995 filed in the Republic of Korea on May 26, 2011, all of which are hereby expressly incorporated by reference into the present application.

BACKGROUND OF THE INVENTION

Field of the Invention

The present invention relates to a display apparatus or a network device, and more particularly, to a display apparatus for processing multiple applications and a method for controlling the same. For example, the display apparatus corresponds to a network TV, a smart TV, a Hybrid Broadcast Broadband Television (HBBTV), an Internet TV, a web TV, an Internet Protocol Television (IPTV), etc. and the network device corresponds to a Set Top Box (STB).

Discussion of the Related Art

A display apparatus can receive and display broadcast images. Currently, analog broadcasting is being switched (or converted) to digital broadcasting. In more detail, digital broadcasting refers to a broadcast service that transmits digital video and audio signals. As compared to analog broadcasting, digital broadcasting undergoes less data loss due to its robustness against external noise. Digital broadcasting is also advantageous for error correction, has high resolution and provides vivid picture screens. Furthermore, unlike analog broadcasting, digital broadcasting can provide two-way (or bi-directional) services. Smart TVs are one example of display apparatus and combine the functions of an image display device and a multimedia device.

However, in the related art display apparatus, there are many difficulties in managing and editing various types of applications. For example, a larger number of applications are expected to be stored in a memory of the display apparatus. Therefore, managing these various applications is time consuming and cumbersome.

SUMMARY OF THE INVENTION

Accordingly, one object of the present invention is to provide a display apparatus and corresponding method to address the above-noted and other problems of the related art.

Another object of the present invention is to provide a display apparatus and corresponding method for efficiently processing multiple applications.

Another object of the present invention is to provide a display apparatus and corresponding method that allows applications stored in the memory of the display apparatus to be quickly managed and easily edited.

Yet another object of the present invention is to provide a display apparatus and corresponding method that includes a user interface that varies depending upon the application type.

Still another object of the present invention is to provide a display apparatus and corresponding method for providing a plurality of application editings guide on screen displays (OSDs) respective to diverse remote controller types.

Another object of the present invention is to provide a display apparatus and corresponding method for easily managing a usage history of contents (e.g., channels, items, etc.) received through at least one or more paths.

Yet another object of the present invention is to provide a display apparatus and corresponding method for storing a plurality of content groups, each corresponding to a different content group type, by using two memory addresses for each content group.

A further object of the present invention is to provide a display apparatus and corresponding method for providing a user interface for accessing a content group recently used by the user more quickly.

To achieve these objects and other advantages and in accordance with the purpose of the invention, as embodied and broadly described herein, the present invention provides in one aspect a method of controlling a display apparatus and which includes receiving contents including audio data and video data; displaying the received contents on a display unit of the display apparatus; receiving a request signal for executing an application browser and displaying a list of applications stored in a memory associated with the display apparatus, the list of applications stored in the memory including an editable application group including at least one application that can be edited and a non-editable application group including at least one application that cannot be edited; generating graphic data representing the applications included in the editable application group and non-editable application group; and displaying the received video data in a first area of the display unit and displaying the generated graphic data representing the applications in a second area within the first area.

In another aspect, the present invention provides a network device including a receiver configured to receive contents including audio data and video data; an interface unit connected to a display apparatus; and a controller configured to display the received contents on a display unit of the display apparatus, to receive a request signal for executing an application browser and displaying a list of applications stored in a memory associated with the display apparatus, the list of applications stored in the memory including an editable application group including at least one application that can be edited and a non-editable application group including at least one application that cannot be edited, to generate graphic data representing the applications included in the editable application group and non-editable application group, and to display the received video data in a first area of the display unit and display the generated graphic data representing the applications in a second area within the first area.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a table stored in a memory including at least one or more applications by different group types according to an embodiment of the present invention;

FIG. 18 is a table illustrating stored metadata of pre-stored applications according to an embodiment of the present invention;

FIGS. 22 to 24 are display screens illustrating returning to a previous screen from the application browser according to an embodiment of the present invention;

FIG. 26 is an overview illustrating a data format for providing a Recent function respective to multiple groups according to an embodiment of the present invention;

FIG. 27 is an overview illustrating another data format for providing a Recent function respective to multiple groups according to an embodiment of the present invention;

FIGS. 28 and 29 are overviews illustrating yet another data format for providing a Recent function respective to multiple groups according to an embodiment of the present invention;

FIG. 31 includes display screens illustrating a first process of executing the Recent function respective to multiple groups according to an embodiment of the present invention;

FIG. 32 includes display screens illustrating a second process of executing the Recent function respective to multiple groups according to an embodiment of the present invention;

FIG. 33 includes display screens illustrating a third process of executing the Recent function respective to multiple groups according to an embodiment of the present invention;

DETAILED DESCRIPTION OF THE INVENTION

The present invention will now be described in more detail with reference to the accompanying drawings.

The display apparatus mentioned in the description of the present invention corresponds to, for example, an intelligent display apparatus that also includes a computer supporting function in addition to the broadcast program receiving function. Accordingly, because the display apparatus is devoted to its broadcast program receiving function and is also supplemented with an Internet browsing function, the display apparatus includes an interface that can be more conveniently used as compared to a hand-writing type input device, a touch screen or a remote controller. Furthermore, the display apparatus may be connected to (or may access) the Internet and a computer using a wired or wireless connection, thereby being able to perform email transmission, web browsing, Internet banking or gaming functions. In order to perform such variety of functions, the display apparatus may adopt a standardized OS.

In addition, because a variety of applications may be easily added to or deleted from the display device within a general purpose OS kernel, the display apparatus described in the description of the present invention can perform a wide range of user-friendly functions.

Figure 1:
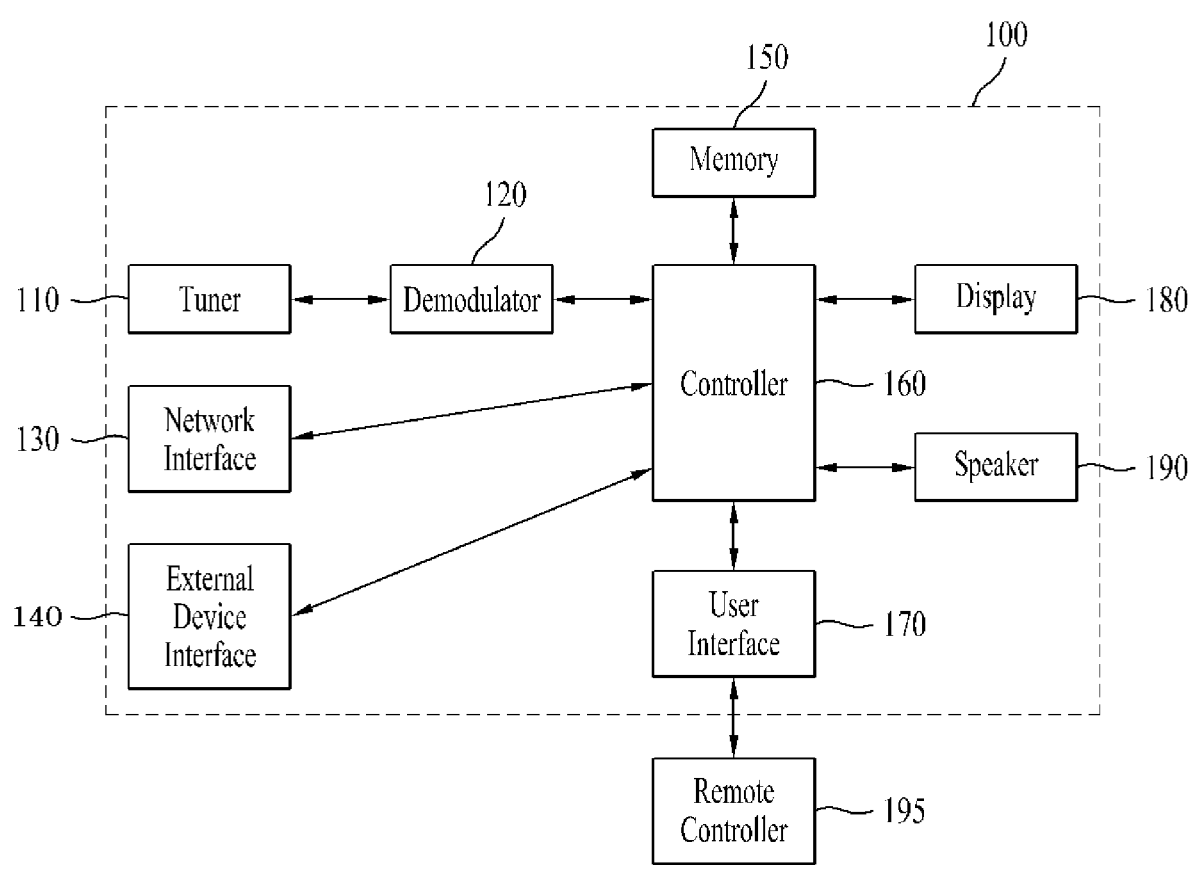
FIG. 1 is a block diagram illustrating a display apparatus according to an embodiment of the present invention.

Next, FIG. 1 is a block diagram illustrating a display apparatus 100 according to an embodiment of the present invention. As shown in FIG. 1, the display apparatus 100 includes a tuner 110, a demodulator 120, a network interface 130, an external device interface 140, a memory 150, a controller 160, a user interface 170, a display module 180, and a speaker 190. However, the modules shown in FIG. 1 are merely exemplary and some of the modules may be added or removed depending upon particular requirements.

In addition, among radio frequency (RF) signals received through an antenna, the tuner 110 selects an RF signal corresponding to a channel selected by the user or an RF signal corresponding to all pre-stored channels. The demodulator 120 then receives a digital IF (DIF) signal converted by the tuner 110 and performs a demodulation operation on the received DIF signal.

After performing channel decoding, the demodulator 120 outputs a transport stream (TS) signal. At this point, the TS signal may correspond to a signal having a video signal, an audio signal, or a data signal multiplexed therein. For example, the stream signal may correspond to an MPEG-2 transport stream (TS) having a video signal of the MPEG-2 standard and an audio signal of the Dolby AC-3 standard multiplexed therein.

The TS signal extracted by the demodulator 120 is then input to the controller 160. Then, after performing demultiplexing and video/audio signal processing, the controller 160 outputs video data to the display module 180 and outputs audio data to the speaker 190.

Further, the external device interface 140 accesses an external device such as a digital versatile disk (DVD) player, a Blu-ray disk (BD) player, a gaming device, a camera, a camcorder, a computer (i.e., desktop or laptop computer), etc., via wired and/or wireless connection. Furthermore, the external device interface 140 receives an application or an application list stored in a neighboring external device. Then, the external device interface 140 delivers the received application or application list to the controller 160 or the memory 150.

For example, in order to access a network via a wired connection, the network interface 130 includes an Ethernet terminal. Also, in order to access a network via a wireless connection, communication standards such as a Wireless LAN (WLAN or Wi-Fi), a Wireless broadband (Wibro), a World Interoperability for Microwave Access (Wimax), a High Speed Downlink Packet Access (HSDPA), may be used. Moreover, among the applications, the network interface 130 selects and receives a wanted application through the network.

The memory 150 can also store a program for performing signal processing and control operations within the controller 160, and store signal processed video, audio, or data signals. Furthermore, the memory 150 stores channel information or applications received from the tuner 110, the network interface 130, and the external device interface 140.

Either the user interface 170 receives a control signal from a remote controller 195, or the user interface 170 may be designed as a local key or keypad attached to the display apparatus 100. The remote controller 195 will be described in more detail later on with reference to FIGS. 8 and 9.

In addition, the controller 160 demultiplexes the data received through the tuner 110, the demodulator 120, the network interface 130, and the external device interface 140, or the controller 160 processes the demultiplexed signals so as to generate and output video and/or audio signals. The controller 160 will be described in more detail with reference to FIG. 2.

Further, the display module 180 respectively converts each of the video signal, data signal, OSD signal, and so on, processed by the controller 160 to R, G, and B signals so as to generate drive signals. For example, the display module 180 may be a PDP, an LCD, an OLED, a flexible display, a 3-dimensional (3D) display, etc. In addition, the speaker 190 corresponds to a module for receiving the audio signals processed by the controller 160, e.g., stereo signals, 3.1 channel signals, or 5.1 channel signals, and outputting the received audio signals.

Figure 2:
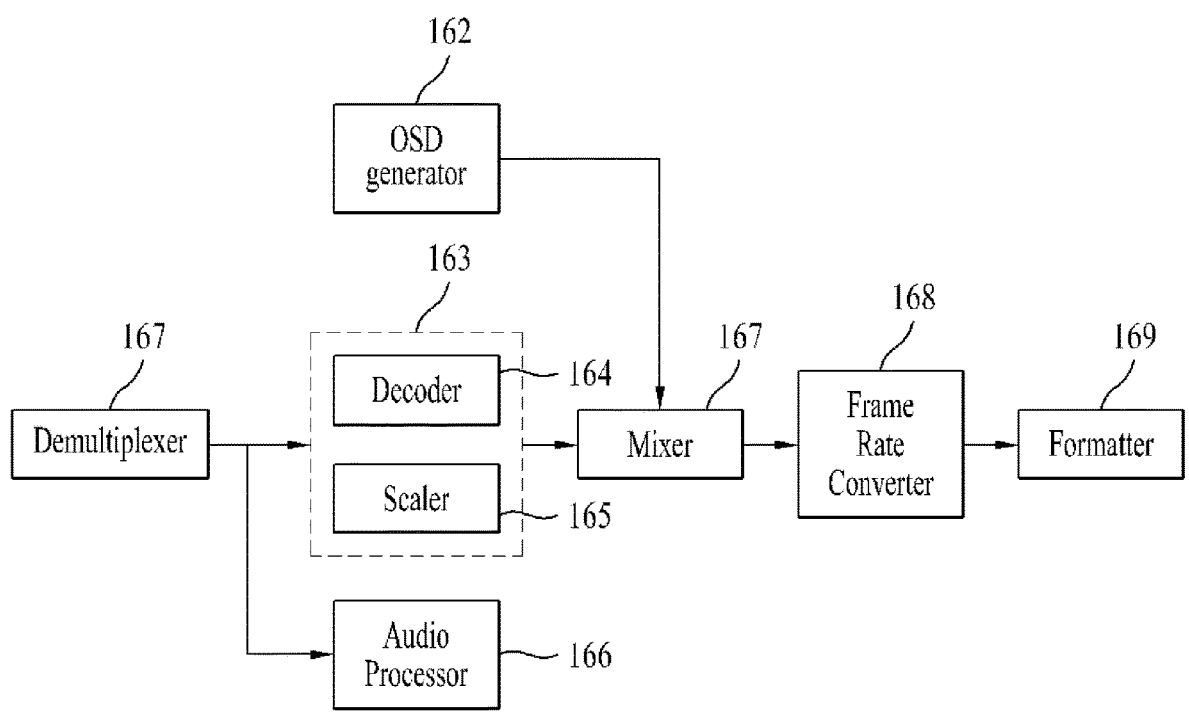
FIG. 2 is a block diagram illustrating a controller shown in FIG. 1.

Next, FIG. 2 is block of the controller 160 shown in FIG. 1. As shown in FIG. 2, the controller 160 includes a demultiplexer 161, an OSD generator 162, a video processing unit 163, an audio processor 166, a mixer 167, a frame rate converter 168, and a formatter 169.

The demultiplexer 161 demultiplexes the input data (e.g., TS), and the video processing unit 163 performs video processing on the demultiplexed video signal. Therefore, the video processing unit 163 further includes a decoder 164 and a scaler 165.

The decoder 164 decodes the demultiplexed video signal, and the scaler 165 performs scaling so that the display module 180 can output a resolution of the decoded video signal. Meanwhile, the audio processor 166 performs signal processing on the demultiplexed audio data so that the processed audio signal can be output through the speaker 190.

In addition, the OSD generator 162 generates an OSD signal in accordance with a user input or by itself. For example, the OSD generator 162 generates a signal for displaying diverse information on a display screen of the display module 180 in the form of graphic or text based upon a control signal received from the user interface or automatically.

The mixer 167 mixes the OSD signal generated by the OSD generator 162 and the video signal decoded by the video processing unit 163. Therefore, the broadcast data and diverse OSD graphics can be displayed simultaneously in an overlaying format.

The frame rate converter (FRC) 168 converts a frame rate of the image that is being input. For example, a frame rate of 60 Hz is converted to a frame rate of 120 Hz or 240 Hz. When the frame rate of 60 Hz is converted to the frame rate of 120 Hz, another identical first frame may be inserted between a first frame and a second frame, or a third frame estimated based upon the first frame and the second frame may be inserted between the first frame and the second frame. When the frame rate of 60 Hz is converted to the frame rate of 240 Hz, three identical frames may be further inserted, or three estimated frames may be inserted. Meanwhile, a frame rate that is input without being separately converted may also be maintained.

In addition, the formatter 169 receives an output signal of the frame rate converter 168 and modifies the received output signal to a format that can be output from the display module. For example, the formatter 169 can output R, G, and B data signals, and such R, G, and B data signals can be output via low voltage differential signaling (LVDS) or mini-LVDS.

A process of the display apparatus for performing an application browser functions will now be described in detail with reference to FIGS. 1 and 2.

According to an embodiment of the present invention, the tuner 110 receives a broadcast program from a broadcasting station. For example, the broadcast program includes audio data and video data. Furthermore, an embodiment of the present invention also includes allowing contents to be received through the network interface 130 and not through the tuner 110.

The demultiplexer 161 demultiplexes the received audio data and video data, and the memory 150 stores an editable first application group and a non-editable second application group. The editable first application group and the non-editable second application group will be described in more detail later with reference to FIG. 3.

In addition, the user interface 170 receives a command requesting a list of multiple applications stored in the memory 150. For example, the command corresponds to a first (or initial) command signal requesting an application browser, and the user interface 170 performs communication with the remote controller 195. The OSD generator 162 also generates graphic data indicating the list of multiple applications.

Further, the mixer 167 mixes the video data of the broadcast program and the graphic data generated by the OSD generator 162. The controller 160 performs control operations so that the mixed video data and graphic data can be output through the display module 180. The above process will be described in more detail with reference to FIG. 5 or 11.

According to another embodiment of the present invention, the user interface 170 receives a command initiating an Edit mode. At this point, the controller 160 determines whether a selected specific application belongs to the first application group or to the second application group. Furthermore, when the selected specific application belongs to the first application group, the controller 160 controls the OSD generator 162 so that a first area to which an icon corresponding to the specific application can be relocated or a second area that can be deleted can be displayed in a graphic form different from the other remaining areas. This process will be described in more detail with reference to FIGS. 11 to 15.

Furthermore, according to yet another embodiment of the present invention, when the icon corresponding to the specific application is located in the second area, the controller 160 removes the specific application from the memory 150, and stores an address information, which can be used to download the specific application, in the memory 150. The above-described structure will be described in more detail with reference to FIG. 16.

Finally, according to yet another embodiment of the present invention, when the user interface 170 receives a command requesting categorization of multiple applications stored in the memory 150 based upon the application type, the controller 160 accesses the memory 150 and categorizes the applications in accordance with the application type. For example, the application carries metadata identifying the different application types. Also, the OSD generator 162 generates graphic data including icons corresponding to each application, which is categorized by the respective application type. This will be described in more detail with reference to FIGS. 18 and 19.

Next, FIG. 3 is a table stored in the memory 150 including at least one or more applications by different group types according to an embodiment of the present invention. According to an embodiment of the present invention, in order to enable the user to easily verify and edit the large number of applications stored in the memory 150 of the display apparatus 100, the multiple applications are categorized into two different groups.

In particular, a first group includes non-editable applications, and a second group includes editable applications. Downloaded applications shown in FIG. 3 belong to the above-described second group. Editable applications refer to all types of applications that can be freely processed by an operation of relocating the position of an application within the application list and an operation of deleting applications.

System applications shown in FIG. 3 belong to the above-described first group. Non-editable applications refer to all types of applications that cannot be processed by the operation of relocating the position of an application within the application list and the operation of deleting applications.

More specific examples of the system applications include a "Number application", a "Recent application", a "DVR application", a "Web Browser application", and so on. The above-described applications correspond to data that are stored during a manufacturing process step of a television (TV). When deleting any one of the above-described application, a problem may occur in the essential function of the TV. Therefore, a method of setting-up such applications as non-editable and undeletable applications belongs to the technical scope of the present invention.

Meanwhile, the downloaded applications refer to applications that are downloaded and stored by the user, who has purchased the TV, through a direct access to an Internet website. Further, a premium application may be set to belong to the first or second group, or be defined as an application belonging to a separate third group. For example, the premium application refers to an undeletable application that can be relocated (re-positioned) within the application list.

Additionally, a method of differently setting diverse features such as color, tone, etc. of the corresponding icons and displaying such icons in order to differentiate each of the downloaded applications, the premium applications, and the system applications from one another, also belongs to an embodiment of the present invention. When designing the present invention as described above, the user can easily differentiate the group of applications (or application group) that can be relocated and/or deleted from the group of applications (or application group) that cannot be relocated and/or deleted.

Figure 4:
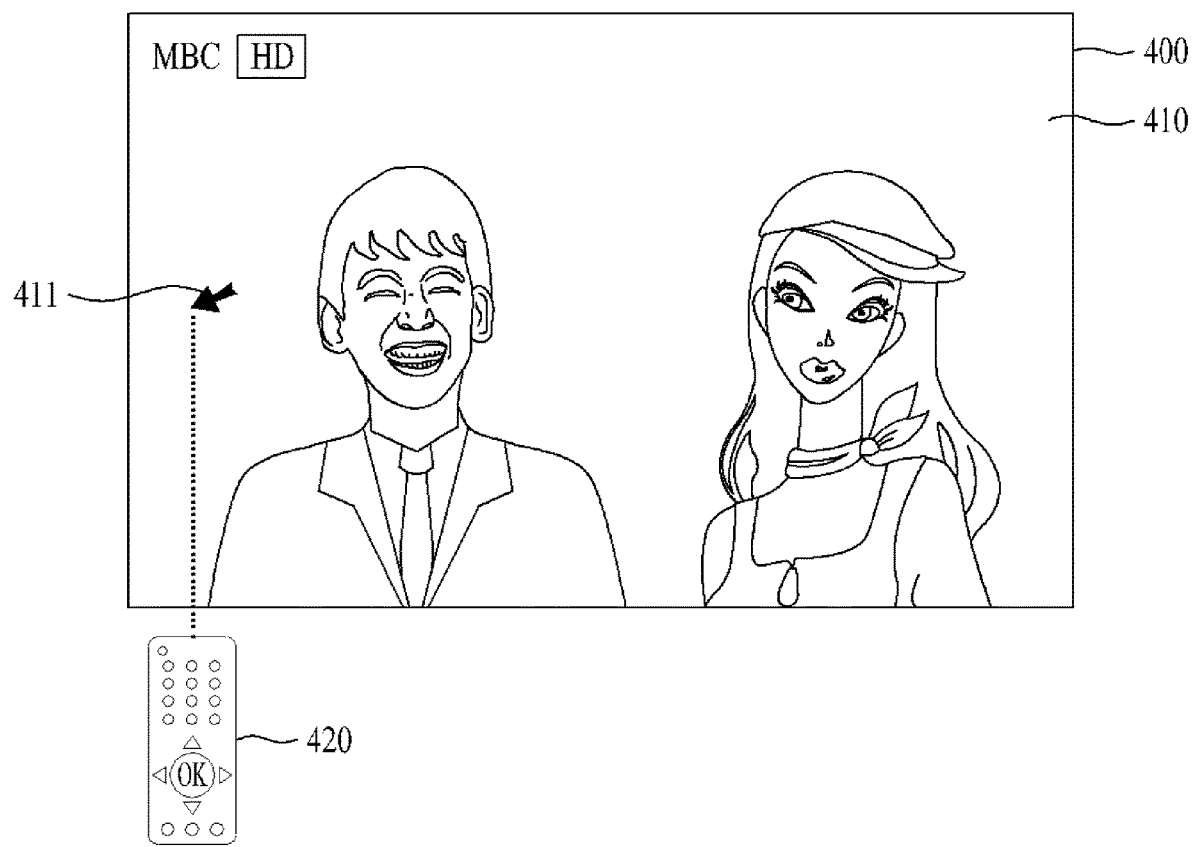
FIG. 4 is a display screen prior to executing an application browser according to an embodiment of the present invention.
Figure 5:
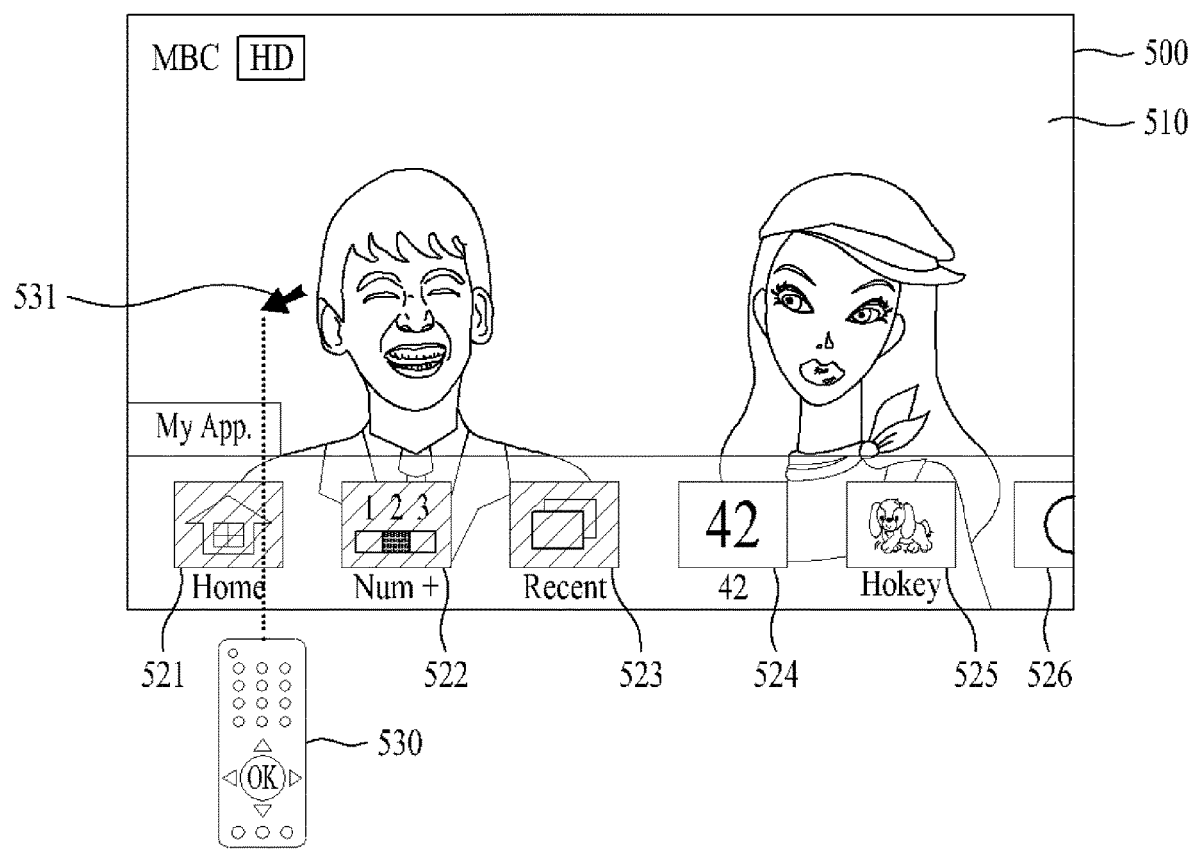
FIG. 5 is a display screen after executing an application browser according to an embodiment of the present invention.

Next, FIG. 4 is a display screen prior to executing an application browser according to an embodiment of the present invention. As shown in FIG. 4, the display apparatus 400 displays a general broadcast display screen 410. Further, a web browser can be executed by using an indicator 411, which changes its position in accordance with the movements of the remote controller 420. FIG. 5 illustrates an application browser being executed, when the user presses a specific key (e.g., a hot key or a verification (or OK) key) of the remote controller 420.

In particular, FIG. 5 is a display screen after executing an application browser according to an embodiment of the present invention. As shown, when a command for executing an application browser is received, the display apparatus 500 displays two separate areas. According to an embodiment of the present invention, the application browser function is newly defined. For example, the application browser function corresponds to an option configured to list graphic data corresponding to each of the applications stored in the memory. More particularly, the application browser described below has excellent editing and accessing features.

Further, the display apparatus 500 maintains broadcast data of a channel, which is currently being tuned, in a first area 510. In addition, graphic data or icons 521, 522, 523, 524, and 525 corresponding to each of the applications stored in the memory 150 are output in a second area 520. Additionally, an embodiment of the present invention includes adding graphic data 526 for implying the presence of a larger number of applications in addition to the five (5) applications listed in the second area 520.

Furthermore, as described in FIG. 3, the system applications 521, 522, and 523 and the downloaded application 524 and 525 are displayed so as to be differentiated from one another. Therefore, the present invention is advantageous because the user is visually notified not to attempt the editing of a system application.

Moreover, the remote controller 530 is used to select or edit the applications listed in the above-described second area. An indicator 531 corresponding to the remote controller 530 can move in accordance with the motions of the remote controller 530.

Figure 6:
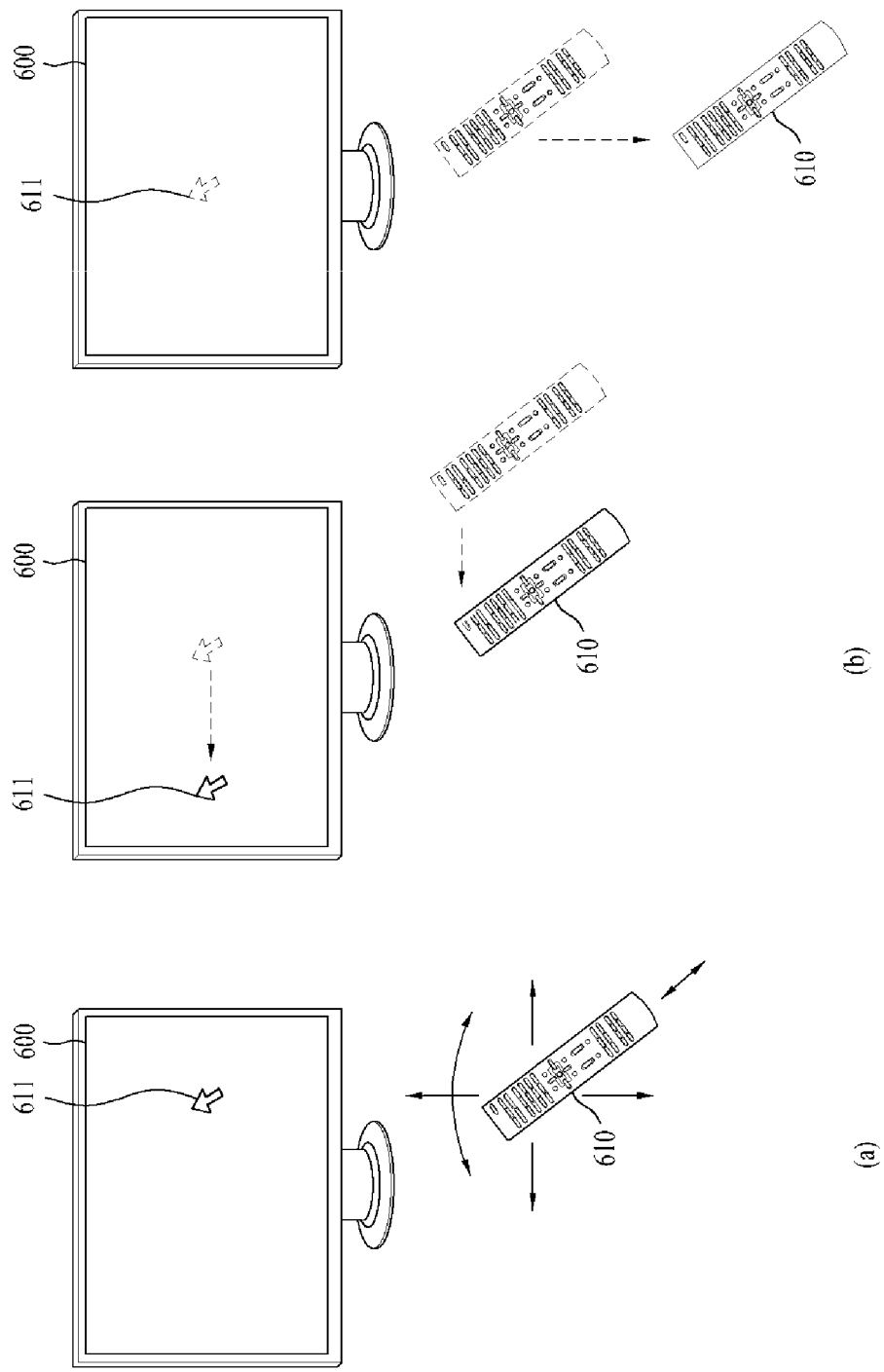
FIG. 6 is an overview of a remote controller controlling the display apparatus according to an embodiment of the present invention.

Next, FIG. 6 is a system view illustrating a remote controller 610 controlling a display apparatus 600 according to an embodiment of the present invention. First of all, FIG. 6(a) illustrates an example of a pointer 611 corresponding to the remote controller 610 being displayed on the display apparatus 600. Herein, for example, the display apparatus 600 includes the elements shown in FIGS. 1 and 2.

The user may move or rotate the remote controller 610 in an up-and-down (vertical) direction, a left-to-right (horizontal) direction as shown in FIG. 6(b), and a back-and-forth direction as shown in FIG. 6(c). The pointer 611 displayed on the display apparatus 600 corresponds to the motion of the remote controller 610. As shown in FIG. 6, because the corresponding pointer 611 moves in accordance with the motion of the remote controller 610 within a 3 dimensional (3D) space, the remote controller 610 may also be referred to as a motion remote controller or a space remote controller.

In addition, FIG. 6(b) illustrates an example of when the remote controller 610 moves leftwards, the pointer 611 displayed on the display apparatus 600 also moves leftwards with respect to the motion of the remote controller 610.

Information on the motion of the remote controller 610 detected by a sensor of the remote controller 610 is also transmitted to the display apparatus 600. The display apparatus 600 can also calculate (or compute) coordinates of the pointer 611 from the information on the motion of the remote controller 610. Further, the display apparatus 600 displays the pointer 611 to correspond to the calculated coordinates. Also, the graphic data of the pointer 611 may designed to have the shape of an arrow or may be designed to have the shape of a cross, for example FIG. 6(c) illustrates an example of the user moving the remote controller 610 further away from the display apparatus 600 while pressing on a specific button on the remote controller 610. Accordingly, the selected area within the display apparatus 600 corresponding to the pointer 611 can be zoomed-in so as to be displayed in a more enlarged size. Conversely, when the user moves the remote controller 610 closer to the display apparatus 600, the selected area within the display apparatus 600 corresponding to the pointer 611 can be zoomed-out so as to be displayed in a more reduced size.

Figure 7:
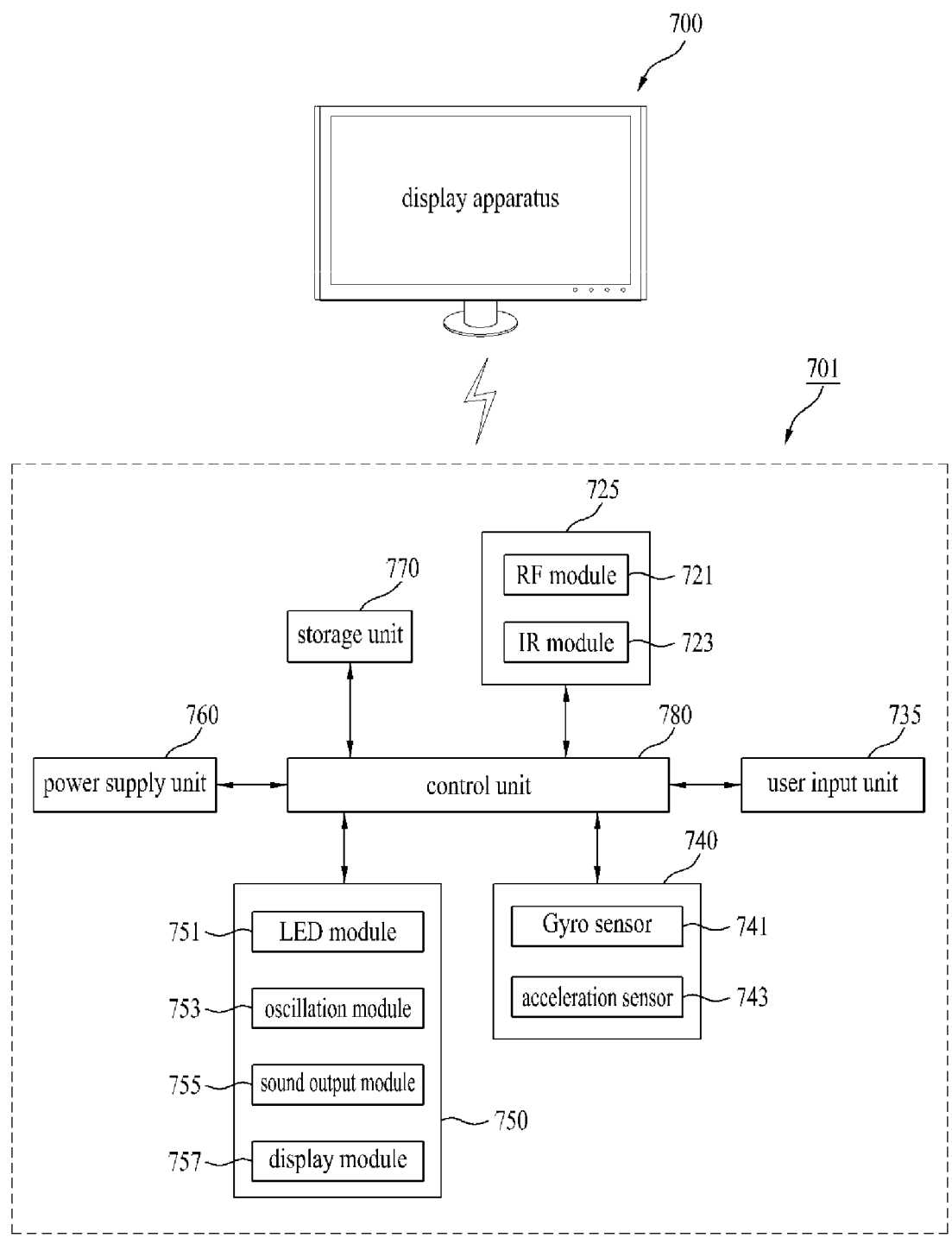
FIG. 7 is a block diagram illustrating internal elements of the remote controller shown in FIG. 6.

Next, FIG. 7 is a block diagram illustrating internal elements of the remote controller shown in FIG. 6. As shown in FIG. 7, a remote controller 701 includes, for example, a wireless communication unit 725, a user input unit 735, a sensor unit 740, an output unit 750, a power supply unit 760, a storage unit 770, and a control unit 780.

The wireless communication unit 725 transmits and receives signals to and from a display apparatus 700 according to an embodiment of the present invention. The remote controller 701 includes an RF module 721, which can transmit and receive signals to and from the display apparatus 700 in accordance with an RF communication standard. Additionally, the remote controller 701 includes an IR module 723, which can transmit and receive signals to and from the display apparatus 700 in accordance with an IR communication standard.

Meanwhile, although FIG. 7 illustrates the remote controller 701 that can process both RF signals and IR signals, a remote controller that can only process RF signals may be used to control the display apparatus 700. Alternatively, a remote controller that can only process IR signals may be used to control the display apparatus 700. However, for simplicity, the remote controller that can process both RF signals and IR signals will be described as follows.

The remote controller 701 transmits signals carrying information on the motions of the remote controller 701 to the display apparatus 700 through the RF module 721. Also, the remote controller 701 receives a signal transmitted from the display apparatus 700 through the RF module 721. Also, the remote controller 701 can transmit commands associated with power on/off, channel change, volume change, and so on to the display apparatus 700 through the IR module 723.

The user input unit 735 may include a keypad, buttons, a touchpad, or a touchscreen. The user can manipulate the user input unit 735 so as to input a command associated with the display apparatus 700. Further, the sensor unit 740 includes a Gyro sensor 741 or an acceleration sensor 743. Furthermore, the Gyro sensor 741 can sense information associated to the motions of the remote controller 701.

In addition, the Gyro sensor 741 can sense the information associated with the motions of the remote controller 701 based upon x, y, and z axes. Further, the acceleration sensor 743 can sense information associated with a movement speed of the remote controller 701. Meanwhile, the acceleration sensor 743 may include a distance measurement sensor. Also, by using the distance measurement sensor, the acceleration sensor 743 can sense the distance between the remote controller 701 and the display apparatus 700.

The output unit 750 can output a video signal or an audio signal either corresponding to the manipulation of the user input unit 735 or corresponding to the signal transmitted from the display apparatus 700. The user can also recognize whether or not the user input unit 735 has been manipulated or whether or not the display apparatus 700 has been controlled through the output unit 750. According to an embodiment of the present invention, when the user input unit 735 is manipulated, or when a signal is transmitted and received to and from the display apparatus 700 through the wireless communication unit 725, the output unit 750 includes an LED module 751 that is lit, an oscillation module 753 that generates oscillation, a sound output module 755 that outputs sound, or a display module 757 that outputs images.

Further, the power supply unit 760 supplies power to the remote controller 701. When the remote controller 701 does not move for a predetermined period of time, by stopping the power supply, the power supply unit 760 can reduce a wasted amount of power. The power supply unit 760 can also resume the power supply, when a predetermined key provided in the remote controller 701 is manipulated.

In addition, the storage unit 770 can store diverse types of programs, application data, and so on, that are used for controlling or operating the remote controller 701. Also, the control unit 708 performs the overall functions associated with the control of the remote controller 701.

Therefore, options displayed on the application browser can be selected by moving the remote controller shown in FIGS. 6 and 7, or the options displayed on the application browser can be selected by using the user input unit (e.g., arrow buttons) of the remote controller.

Figure 8:
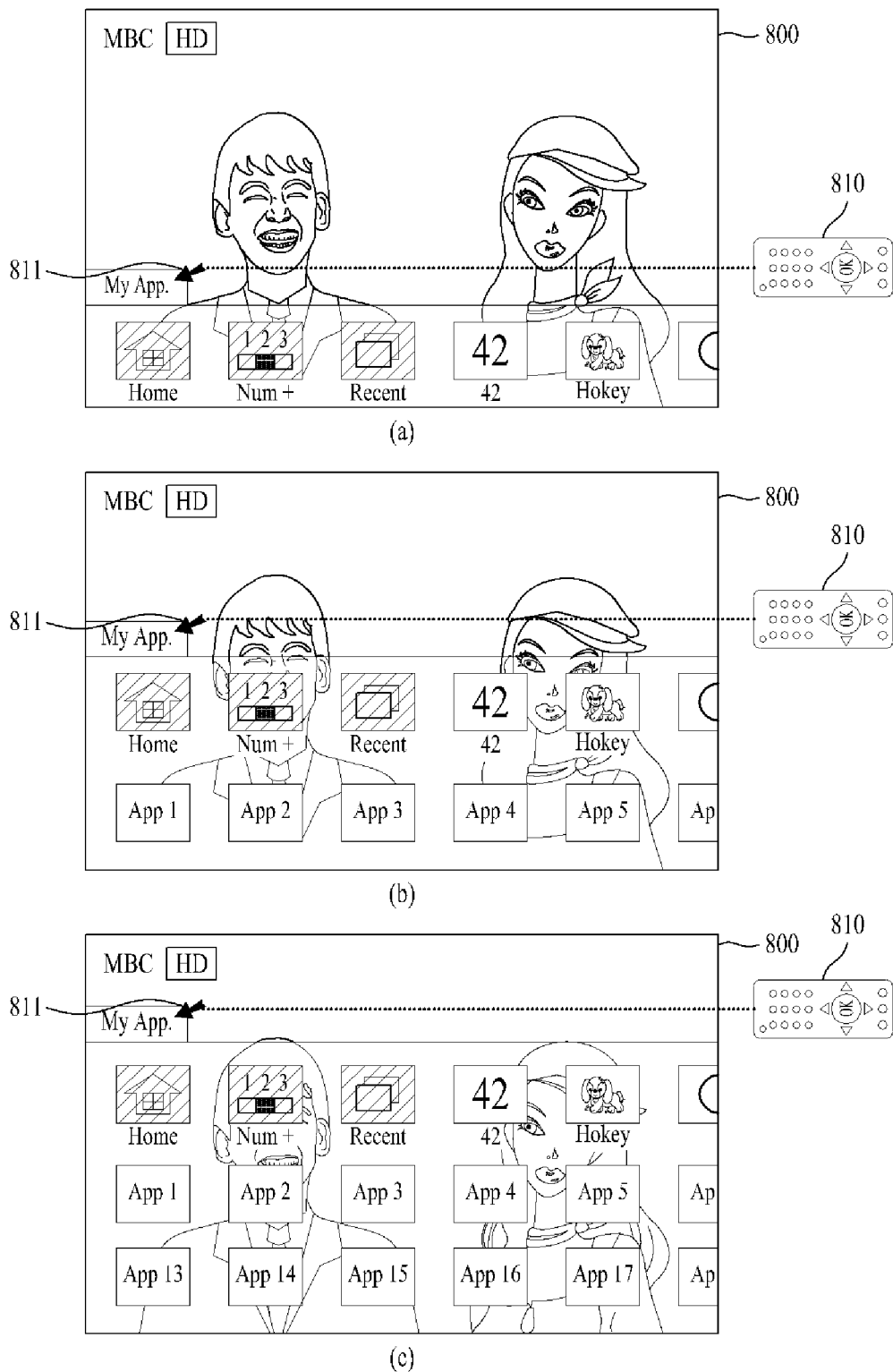
FIG. 8 includes display screens illustrating a process of changing a status of the application browser according to an embodiment of the present invention.

Next, FIG. 8 includes display screens illustrating a process of changing a status of the application browser according to an embodiment of the present invention. Hereinafter, a process of enlarging the size of the application browser according to an embodiment of the present invention will be described with reference to FIG. 8.

When an application browser is initially executed, applications, which are pre-stored in 1-layer at a bottom portion of the display screen, are partially displayed as shown in FIG. 8(a). However, the user may want to verify or view a broader list of applications.

At this point, when the user moves the remote controller 810 so as to control an indicator 811 to move upwards, a list showing a larger number of applications of 2-layers is displayed as shown in FIG. 8(b). Furthermore, when the indicator 811 is moved to an upper end of the display screen of a display apparatus 800, a list of all applications of 3-layers is displayed as shown in FIG. 8(c). Embodiments of the present invention also include changing the above-described layer or the size of the applications that are being displayed.

Figure 9:
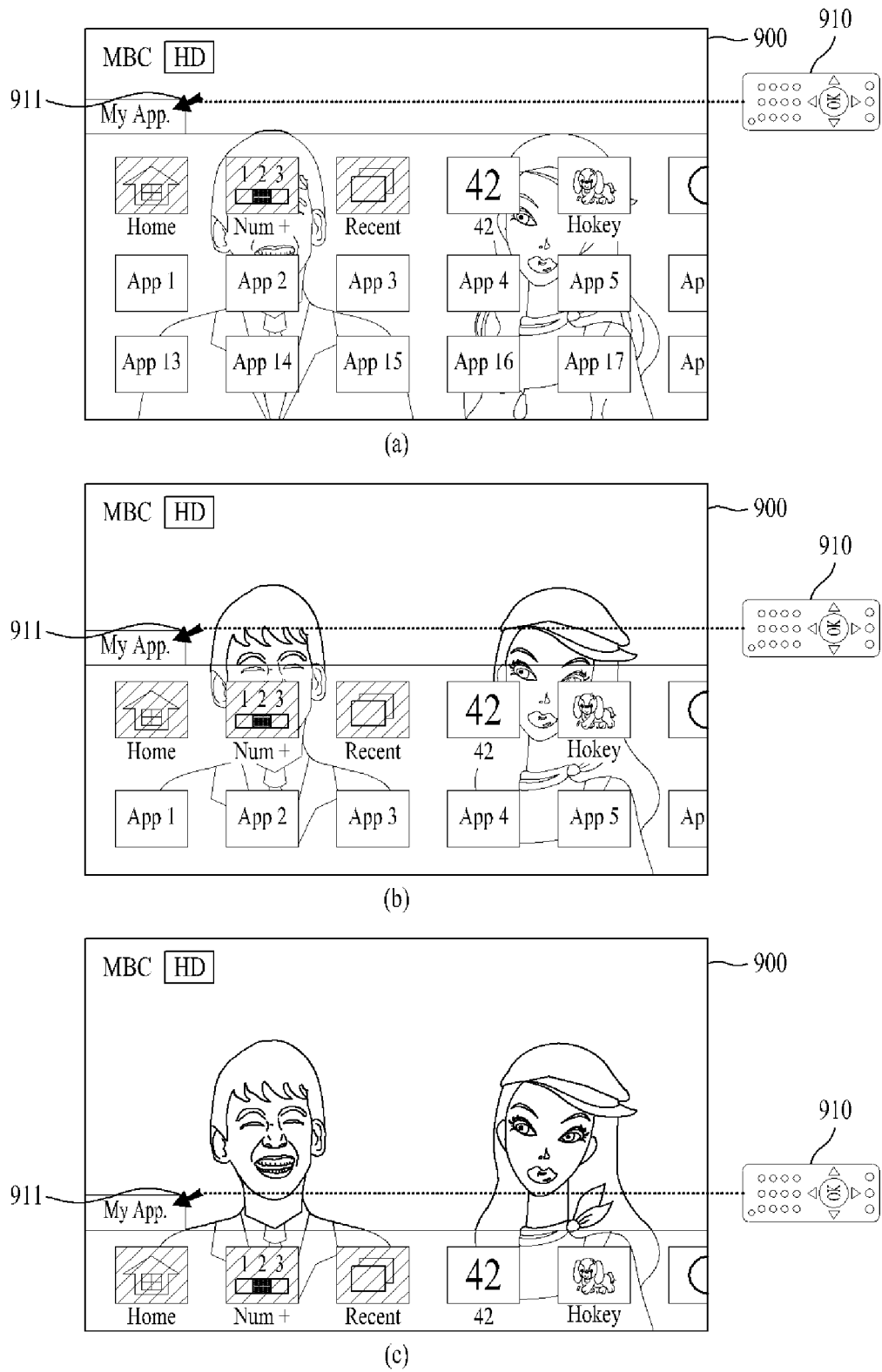
FIG. 9 includes display screens illustrating another process of changing a status of the application browser according to an embodiment of the present invention.

Next, FIG. 9 includes display screens illustrating another process of changing a status of the application browser according to an embodiment of the present invention. Hereinafter, a process of reducing the size of the application browser according to an embodiment of the present invention will be described with reference to FIG. 9.

As opposed to FIG. 8, when the indicator is moved downwards, the size of the application browser is reduced as shown in FIGS. 9(a), (b) and (c). More specifically, because the number of the listed applications is reduced, the visibility of video data of the broadcast screen can be increased on the display apparatus 900.

Figure 10A:
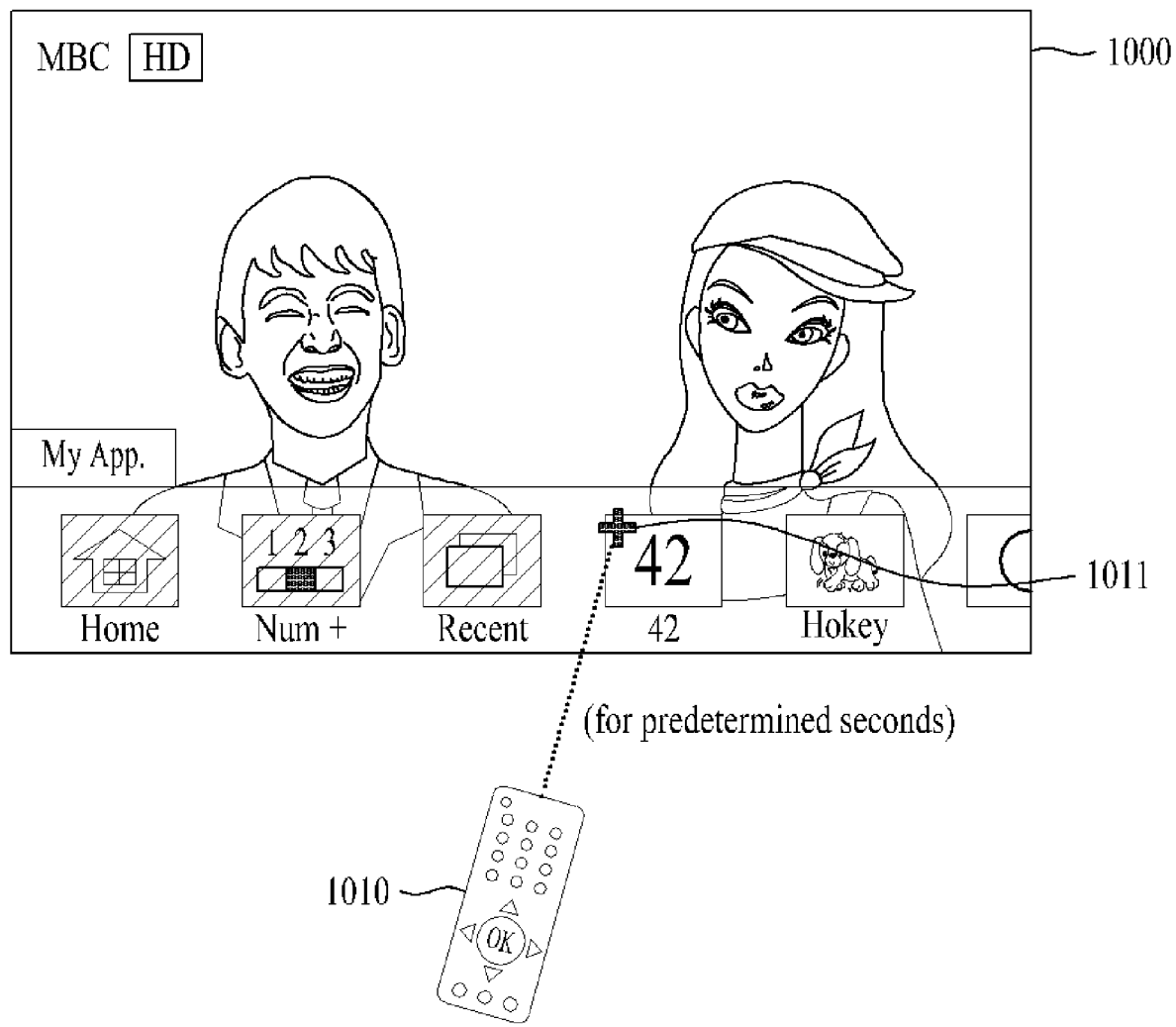
FIGS. 10A to 10C are display screens illustrating processes for editing an application location in a first mode of the application browser according to an embodiment of the present invention.
Figure 10B:
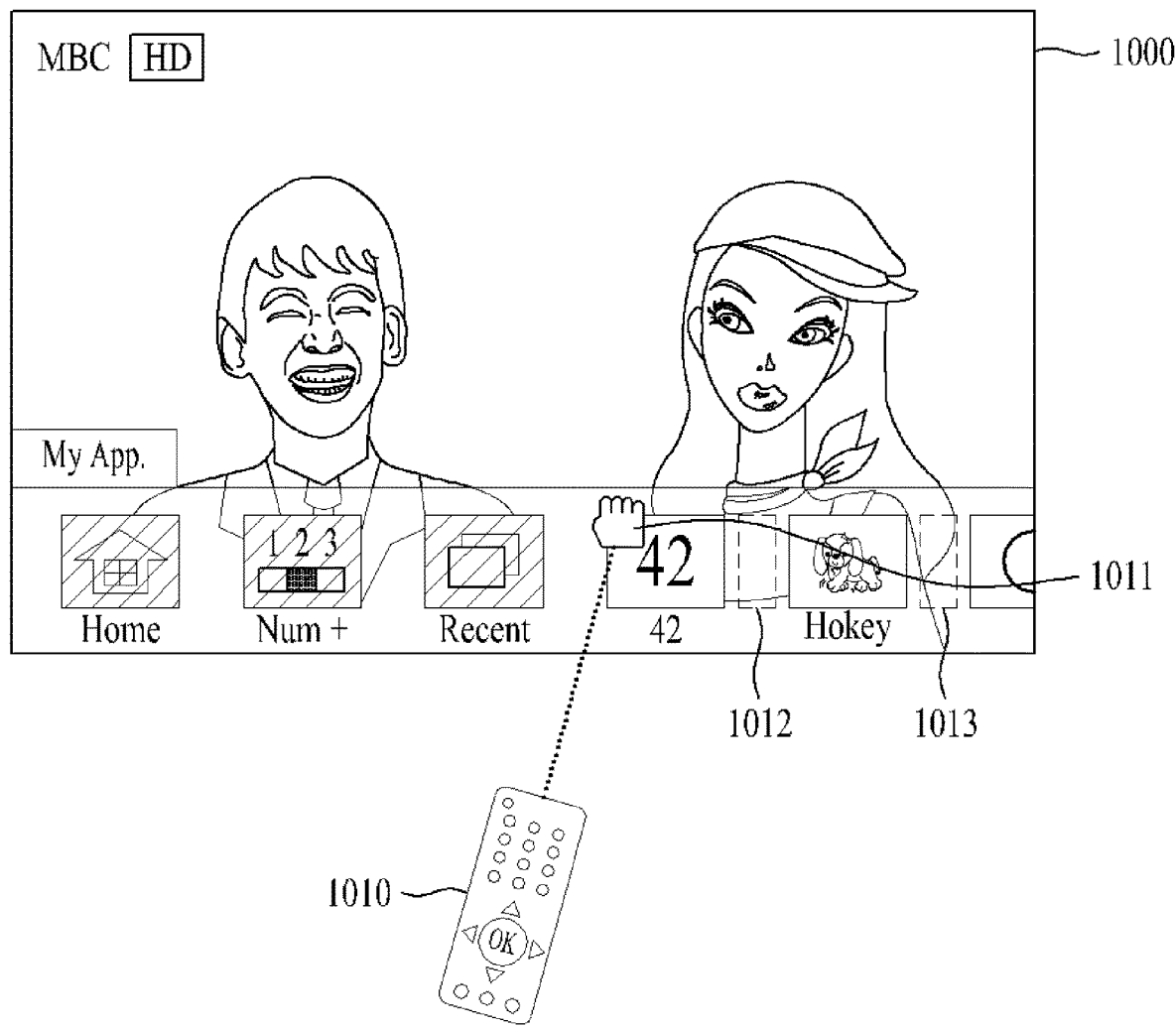
Figure 10C:
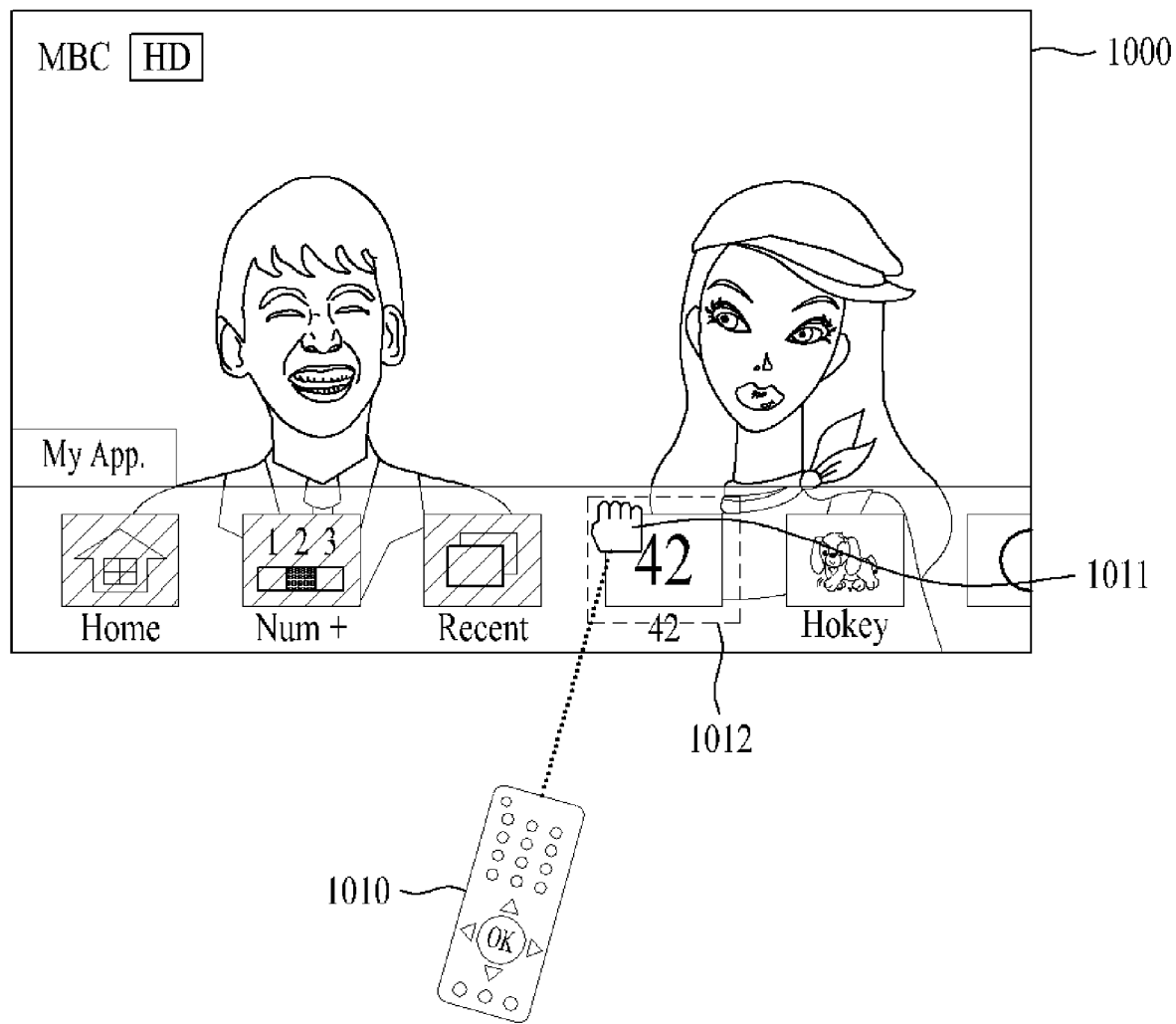

Next, FIGS. 10A to 10C are display screens illustrating processes for editing an application location in a first mode of the application browser according to an embodiment of the present invention. Herein, for example, the first mode of the application browser refers to a mode showing a list of applications corresponding to 1-layer as shown in FIG. 10A.

First of all, as shown in FIG. 10A, the display apparatus 1000 according to an embodiment of the present invention outputs the first mode of the application browser. At this point, when the user of the display apparatus 1000 wants to edit the location of the listed applications, the user places an indicator 1011 using the remote controller 1010 on the application, which the user wants to edit, for a predetermined period of time. The user can also select the application, which he or she wants to edit, by using a short or hot key.

Subsequently, as shown in FIG. 10B, the display apparatus 1000 display areas 1012 and 1013, to which the selected specific application can be relocated, by highlighting the corresponding areas 1012 and 1013 so that the corresponding areas 1012 and 1013 are differentiated from other areas. As shown in FIG. 10B, because the system applications cannot be relocated, the areas 1012 and 1013 are not displayed in between the system applications. Meanwhile, for providing a guide notifying that the selected specific application can be relocated, the graphic data of the indicator 1011 of the remote controller 1010 are also converted. This process can be easily understood by comparing FIG. 10A with 10C.

Finally, as shown in FIG. 10C, the location of a specific application 1012 can be moved (or re-located) by using the remote controller 1010 and the indicator 1011. Therefore, by comparing FIG. 10A with FIG. 10C, it is apparent that the positions of the downloaded applications, "Hokey" application and "42" application, have been changed.

Figure 11:
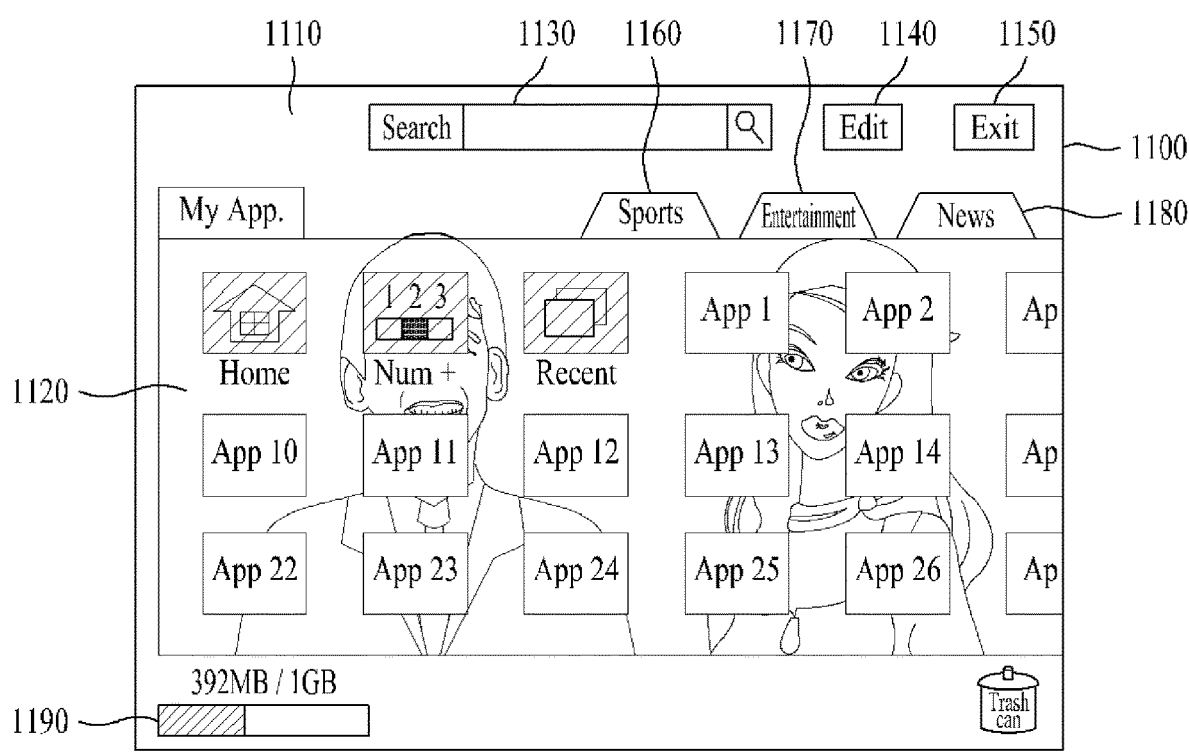
FIG. 11 is a display screen illustrating a detailed view of a second mode of the application browser according to an embodiment of the present invention.

Next, FIG. 11 is a display screen illustrating a detailed view of a second mode of the application browser according to an embodiment of the present invention. Herein, for example, the second mode of the application browser refers to a mode showing a list of applications corresponding to 3-layers as shown in FIG. 11. By using the second mode, the user can verify or view a list of a larger number of applications at the same time.

As shown in FIG. 11, the display apparatus 1100 according to an embodiment of the present invention outputs a list 1120 of applications belonging to multiple groups stored in the memory 150. As described above, video data 1110 respective to the broadcast program may also be displayed.

Also, the display apparatus 1100 displays an option 1130 enabling the user to search for applications having a specific title, an edit option 1140 enabling the user to edit the positions of the listed applications to be edited, an exit option 1150 enabling the user to return to the previous display screen, options 1160, 1170, and 1180 for categorizing only the applications belonging to a specific category, and an option 1190 for displaying the currently used memory size in comparison with the total memory size.

Further, FIG. 5 or 11 shows an example of the application browser and a general broadcast A/V screen being simultaneously output in an overlaid format. Also, according to an embodiment of the present invention, among the applications listed, when a specific application is selected from the application browser, the output of the overlaying general broadcast A/V screen may be interrupted. Furthermore, according to another embodiment of the present invention, the display apparatus can stop the output of the general broadcast A/V screen and only display the application browser.

Figure 12A:
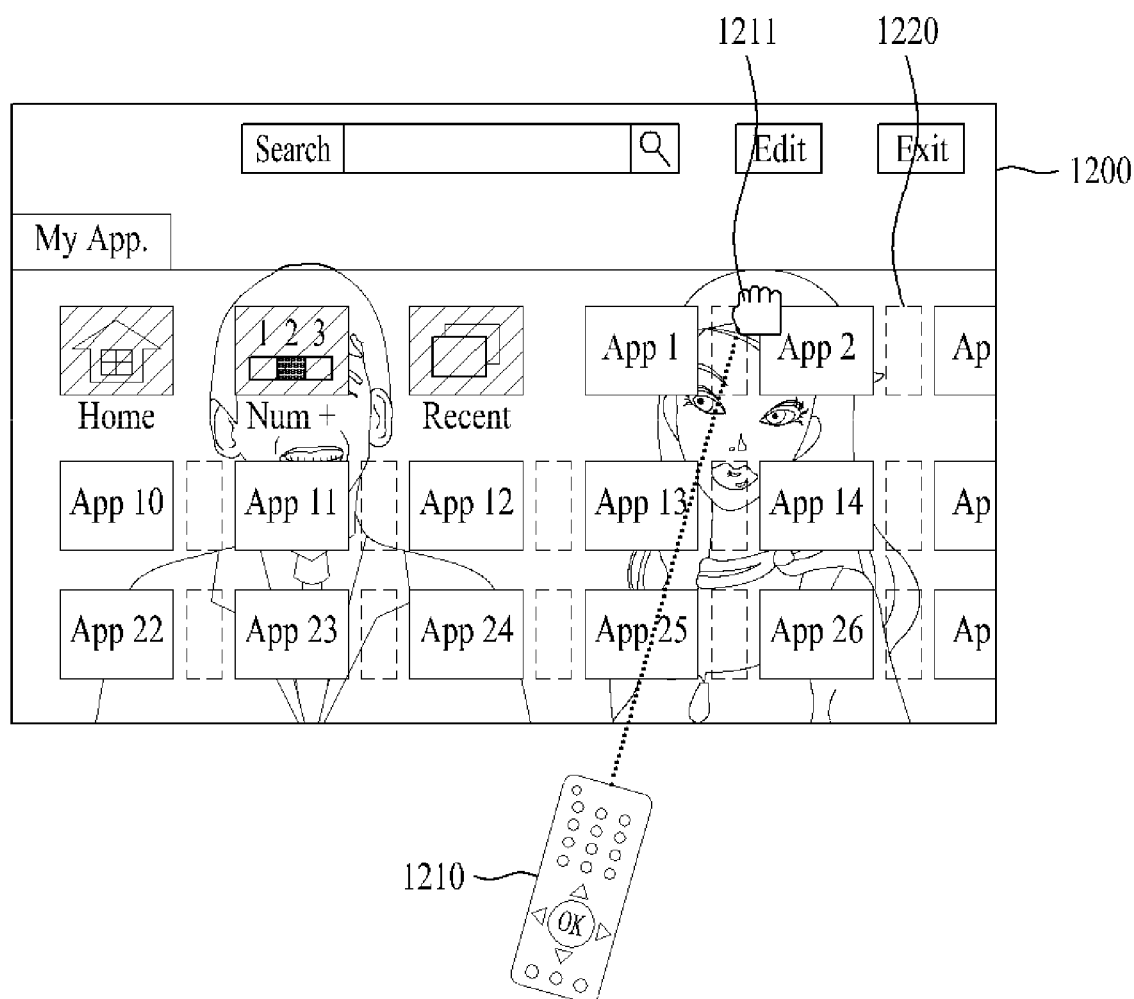
FIGS. 12A to 12C are display screens illustrating processes for editing an application location in the second mode of the application browser according to an embodiment of the present invention.
Figure 12B:
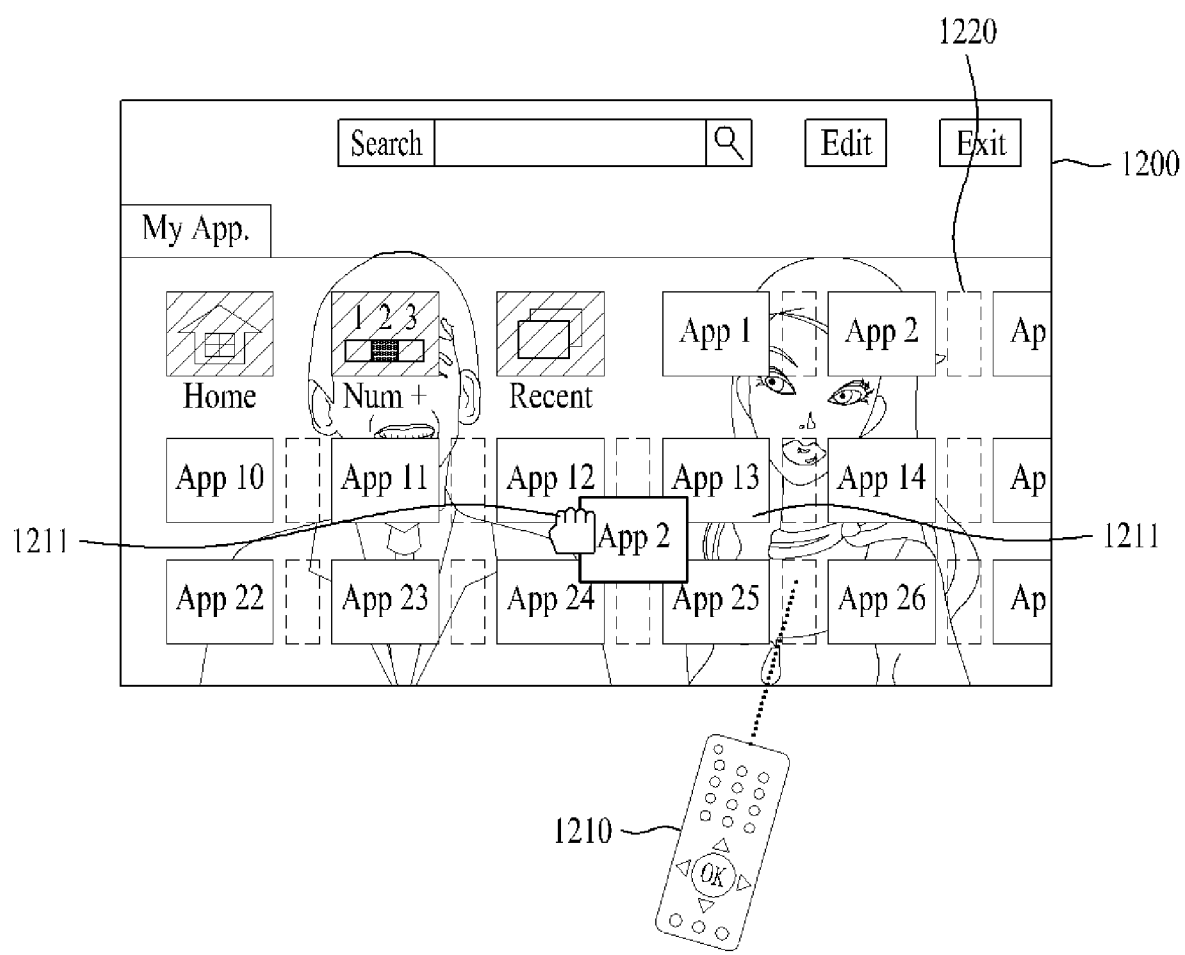
Figure 12C:
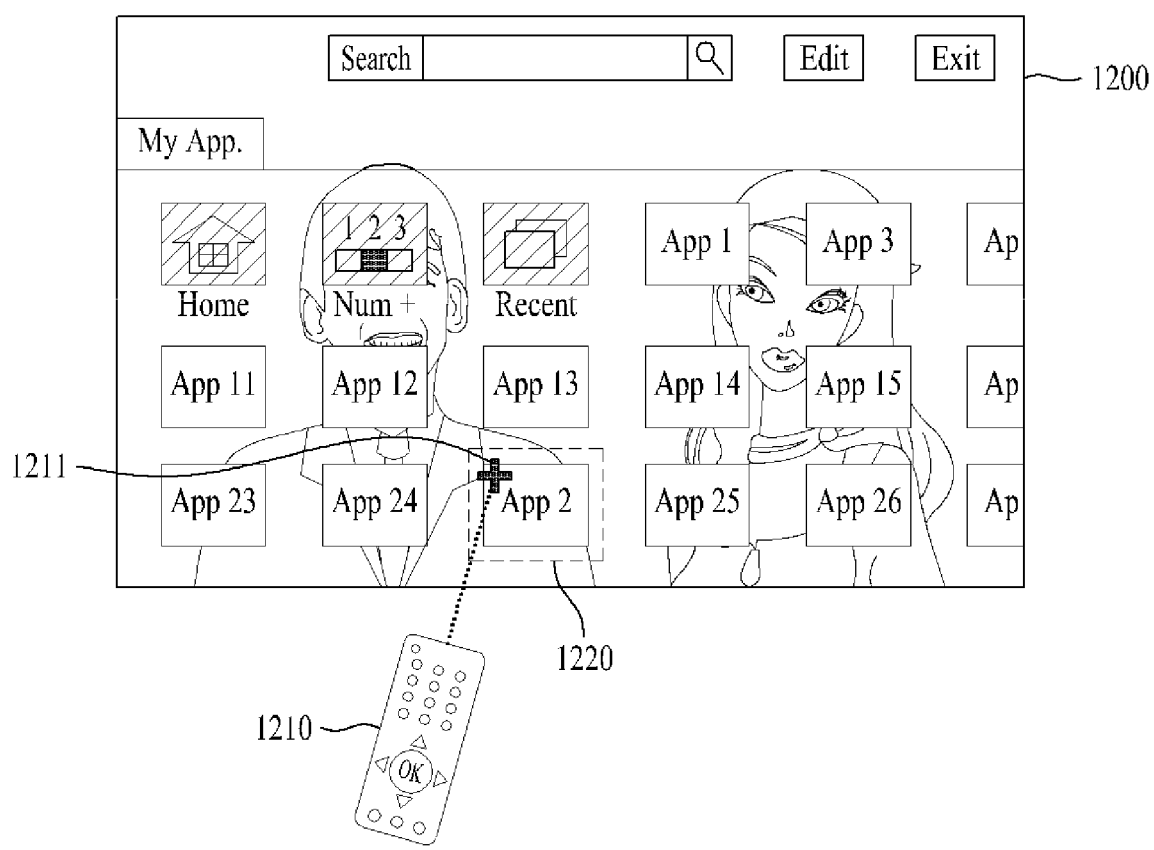

Next, FIGS. 12A to 12C are display screens illustrating processes for editing an application location in the second mode of the application browser according to an embodiment of the present invention. If the Edit option 1140 shown in FIG. 11 is selected, the display apparatus 1200 provides a modified application browser screen as shown in FIG. 12A. For example, when a specific application (e.g., App 2) is selected by using the remote controller 1210 and indicator 1211, graphic data 1220 guiding the user to re-locatable positions are displayed. As described above, such graphic data 1220 are not displayed between the system applications, which cannot be relocated.

Subsequently, as shown in FIG. 12B, the application #2 (App 2) is relocated to a position between application #24 (App 24) and application #25 (App 25) by using the remote controller 1210 and the indicator 1211. Finally, as shown in FIG. 12C, because the display apparatus 1200 differently displays application #2 (App 2) 1220, the position of application #2 (App 2) 1220 being relocated, the user can verify the relocated application more easily. Furthermore, once the editing process is completed, the shape of the indicator 1211 is changed from a finger-pointing hand to a cross. Thus, the user can recognize that the editing function is completed and that other functions can be performed.

Figure 13A:
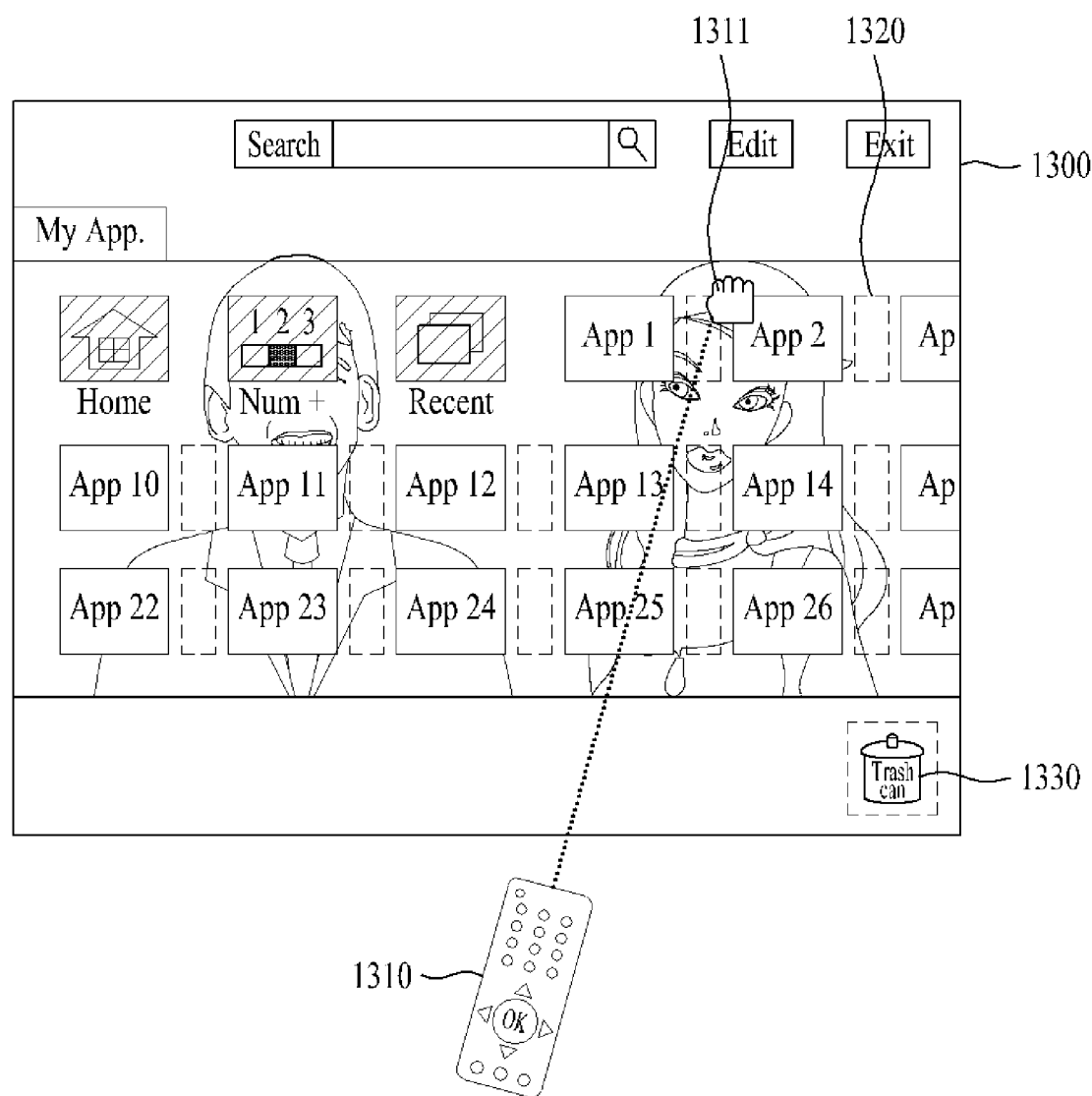
FIGS. 13A to 13C are display screens illustrating processes for deleting editable applications in the second mode of the application browser according to an embodiment of the present invention.
Figure 13B:
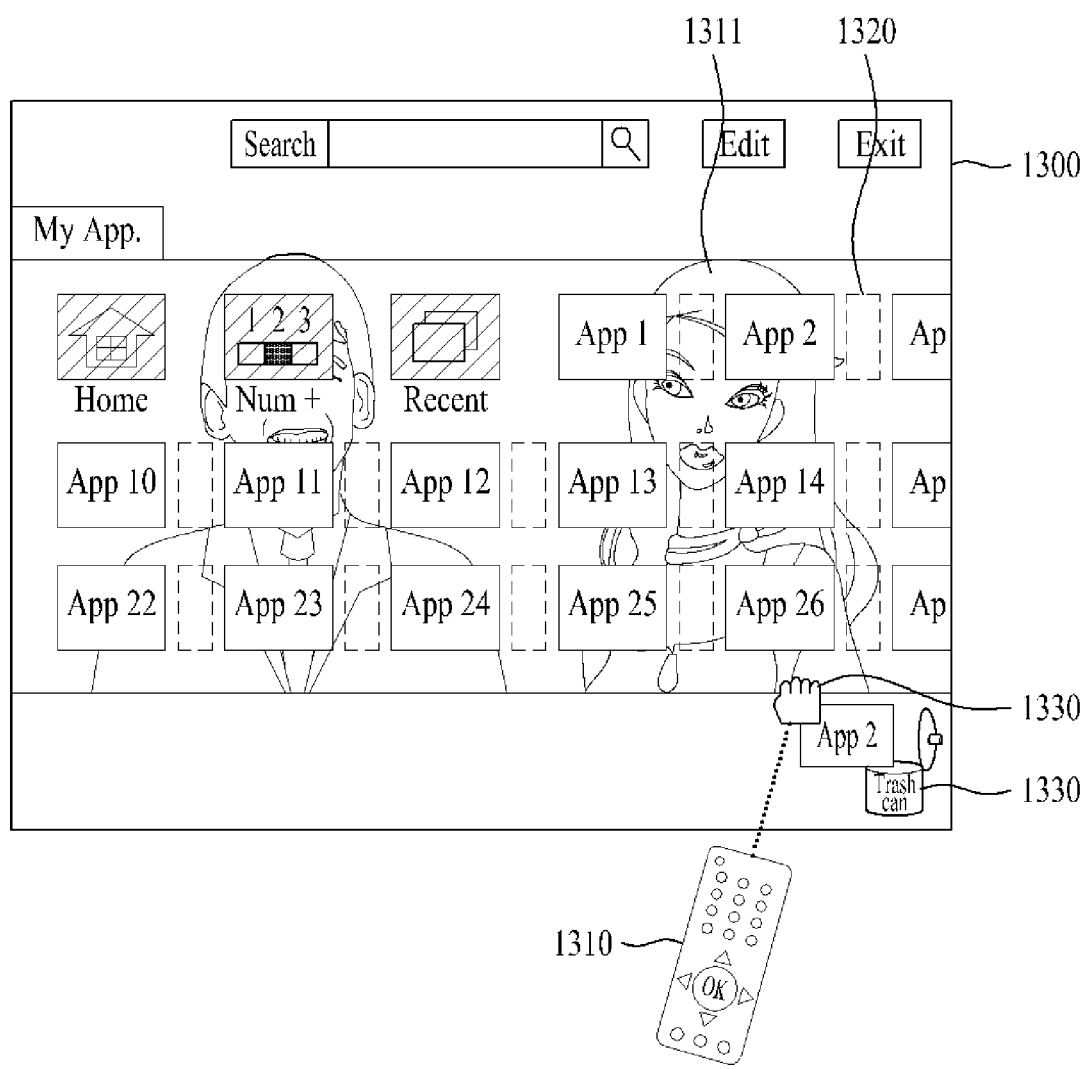
Figure 13C:
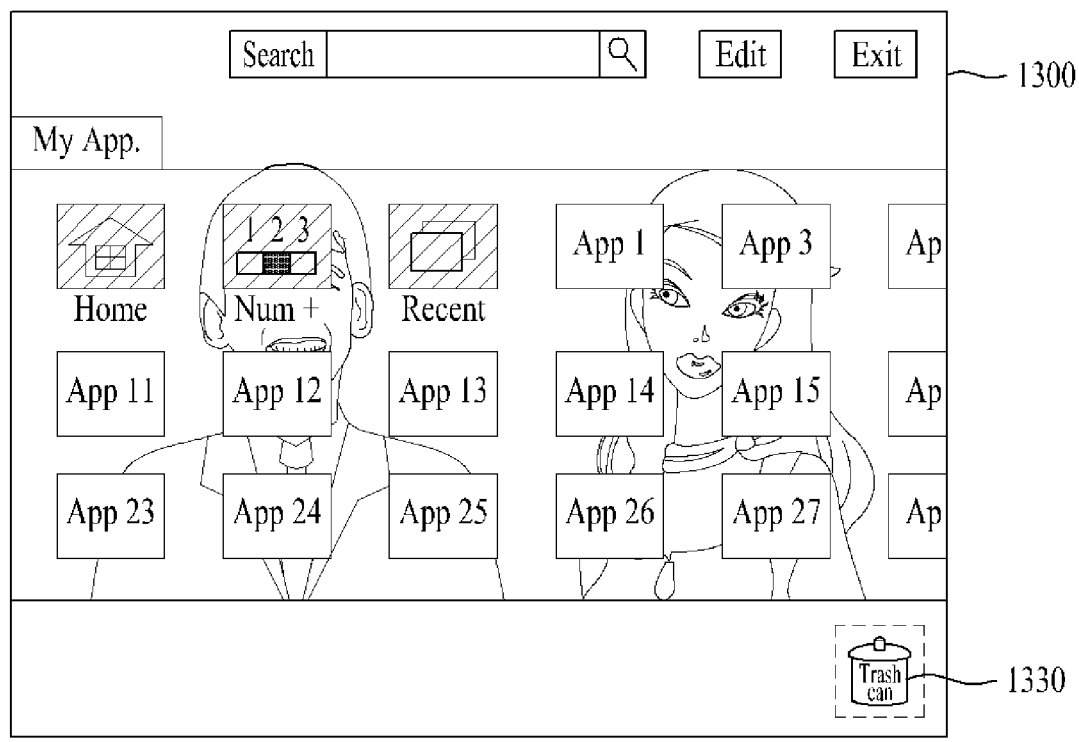

Next, FIGS. 13A to 13C are display screens illustrating processes for deleting editable applications in the second mode of the application browser according to an embodiment of the present invention. If the Edit option 1140 shown in FIG. 11 is selected, the display apparatus 1300 provides a modified application browser screen as shown in FIG. 13A. For example, when a specific application #2 (App 2) is selected by using the remote controller 1310 and the indicator 1311, graphic data 1320 guiding the user to re-locatable positions are displayed. Additionally, graphic data 1330 corresponding to deletable areas are displayed by being highlighted.

Subsequently, as shown in FIG. 13B, the application #2 (App 2) is moved to a deletable area by using the remote controller 1310 and the indicator 1311. At this point, as shown in FIG. 13B, graphic data representing a Trash Can is changed to an open state from a usual closed state (shown in FIG. 13A). Thus, the display apparatus 1300 can warn or notify the user once again that the application selected by the user can be deleted.

Finally, as shown in FIG. 13C, after completing the repositioning of the specific application #2 (App 2) to the deletable area, the display of the corresponding graphic data 1330 is highlighted once again. Thereafter, the display apparatus 1300 adjusts the positions of the remaining applications and displays the new layout. For example, the layout of the applications may include application #3 (App 3), which was initially adjacent to the deleted application #2 (App 2), as being relocated to the initial position of the deleted application #2 (App 2). Accordingly, the positions of the other applications are also shifted leftwards by one block.

As described above with reference to FIGS. 12 and 13, when an editable (relocatable or deletable) application is selected, the graphic data of the relocatable or deletable areas are modified. Also, according to another embodiment of the present invention, the display apparatus does not highlight the specific areas as shown in FIGS. 12 and 13. In this instance, a first application, which the user wants to relocate, is assumed to exist. Accordingly, when the first application is moved (or relocated) to a specific area (e.g., the position where a third application is located), which the user wants to relocate the first application, the display apparatus exchanges the position of the first application and the position of the third application.

Furthermore, according to an embodiment of the present invention, the positions of the applications may be modified in accordance with the overlaying portion (e.g., 50% or more) between the first application and the third application. Therefore, when the overlaying portion of the applications is less than 50%, the positions of the corresponding applications are not changed.

Figure 14A:
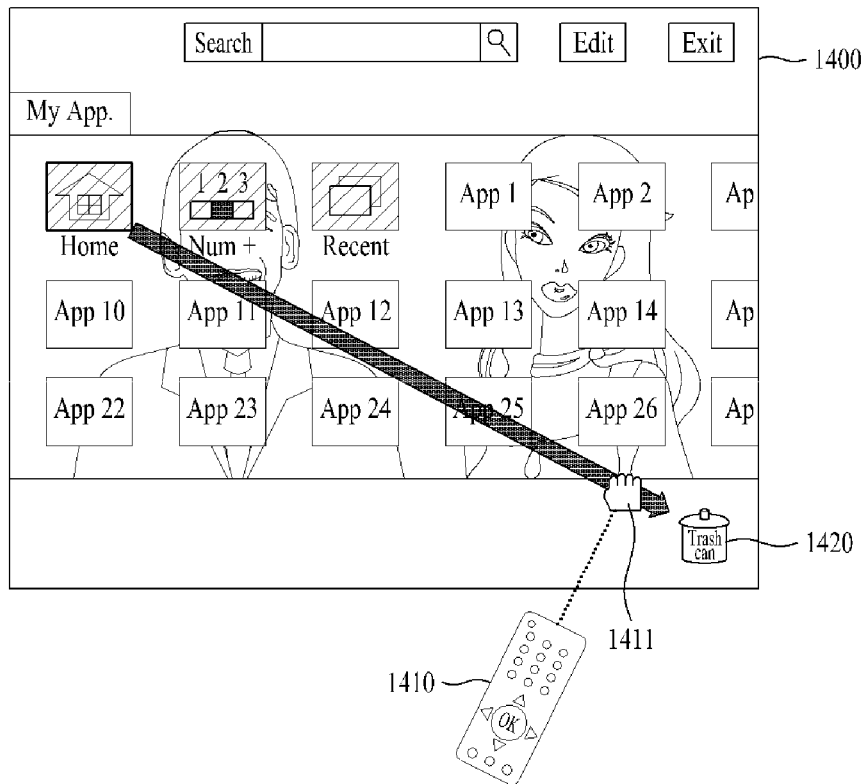
FIGS. 14A and 14B are display screens illustrating a first group of non-editable application groups in the second mode of the application browser according to an embodiment of the present invention.
Figure 14B:
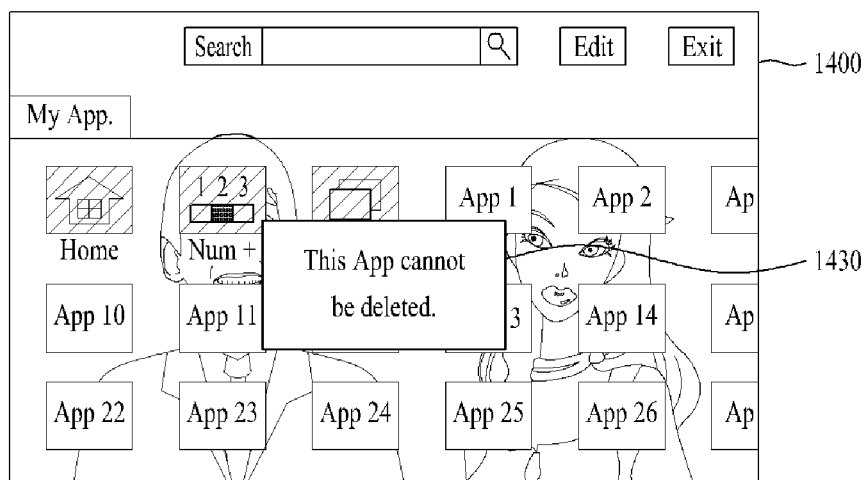

Next, FIGS. 14A and 14B are display screens illustrating a first group of non-editable application groups in the second mode of the application browser according to an embodiment of the present invention. For example, the first group described with reference FIG. 14 corresponds to the premium applications described in FIG. 3. As shown in FIG. 14A, a specific application, which is relocatable but undeletable, is moved to an area 1420 indicating a trash can. At this point, the specific application can be relocated by using the remote controller 1410 and the indicator 1411.

However, unlike the description of FIG. 13, the display apparatus 1400 displays a message 1430 guiding the user that the selected application cannot be deleted as shown in FIG. 14B. Therefore, the user can reattempt to edit the corresponding application by only repositioning the selected application. However, one embodiment of the present invention can avoid relocating the selected application to the above-described area 1420.

Figure 15A:
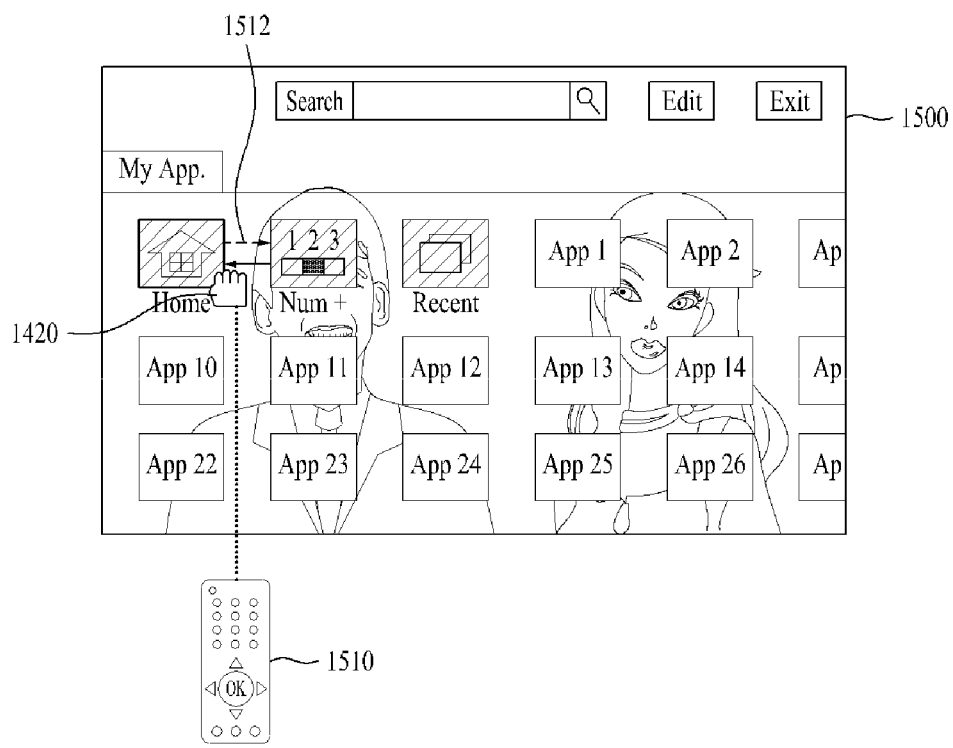
FIGS. 15A and 15B are display screens illustrating a second group of non-editable application groups in the second mode of the application browser according to an embodiment of the present invention.
Figure 15B:
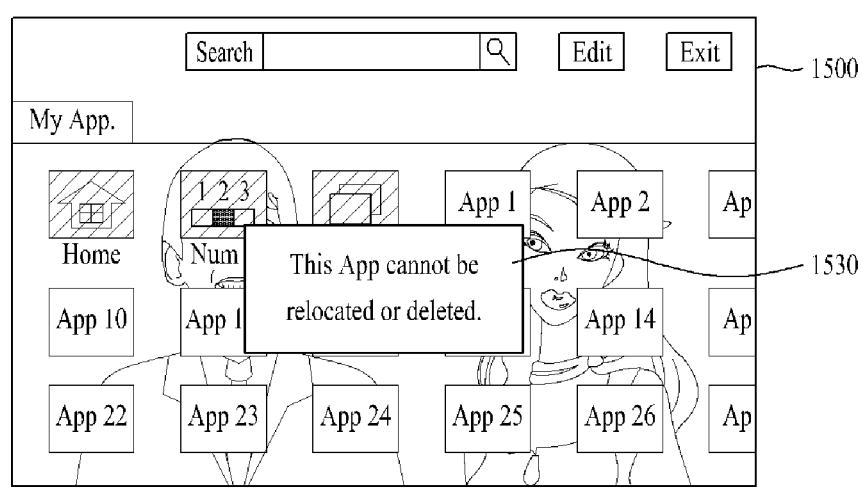

Next, FIGS. 15A and 15B are display screens illustrating a second group of non-editable application groups in the second mode of the application browser according to an embodiment of the present invention. For example, the second group described in FIG. 15 corresponds to the system applications of FIG. 3. As shown in FIG. 15A, the display apparatus 1500 outputs an application browser screen. At this point, when the user wants to move (or relocate) the system application by using a remote controller 1510 and indicator 1511, the system application is moved only within a very small range. Therefore, the user can recognize that the movement (or repositioning) of the system application itself cannot be performed.

If the user repeatedly attempts to edit the system application for more than a predetermined range (e.g., 5 times and more), the display apparatus 1500 displays a message 1530 notifying the user that the corresponding application cannot be repositioned or deleted as shown in FIG. 15B.

Figure 16A:
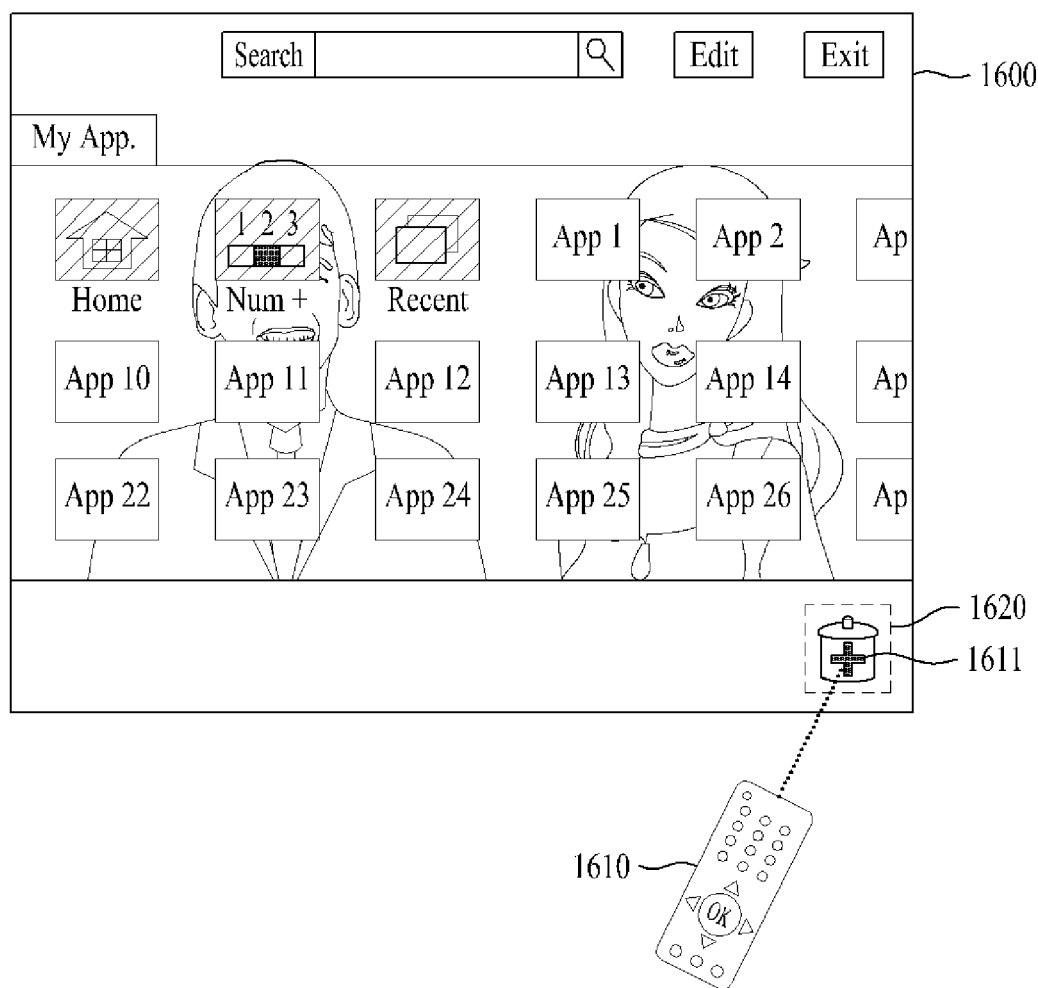
FIGS. 16A to 16D are display screens illustrating recovering deleted applications in the application browser according to an embodiment of the present invention.

Next, FIGS. 16A to 16D are display screens illustrating processes for recovering deleted applications in the application browser according to an embodiment of the present invention. As shown in FIG. 16A, the display apparatus 1600 outputs an application browser screen. At this point, the user can view the deleted applications. Accordingly, the user can determine whether or not to recover one or more of the deleted applications. Therefore, as shown in FIG. 16A, the user selects the graphic data 1620 enabling the user to view the deleted applications by using the remote controller 1610 and the indicator 1611.

Figure 16B:
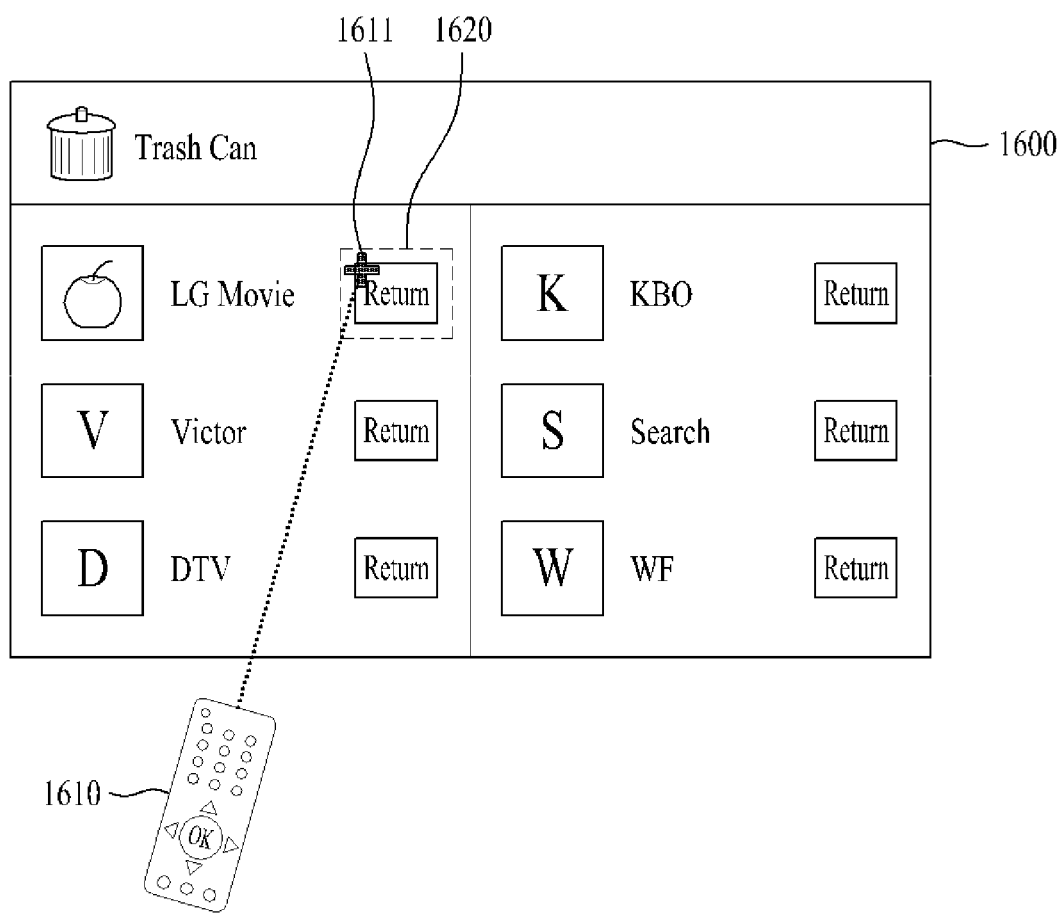

Subsequently, as shown in FIG. 16B, the display apparatus 1600 displays a list of the deleted applications. For example, the position of each deleted application is aligned based upon a time order. At this point, the user selects a recover or return button 1620 for a specific application by using the remote controller 1610 and the indicator 1611.

Meanwhile, according to an embodiment of the present invention, link information, URL information, and so on, which can re-download the deleted applications, are pre-stored in the memory 150. Therefore, the deleted applications can be recovered much more quickly. Further, when an arbitrary application is deleted, the link information, URL information, and so on can be permanently deleted from the memory.

Figure 16C:
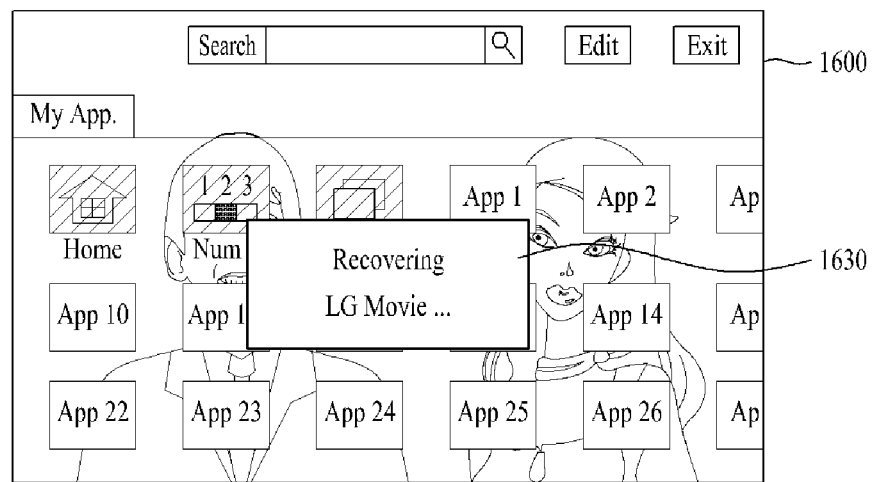

Subsequently, as shown in FIG. 16C, while the display apparatus 1600 recovers the specific selected application (i.e., while the display apparatus 1600 downloads the corresponding application after accessing the respective link (URL)), the display apparatus 1600 outputs a message 1630 notifying the user of the above-described process.

Figure 16D:
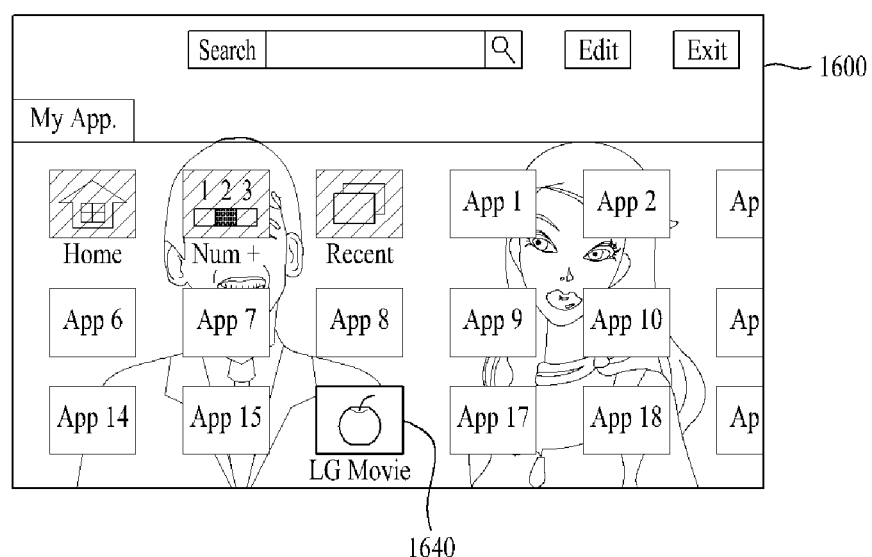

Finally, when the recovery of the deleted application is completed, the display apparatus 1600 automatically edits the application browser as shown in FIG. 16D. More specifically, the display apparatus 1600 positions the icon of the recovered application in the last portion of the list of applications.

Figure 17A:
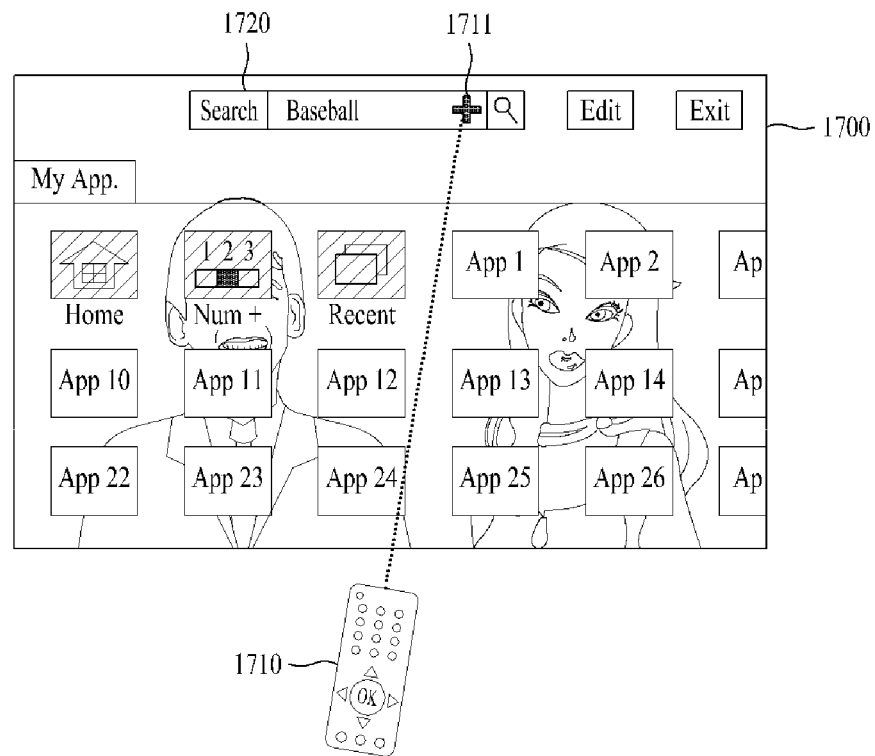
FIGS. 17A and 17B are display screens illustrating a search function provided by the application browser according to an embodiment of the present invention.
Figure 17B:
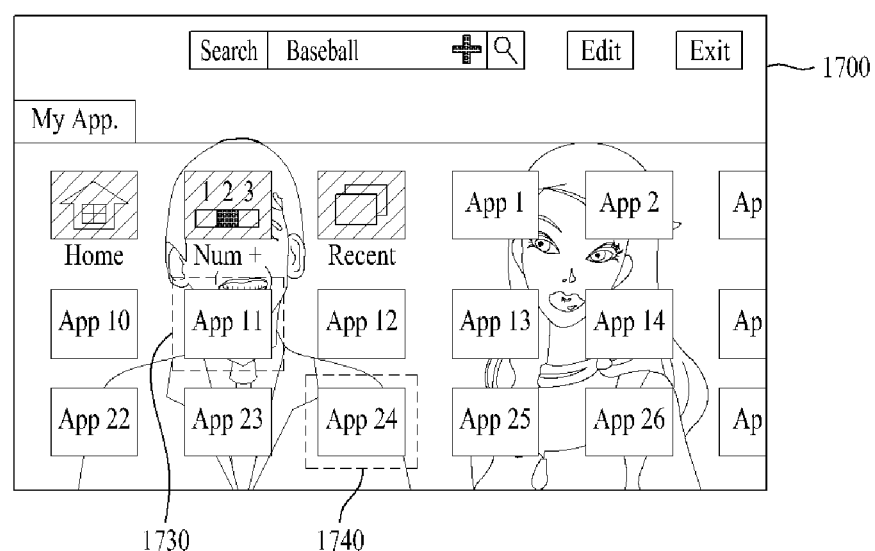

Next, FIGS. 17A and 17B are display screens illustrating a search function provided by the application browser according to an embodiment of the present invention. In this example, the Search option 1130 shown in FIG. 11 is selected. At this point, as shown in FIG. 17A, the user inputs a title of an application that he or she wants to search by using the remote controller 1710 and the indicator 1711. Also, the remote controller 1710 can include a QWERTY keyboard, or a virtual QWERTY keyboard can be displayed on the display screen of the display apparatus 1700. In the example shown in FIG. 17A, the term "baseball" is input as the keyword.

At this point, as shown in FIG. 17B, the display screen of the display apparatus 1700 displays only the applications 1730 and 1740 carrying metadata associated with the corresponding keyword "baseball" are highlighted. Thus, this method is applicable when the corresponding applications carry the respective metadata. This will be described in more detail with reference to FIG. 18.

In more detail, FIG. 18 is a table illustrating metadata of a pre-stored application according to an embodiment of the present invention. System applications, premium applications, and downloaded applications carry diverse types of metadata. For example, the metadata correspond to information that can identify application titles, application types, and so on. Thus, the metadata shown in FIG. 18 are merely exemplary. Also, depending upon modifications in the design made by the user, the present invention may also be applied to applications including a wider range of metadata.

Figures 19A, 19B:
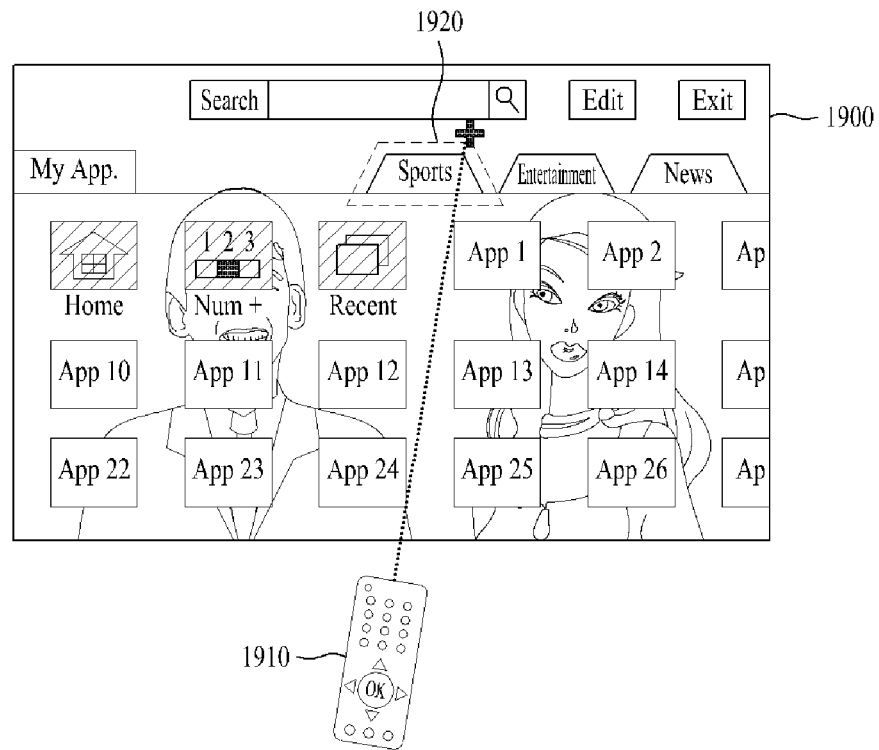
FIGS. 19A and 19B are display screens illustrating a filtering function for each category provided by the application browser according to an embodiment of the present invention.

Next, FIGS. 19A and 19B are display screens illustrating a filtering function for each category provided by the application browser according to an embodiment of the present invention. First of all, as shown in the example of FIG. 18, each of the pre-stored applications carry metadata. At this point, as shown in FIG. 19A, when the user selects a specific application type (e.g., Sports) 1920 by using the remote controller 1910 and the indicator 1911, only applications carrying metadata corresponding to Sports are highlighted on the display screen of the display apparatus 1900.

Further, unlike the example shown in FIG. 19A, according to an embodiment of the present invention, graphic data categorizing the applications by each type (e.g., Sports, News, Games, etc.) can be displayed as shown in FIG. 19B.

Figure 20A:
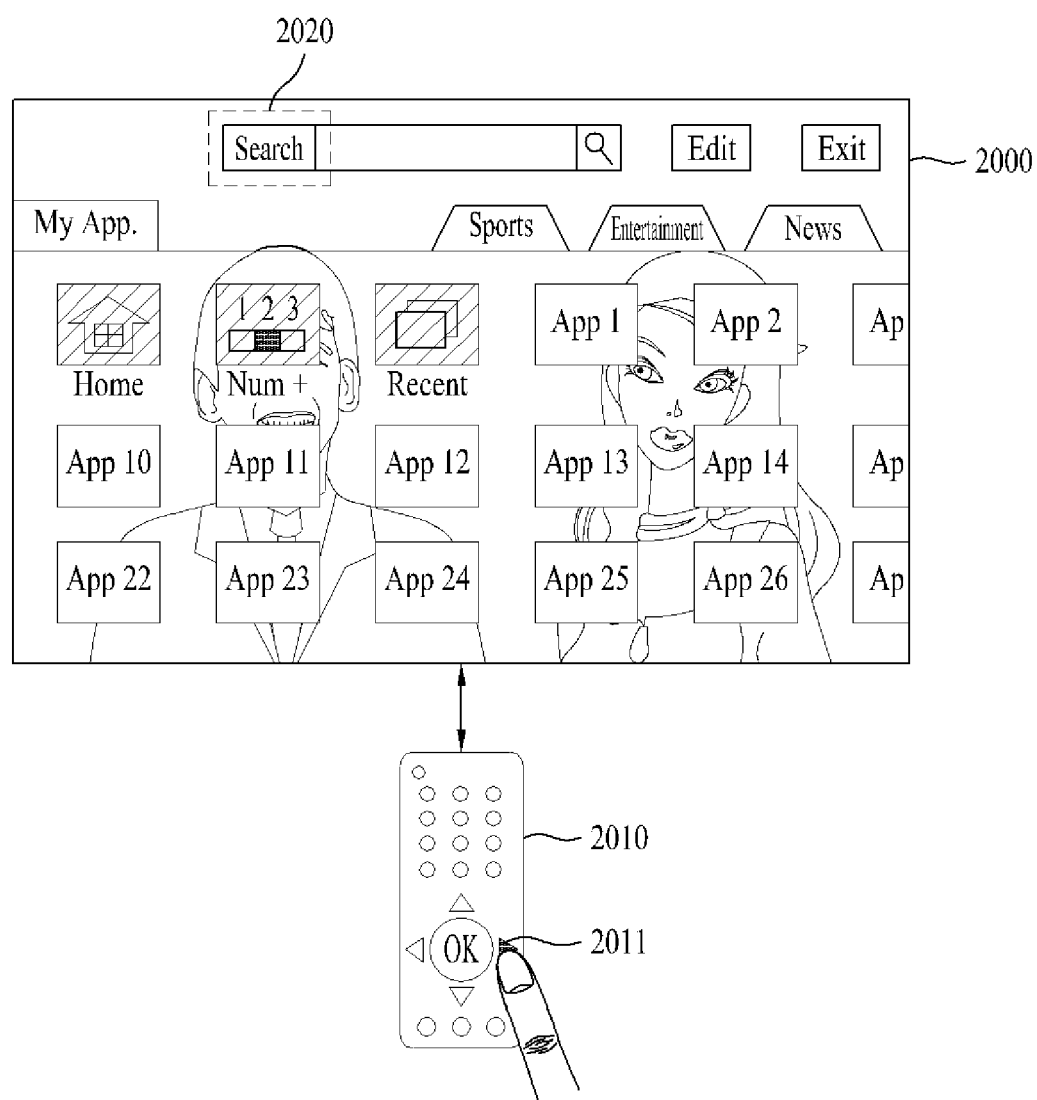
FIGS. 20A and 20B are display screens illustrating controlling the application browser by using a remote controller transmitting IR signals according to an embodiment of the present invention.
Figure 20B:
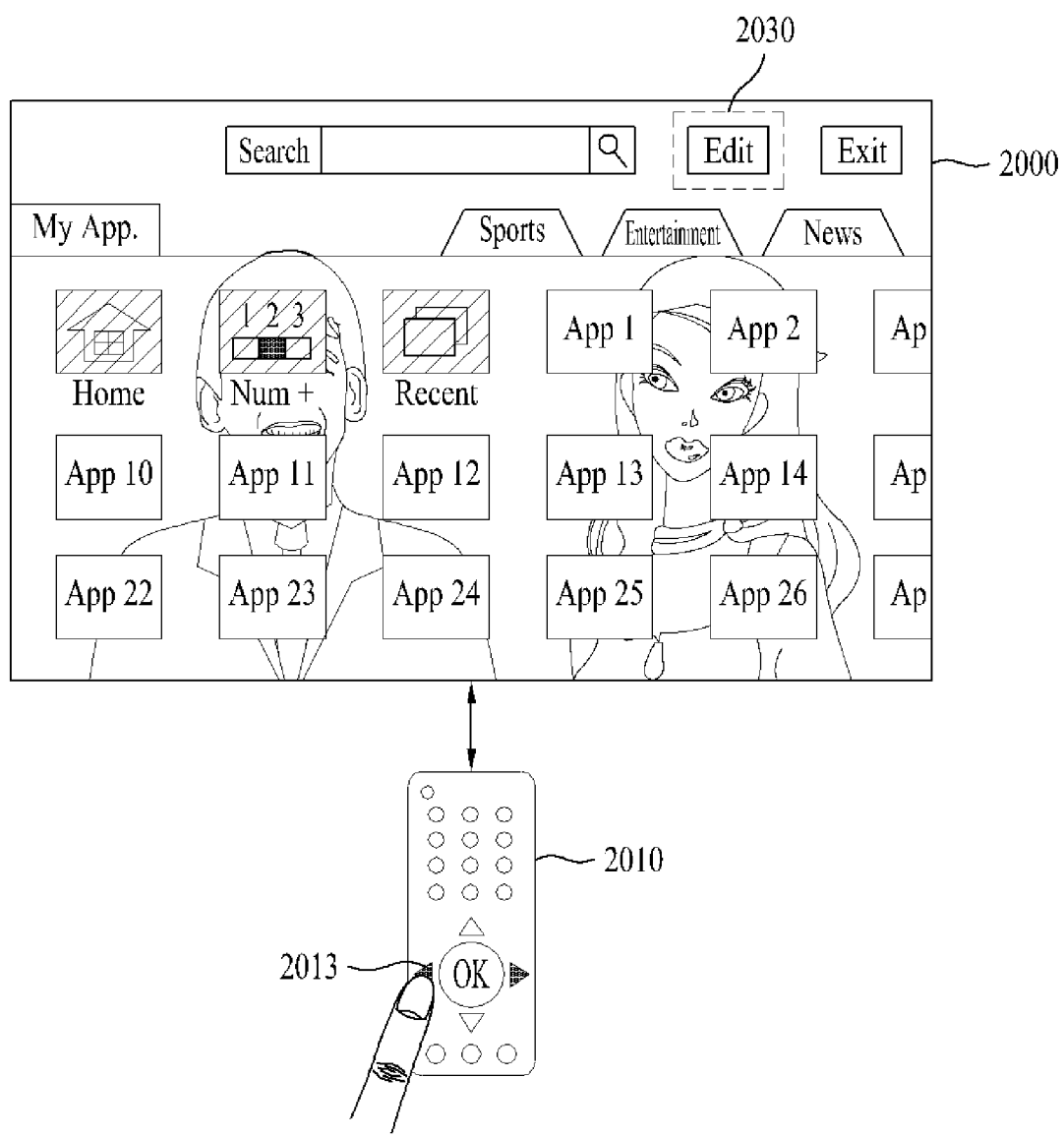

Next, FIGS. 20A and 20B are display screens illustrating processes for controlling the application browser according to an embodiment of the present invention by using a remote controller transmitting IR signals. The previous description assumed that RF signals were transmitted in accordance with the motions of the remote controller. However, according to another embodiment of the present invention, the application browser can be controlled even when IR signals are transmitted, regardless of the motions of the remote controller. This will now be described with reference to FIGS. 20A and 20B.

As shown in FIG. 20A, the display apparatus 2000 displays an area 2020 where the indicator is currently located. At this point, when a specific arrow button (e.g., arrow indicating Right) 2011 of the remote controller 2010 is pressed, the display screen is changed to the application browser screen shown in FIG. 20B.

More specifically, as shown in FIG. 20B, among a plurality of selectable options, the display apparatus 2000 displays an area 2030 shifted to the right by one block by highlighting the selected area 2030. Conversely, as shown in FIG. 20B, when a specific arrow button (e.g., arrow indicating Left) 2013 of the remote controller 2010 is pressed, the display screen returns to the application browser screen of FIG. 20A. Accordingly, the user can control the application browser screen by using only the arrow buttons of the remote controller according to an embodiment of the present invention.

Figure 21A:
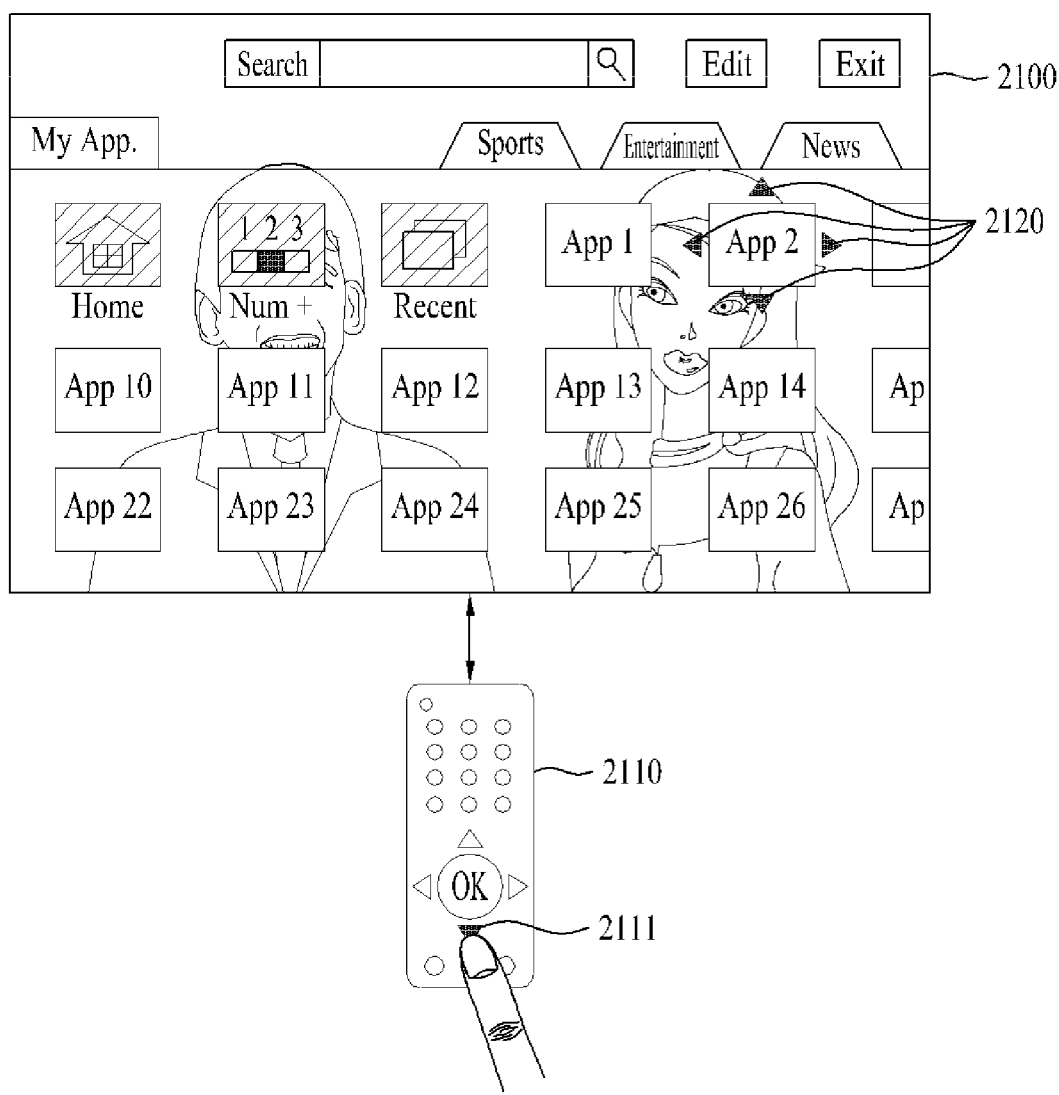
FIGS. 21A to 21C are display screens illustrating editing the application browser using a remote controller transmitting IR signals according to an embodiment of the present invention.
Figure 21B:
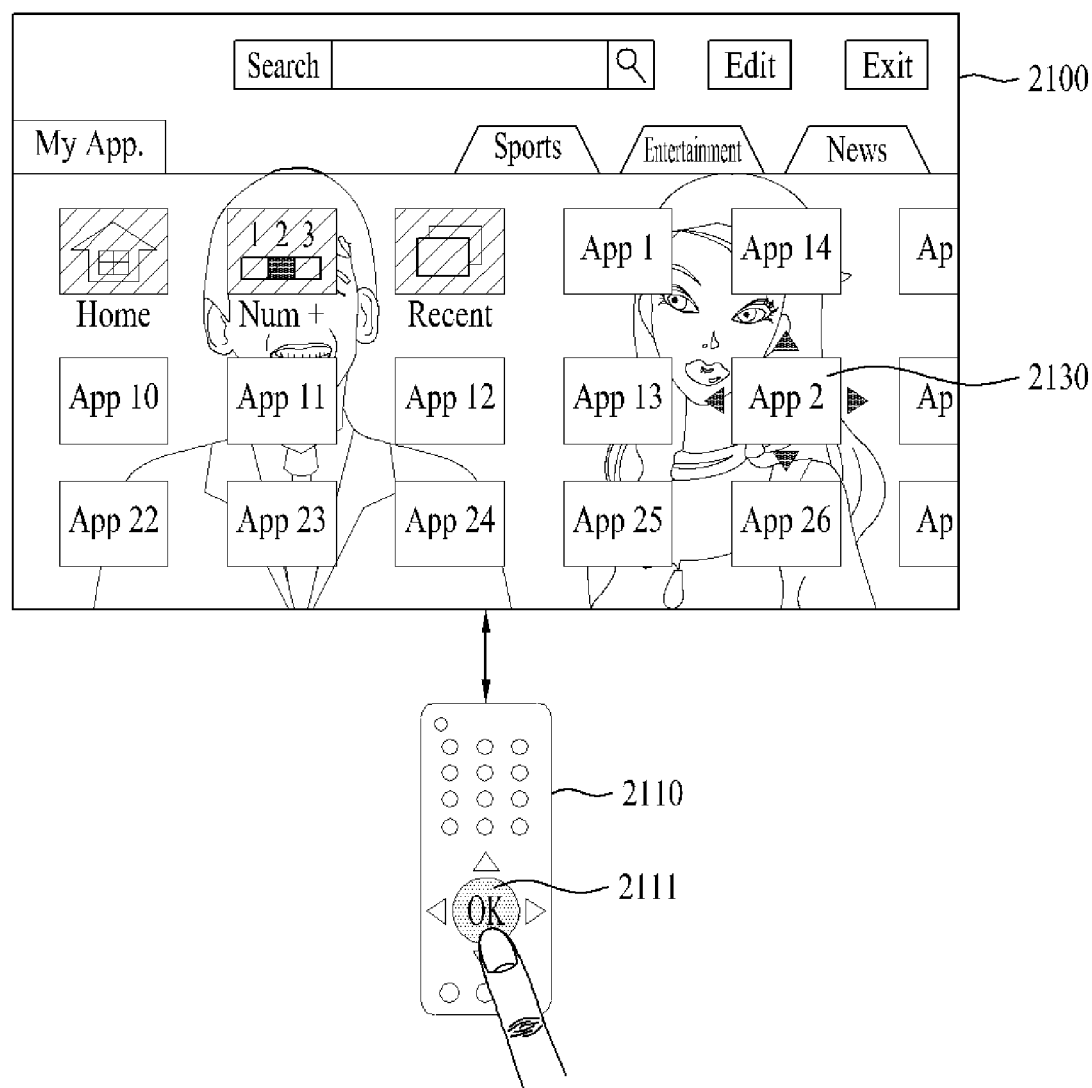
Figure 21C:
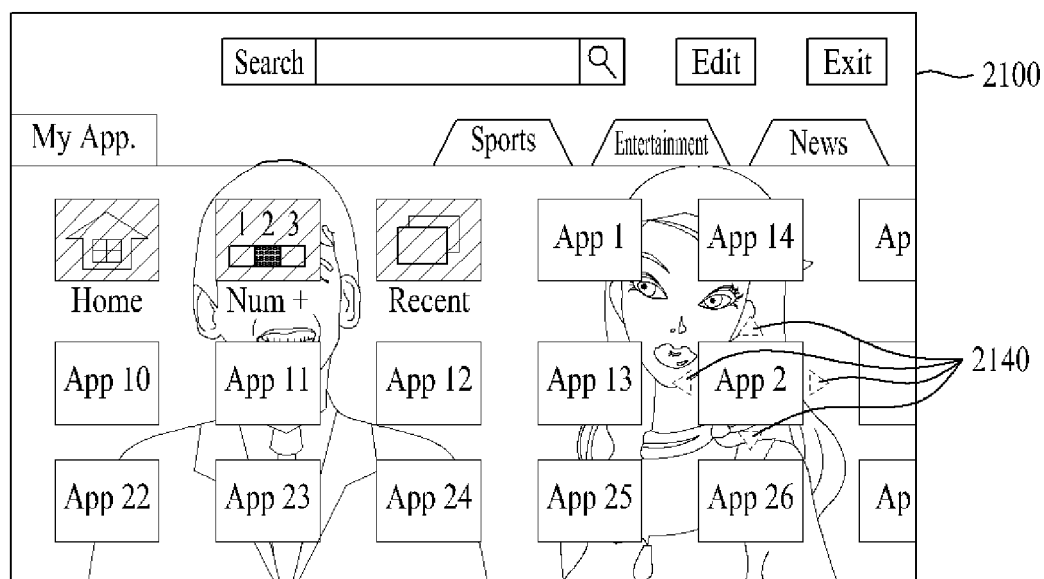

Next, FIGS. 21A to 21C are display screens illustrating processes for editing the application browser by using a remote controller transmitting IR signals according to an embodiment of the present invention. First of all, in this example, the Edit mode 1140 shown in FIG. 11 is assumed to be selected. At this point, as shown in FIG. 21A, the display apparatus 2100 displays the direction indicators 2120 to which the specific application #2 (App 2) can be moved. When a specific arrow button (e.g., arrow indicating Down) 2111 of the remote controller 2110 is pressed, the display screen is changed to the application browser screen shown in FIG. 21B.

More specifically, as shown in FIG. 21B, the specific application #2 (App 2) 2130 is shifted downwards by one block. At this point, when a specific OK button 2112 of the remote controller 2110 is pressed, the display screen is changed to the application browser screen shown in FIG. 21C.

More specifically, as shown in FIG. 21C, since the Edit mode is completed, arrow indicators 2140 are no longer displayed. Therefore, the user can easily verify that the specific application has been finally moved to the location wanted by the user.

Figure 22:
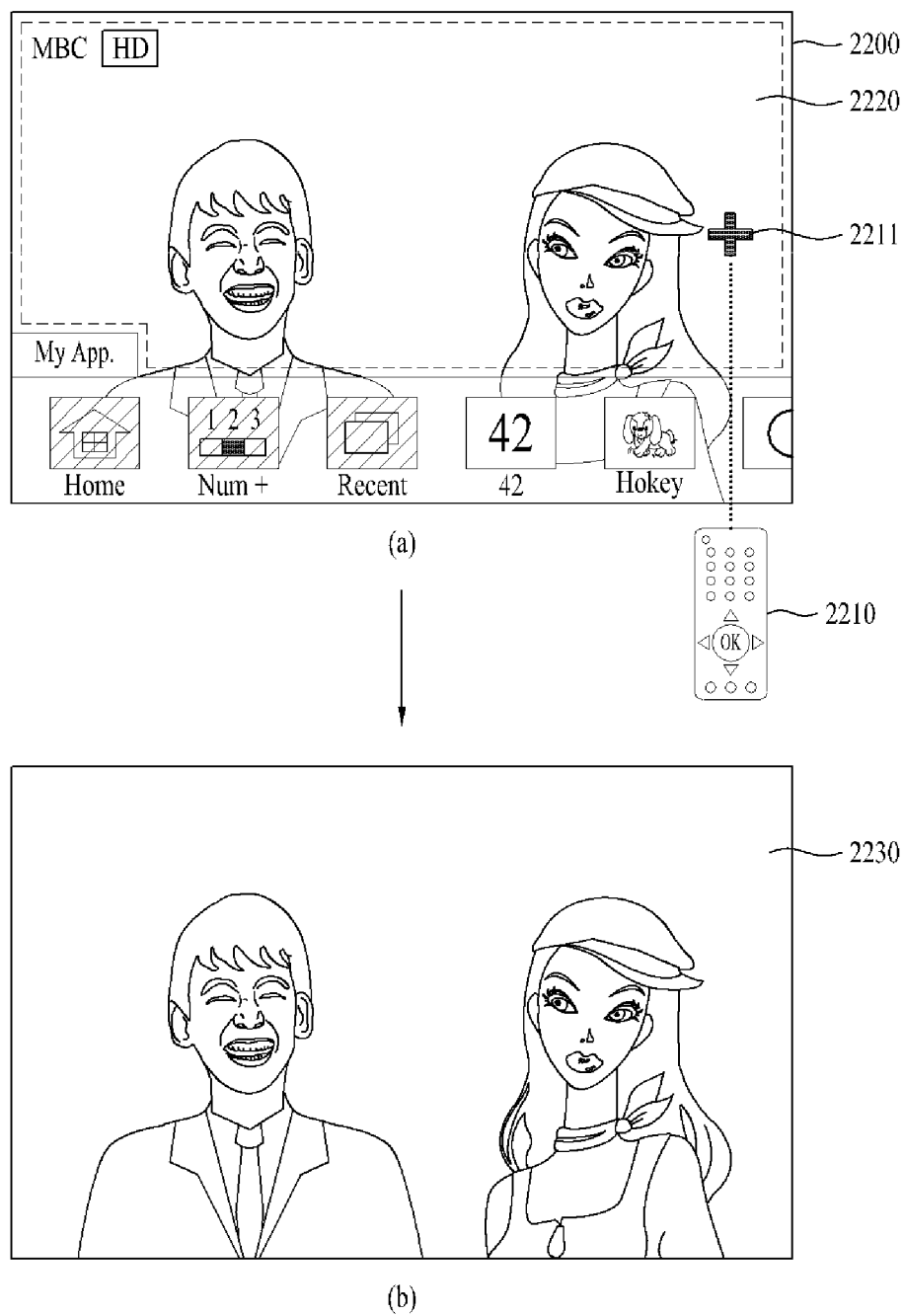

FIGS. 22 to 24 are display screens illustrating processes of returning to a previous screen from the application browser according to an embodiment of the present invention. As shown in FIG. 22(*a*), the display apparatus 2200 outputs raw broadcast video data that does not interfere with the application browser to a first area 2220. At this point, the display apparatus 2200 interrupts the execution and display of the application browser, when the indicator 2211 of the remote controller 2210 is located in the first area 2220 as shown in FIG. 22(*b*), thereby displaying the broadcast video data on the entire area 2230 of the display screen.

As shown in FIG. 23(*a*), the display apparatus 2300 interrupts the execution and display of the application browser, when the indicator 2311 of the remote controller 2310 is located in the first area 2320, thereby displaying the broadcast video data on the entire area 2330 of the display screen as shown in FIG. 23(*b*).

As shown in FIG. 24(*a*), the display apparatus 2400 outputs an Exit mode option 2420 along with the Edit mode option within the application browser. At this point, the display apparatus 2400 interrupts the execution and display of the application browser, when the indicator 2411 of the remote controller 2410 is located over the Exit mode option 2420, thereby displaying the broadcast video data on the entire area 2430 of the display screen as shown in FIG. 24(*b*).

Figure 25:
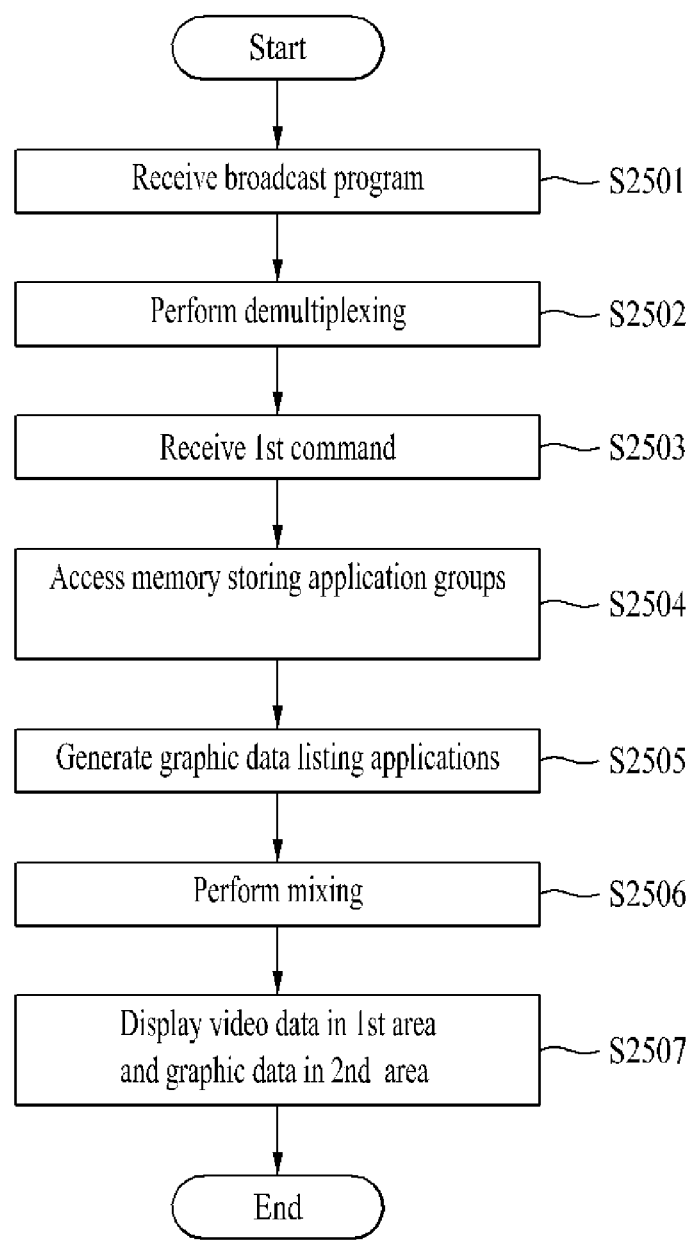
FIG. 25 is a flow chart illustrating a method for controlling an application browser of the display apparatus according to an embodiment of the present invention.

Next, FIG. 25 is a flow chart illustrating a method for controlling an application browser performed by the display apparatus according to an embodiment of the present invention. In this embodiment, FIG. 25 may be interpreted based upon the embodiments described with reference to FIGS. 1 to 24.

The display apparatus according to an embodiment of the present invention receives a broadcast program from a broadcasting station (S2501). Herein, for example, the broadcast program includes audio data and video data. Furthermore, according to an embodiment of the present invention, the display apparatus can also receive general contents through a network interface, without having to receive a broadcast program from the broadcasting station.

The display apparatus demultiplexes the received video data and the audio data (S2502), and then receives a first command requesting for a list of multiple applications (S2503). The display apparatus accesses a memory including an editable first application group and a non-editable second application group (S2504). Then, the display apparatus generates graphic data indicating the list of multiple applications (S2505). According to an embodiment of the present invention, the graphic data indicating the applications belonging to the first application group and the graphic data indicating the applications belonging to the second application group are designed differently. As shown in FIG. 5, according to an embodiment of the present invention, the system applications and the downloaded applications are set to have different contrast ratios.

The display apparatus then mixes the video data of the broadcast program with the generated graphic data (S2506). Thereafter, the display apparatus displays the video data in a first area and displays the graphic data in a second area (S2507). The first area may, for example, include the second area. This can be interpreted and understood by referring to the above-described FIG. 5 or 11.

The display apparatus according to another embodiment of the present invention further includes receiving a second command initiating an Edit mode, determining whether a selected specific application belongs to the first application group or to the second application group, and displaying a first area, to which an icon corresponding to the selected specific application can be moved, or a second area, where applications may be deleted, by graphics different from those of the remaining areas. This can be understood and interpreted by referring to FIGS. 12 to 15.

Meanwhile, according to yet another embodiment of the present invention, the display apparatus further includes removing the specific application from the memory, when an icon corresponding to the specific application is positioned in the second area, and storing address information, which can download the specific application, in the memory. This can be understood and interpreted by referring to FIG. 16.

Furthermore, according to yet another embodiment of the present invention, the display apparatus further includes receiving a third command for categorizing multiple applications stored in the memory based upon the respective application types, accessing the memory and categorizing the applications by the respective application type, generating graphic data including icons corresponding to each application categorized by the respective application type, displaying icons corresponding to each of at least one application belonging to a first application type in a first sub-area, and displaying icons corresponding to each of at least one application belonging to a second application type in a second sub-area. Here, the applications carry metadata for identifying the application types. This can be understood and interpreted by referring to FIGS. 18 and 19.

Hereinafter, a Recent function respective to multiple groups according to an embodiment of the present invention will be described in detail with reference to FIGS. 26 to 37. Further, a "Recent" application is assumed to be selected among the system applications shown in FIG. 3.

Moreover, referring to both FIGS. 1 and 2, the process of the display apparatus according to an embodiment of the present invention performing the Recent function respective multiple applications will now be described in detail.

The tuner 110 receives a broadcast program from a broadcasting station. Here, for example, the broadcast program includes audio data and video data. Furthermore, the demultiplexer 120 demultiplexes the received audio data and video data. According to another embodiment of the present invention, the display apparatus receives the general contents through a network interface 130 instead of the tuner 110.

The memory 150 stores data listing at least one or more contents each having a previous execution history. Here, for example, the content corresponds to a channel or another item. The memory 150 will be described in more detail later with reference to FIGS. 26 to 29.

The user interface 170 receives a command associated with data stored in the memory 150. Herein, for example, among the diverse data stored in the memory 150, the command corresponds to a signal requesting listing information about contents of a specific group.

The OSD generator 162 included in the controller 160 uses the data stored in the memory 150, so as to generate graphic data listing the at least one or more contents. Thus, an embodiment of the present invention includes designing the OSD generator 162 as a separate module of the controller 160. The mixer 167 included in the controller 160 then mixes the video data of the broadcast program with the graphic data generated by the OSD generator 162. Similarly, an embodiment of the present invention includes designing the mixer 167 as a separate module of the controller 160.

The controller 160 performs controlling operations enabling the mixed video data and graphic data to be output through the display module 180. This process will be described in more detail later with reference to FIG. 30.

Furthermore, according to another embodiment of the present invention, the user interface 170 receives a command for selecting an area where a channel list and an item list are not displayed. At this point, the controller 160 controls operations so that the output of the graphic data listing applications is stopped and also so that the video data can be output in a full screen. This process will be described in more detail later with reference to FIGS. 35a and 35b.

Next, FIG. 26 is a table illustrating a data format for providing a Recent function respective to multiple groups according to an embodiment of the present invention. According to an embodiment of the present invention, the "Recent" function is newly defined. For example, among the plurality of contents belonging to a first group (channel) and to a second group (remaining items), the "Recent" function corresponds to a function enabling channels and items having a history of recent usage to be quickly listed. For example, two factors are used in order to execute the above-described Recent function.

First of all, an extraction standard for determining a channel or item having a history of recent usage is used. Thereafter, when a channel or item having a history of recent usage is decided, a standard for determining which information is to be displayed on the list is used.

As shown in FIG. 26, when the display apparatus according to an embodiment of the present invention is maintained to be tuned to an arbitrary first channel for more than a predetermined period of time (e.g., 10 seconds or more), the corresponding channel is considered to have a recent access history. Accordingly, the first channel is stored in a first list associated with the Recent function.

Also, when the arbitrary channel is included in the first list, a thumbnail image, a channel number, or a channel name respective to the arbitrary first channel are also mapped to the corresponding channel and stored in the first list. Meanwhile, acquiring a thumbnail image of a channel included in the first list will be described in more detail with reference to FIG. 27.

In addition, as shown in FIG. 26, an extraction standard for the remaining items other than the channel is generally determined based upon whether or not each item has a recently used history. Also, recently executed items are stored in a second list associated with the Recent function. For example, such items include at least one of Moving Picture, Still Image, Music, Application, Web, Setting, Input Device.

Furthermore, as shown in FIG. 26, according to an embodiment of the present invention, the list of channels having a recently tuned history and the list of items having a recently used history are designed to be separately managed. This will be described in more detail with reference to FIGS. 28 and 29.

Next, FIG. 27 is a table illustrating another data format for providing a Recent function respective to multiple groups according to an embodiment of the present invention. As described above, information on channels that are tuned for more than a predetermined period of time is listed. Also, the data format shown in FIG. 27 is stored in the memory 150, and the priority levels shown in FIG. 27 are merely exemplary. Therefore, the present invention is not limited only to the priority levels shown in FIG. 27.

According to an embodiment of the present invention, when a specific channel is tuned for more than a predetermined period of time, an image of the display screen that is currently being displayed is captured so as to create a thumbnail image. Also, according to another embodiment of the present invention, main thumbnail image data respective to a specific broadcast program that is currently being displayed is received from a content provider (CP) and stored.

Furthermore, according to yet another embodiment of the present invention, when a specific channel is tuned for more than a predetermined period of time, graphic data corresponding to a channel logo or a channel number can be stored in the list.

Next, FIGS. 28 and 29 are tables illustrating yet another data format for providing a Recent function respective to multiple groups according to an embodiment of the present invention. For example, a list of recently accessed channels (i.e., Channel list) and a list of recently accessed items (i.e., Item list) can be generated based upon the data shown in FIGS. 26 and 27. More particularly, as shown in FIG. 28, according to an embodiment of the present invention, the channel list is stored in a first address of the memory, and the item list is stored in a second address of the memory. Therefore, as shown in FIG. 28, the user can verify the list of channels he or she has recently accessed and the list of other items.

As shown in FIG. 28, for the Channel list, the history of the recently tuned channels is listed by an order of channel 7 (CH7), channel 5 (CH5), channel 4 (CH4), channel 11 (CH11), . . . , channel 9 (CH9). Meanwhile, for the Other Item list (which excludes the channels), the history of the recently tuned items is listed by an order of Acebook, a website, a still image (File Name: KIM), a Scheduled Sleep Mode, . . . , a still image (File Name: YS).

Furthermore, based upon the current time point the user is assumed to be viewing a program of Channel 8 and that the user has watched a moving picture file entitled "Movie", the list of memory addresses shown in FIG. 28 is changed to the list of memory addresses shown in FIG. 29.

More specifically, as shown in FIG. 29, Channel 8 (CH8) is given the highest priority level in the Channel list of the first memory address (i.e., first address of the memory). Also, the moving picture file entitled "Movie" is given the highest priority level in the Item list of the second memory address (i.e., second address of the memory).

Figure 30:
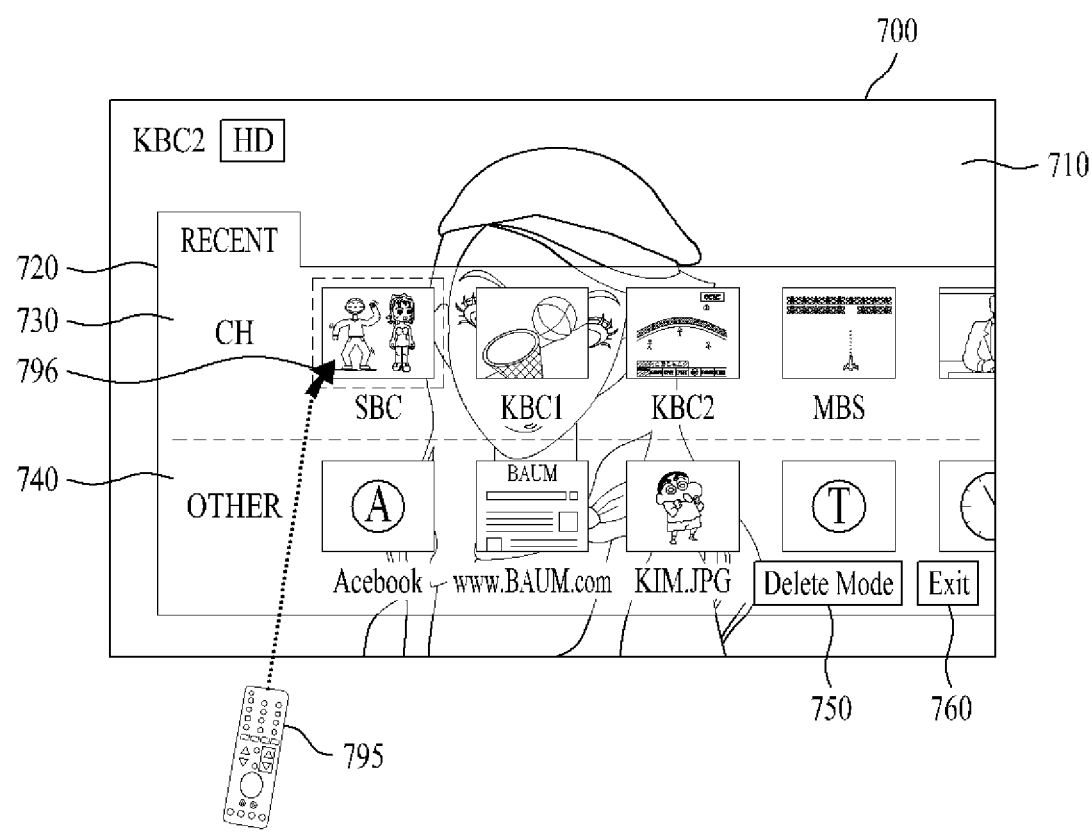
FIG. 30 is a display screen illustrating graphic data where the Recent function respective to multiple groups is executed according to an embodiment of the present invention.

Next, FIG. 30 is a display screen illustrating graphic data where the Recent function respective to multiple groups according to an embodiment of the present invention is executed. When the above-described Recent function is executed, the display apparatus 700 according to an embodiment of the present invention displays two different types of video data in two areas, as shown in FIG. 30.

Among the video data, general broadcast data are output in a first area 710, and a channel list (CH) 730 and an item list (OTHER) 740, each stored in the respective addresses of the memory, are output in a second area 720.

In the channel list 730, thumbnail image data respective to each channel are displayed by the order of SBC, KBC1, KBC2, MBS. Further, the display order corresponds to the order of accessed channels starting from the channel most recently accessed by the user.

In the item list 740, thumbnail image data respective to each icon or graphic are displayed by the order of Acebook, a website (e.g., BAUM), a still image (File Name: KIM), "T" application. Further, the display order corresponds to the order of accessed items starting from the item most recently accessed by the user.

Additionally, a Delete Mode 750 shown in FIG. 30 corresponds to an option enabling the user of the display apparatus 700 to quickly delete unwanted contents from the above-described channel list 730 and item list 740. The Delete Mode will be described later in more detail with reference to FIG. 34.

Furthermore, the diverse options shown in FIG. 30 may be selected using the remote controller 795 according to an embodiment of the present invention. In addition, feedback graphic data 796 respective to an input signal of the remote controller 795 are displayed on the display screen. For example, with respect to the motion of the remote controller 795, when the feedback graphic data 796 are positioned over an Exit option 760, the user can return to the previous display screen. For example, all of the lists displayed in the second area 720 disappear.

Therefore, as shown in FIG. 30, when the display apparatus displays the broadcast data and the graphic data listing channels and items at the same time, the user can verifying the broadcast program, which is currently being received, while easily verifying a history of previous usage of multiple content groups at the same time.

In addition, details of the remote controller 795 shown in FIG. 30 can be understood by referring to FIGS. 6 and 7. For example, by moving the remote controller shown in FIGS. 6 and 7, the user can select options displayed in a Recent list. Alternatively, by using a user input unit (e.g., arrow buttons) of the remote controller, the user can select options displayed in a Recent list.

Next, FIG. 31 includes display screens illustrating a first process of executing the Recent function respective to multiple groups according to an embodiment of the present invention. In particular, FIG. 31 illustrates a process where the user selects a specific channel, which the user has already recently accessed.

First of all, as shown in FIG. 30, a display screen of a broadcast program is output in the first area and a list of recently used contents respective to two groups is output in the second area. Here, for example, the second area is included in the first area. Also, for the overlaying portion of the first area and the second area, the broadcast screen is processed as a non-transparent graphic. Furthermore, for example, the two groups respectively correspond to a group of channels and a group of items.

As shown in FIG. 31(a), the user can use the remote controller 1095 so as to select a specific SBC channel 1097 from the list of recently tuned channels. For example, when an indicator 1096, which changes its position in accordance with the motion of the remote controller 1095, is placed over the specific SBC channel 1097 for more than a predetermined period of time, the specific SBC channel is selected. Alternatively, when the indicator 1096 is placed over the specific SBC channel 1097 and then another specific button (e.g., OK button) is pressed, the specific SBC channel is selected.

Therefore, as shown in FIG. 31(b), the display apparatus can be tuned to channel SBC 1097 instead of the channel tuned in FIG. 31(a). Furthermore, according to an embodiment of the present invention, the channel list and the item list can disappear at the same time, and thus the user's convenience is enhanced.

Next, FIG. 32 includes display screens illustrating a second process of executing the Recent function respective to multiple groups according to an embodiment of the present invention. Most particularly, FIG. 32 illustrates a process where the user selects a specific item, which the user has already recently accessed.

First of all, as shown in FIG. 30, a display screen of a broadcast program is output in the first area and a list of recently used contents respective to two groups is output in the second area. Here, for example, the second area is included in the first area. Also, for the overlaying portion of the first area and the second area, the broadcast screen is processed as a non-transparent graphic. Furthermore, the two groups respectively correspond to a group of channels and a group of items, for example.

As shown in FIG. 32(a), the user can use the remote controller 1195 to select a specific application 1197 from the list of recently executed items. For example, when an indicator 1196, which changes its position in accordance with the motion of the remote controller 1195, is placed over the specific application 1197 for more than a predetermined period of time, the specific application is selected. Alternatively, when the indicator 1196 is placed over the specific application 1197 and then another specific button (e.g., OK button) is pressed, the specific application is selected.

Therefore, as shown in FIG. 32(b), the display apparatus can execute the specific application instead of the item executed in FIG. 32(a). Furthermore, as opposed to FIG. 31, which corresponds to an embodiment that maintains a Broadcast mode, FIG. 32 corresponds to an embodiment that is changed from the Broadcast mode to an Execution mode.

Next, FIG. 33 includes display screens illustrating a third process of executing the Recent function respective to multiple groups according to an embodiment of the present invention. In the above-described FIGS. 31 and 32, the number of contents selectable by the user from the Channel and Item lists was limited to one (i.e., only one channel or only one item can be selected from the Channel and Item lists). Conversely, FIG. 33 illustrates a specific channel and a specific item that can both be selected from the Channel and Item lists.

First of all, while the indicator 1296, which changes its position in accordance with the motion of the remote controller 1295 shown in FIG. 33(a), is placed over a specific broadcast channel 1297, if an OK button of the remote controller 1295 is pressed twice, the display apparatus is immediately tuned to the specific broadcast channel 1297.

However, if the OK button of the remote controller 1295 is pressed only once, while the indicator 1296 is placed over the specific broadcast channel 1297, the display apparatus is not tuned immediately. Thus, a specific item can be additionally selected from the Item list and not from the Channel list.

Accordingly, when the specific broadcast channel 1297 is highlighted, if the OK button of the remote controller 1295 is pressed twice, while the indicator 1296 is placed over a specific application 1298, the display apparatus can be shifted to a Double Mode as shown in FIG. 33(b).

As shown in FIG. 33(b), the display apparatus can display a broadcast program received through the selected specific broadcast channel 1297 in a left-side area of the display screen. Also, the display apparatus can execute the selected specific application 1298 in a right-side area of the display screen. Further, an embodiment of the present invention includes adjusting positions and shapes of each area.

FIGS. 34A to 34D are display screens illustrating a fourth process of executing the Recent function respective to multiple groups according to an embodiment of the present invention. The above-described drawings illustrate the process of simultaneously displaying a list of channel groups and a list of item groups stored in the memory, when the Recent function according to an embodiment of the present invention is being executed. However, in some instances, when an unwanted content exists in each list, a solution for quickly deleting such unwanted contents is used as will be described in detail with reference to FIG. 34.

Figure 34A:
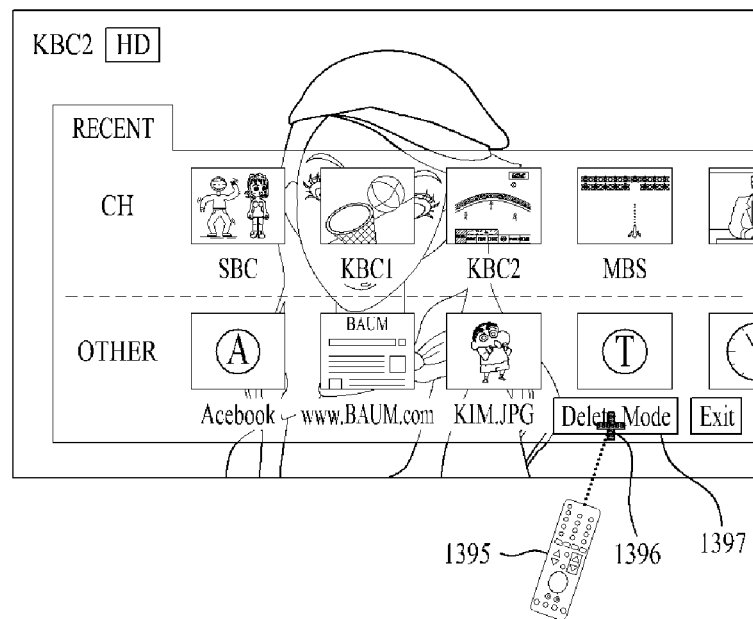
FIGS. 34A to 34D include display screens illustrating a fourth process of executing the Recent function respective to multiple groups according to an embodiment of the present invention.

When the Recent function according to an embodiment of the present invention is executed, a list of recently tuned channels and a list of recently executed items are displayed as shown in FIG. 34A. Reference may be made to FIG. 30 for supplementary description of the above-described process.

Figure 34B:
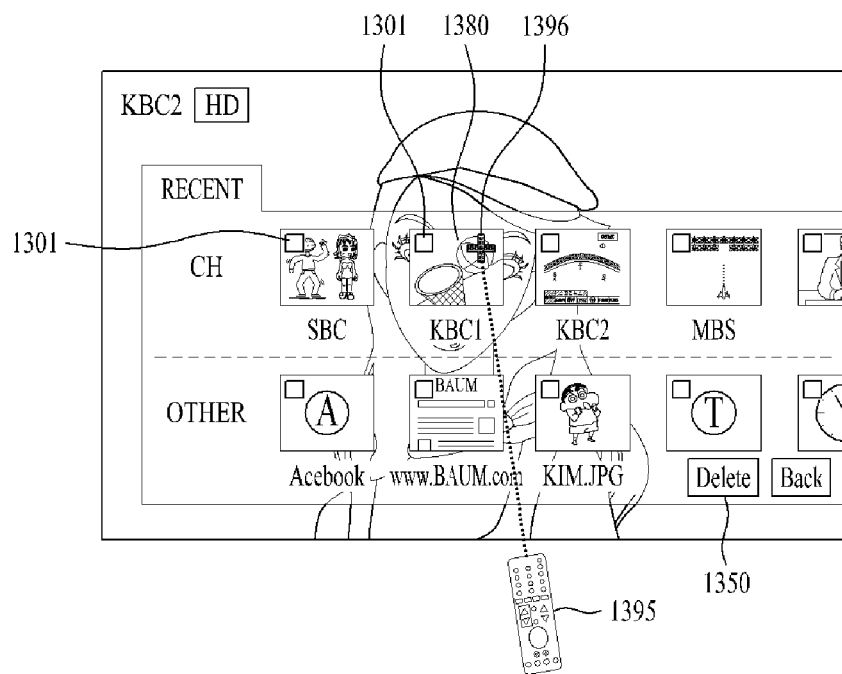

At this point, as shown in FIG. 34A, when the indicator 1396 of the remote controller 1395 is placed over an area 1397 enabling the user to select the Delete Mode, the graphic data of all contents included in the list are changed (or modified) as shown in FIG. 34B. When comparing FIG. 34A with FIG. 34B, the Delete Mode area 1397 is changed to a Delete button 1350.

Moreover, for example, as shown in FIG. 34B, a check box 1301 enabling the user to select the content he or she wants to delete is displayed. At this point, the indicator 1396 of the remote controller 1395 is placed over a specific channel 1380. Thus, although FIG. 34b shows an example of selecting only one channel, multiple channels and multiple items may also be simultaneously deleted from the list.

Figure 34C:
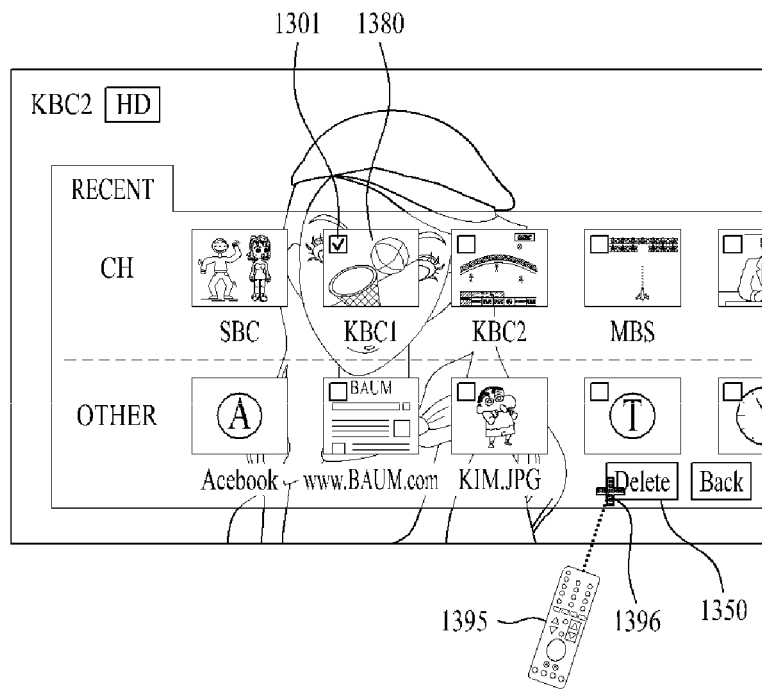

As shown in FIG. 34C, a graphic indicating a V shape is added to the check box 1301 of the specific channel 1380. This graphic performs the role of notifying the user whether or not the corresponding check box has been checked, and this graphic may be designed to have different shapes and colors. Furthermore, as shown in FIG. 34C, when pressing the OK button, after placing the indicator 1396 of the remote controller 1395 over the Delete button 1350, the graphic data of FIG. 34C are changed to graphic data shown in FIG. 34D.

Figure 34D:
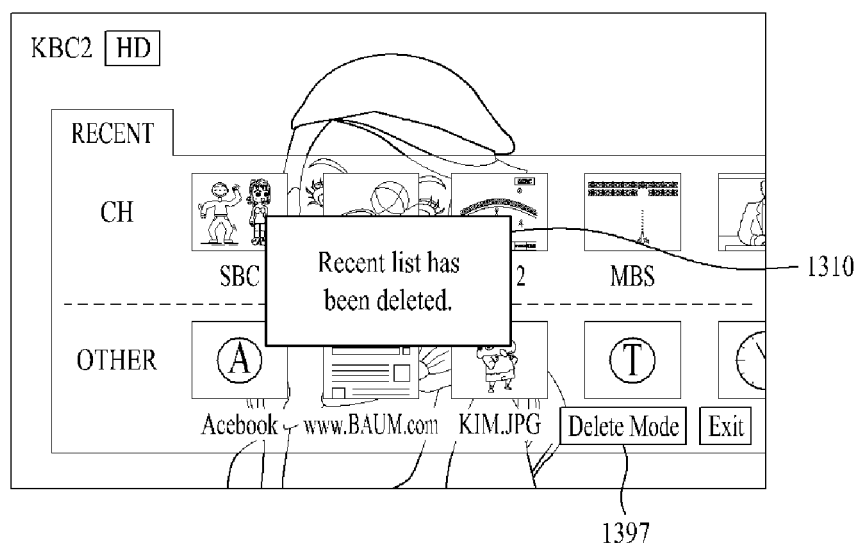

More specifically, as shown in FIG. 34D, a message 1310 notifying the user that the selected channel has been deleted from the Recent list is displayed on the display screen of the display apparatus. Furthermore, the display apparatus can delete the corresponding specific channel from the list stored in the memory, and also so that the positions of the remaining channels can be shifted leftwards within the Channel list as shown in FIG. 34D.

Additionally, as shown in FIG. 34D, the Delete button is changed back to the area 1397 enabling the user to select the Delete Mode. Accordingly, the present invention is advantageous because the user can quickly return to the process of selecting a channel her or she wants to delete.

A brief description of FIG. 34 will now be given as follows. The display apparatus according to an embodiment of the present invention displays a first list (e.g., Channel list shown in FIG. 34A), a second list (e.g., Other list shown in FIG. 34A), and an indicator for the Delete Mode (reference number 1397 shown in FIG. 34A).

When the indicator (reference number 1397 shown in FIG. 34A) is selected, first graphic data displaying items or channels listed in the list are changed to second graphic data. More specifically, when comparing FIG. 34A with FIG. 34B, the first graphic data correspond to thumbnail image data that do not include a check box (shown in FIG. 34A). Conversely, the second graphic data correspond to thumbnail image data that include a check box (shown in FIG. 34B).

Furthermore, when a specific item or a specific channel is selected by referring to the second graphic data (reference numbers 1301 and 1380 of FIG. 34B), the selected specific item or the selected specific channel is deleted from the memory, and the display of the deleted channel or item within the corresponding list is stopped (as shown in FIG. 34D).

Figure 35A:
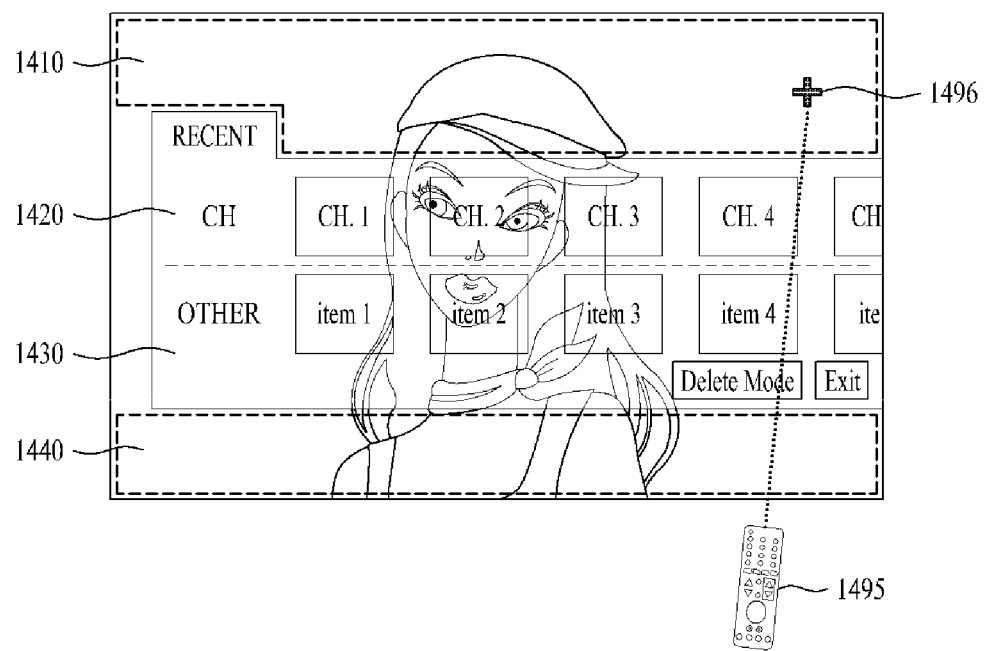
FIGS. 35A and 35B include display screens illustrating a fifth process of executing the Recent function respective to multiple groups according to an embodiment of the present invention.
Figure 35B:

Next, FIGS. 35A and 35b illustrate a fifth process of executing the Recent function respective to multiple groups according to an embodiment of the present invention. If the Recent function according to an embodiment of the present invention is executed, the graphic data shown in FIG. 35A are output. At this point, the display screen shown in FIG. 35A is divided into a total of 4 areas.

A first area 1410 and a fourth area 1440 correspond to areas that output video data of a broadcast program. However, the first area 1410 and the fourth area 1440 do not include graphic data associated with the Recent function. Conversely, a second area 1420 and a third area 1430 correspond to areas that include both video data of the broadcast program and graphic data indicating the respective list. However, in the second area 1420 and the third area 1430, the graphic data are displayed to be overlaying with the video data of the broadcast program.

At this point, when the indicator 1496 of the remote controller 1495 is placed over the first area 1410 or the fourth area 1440 for a predetermined period of time, or when the indicator 1496 of the remote controller 1495 is placed over the first area 1410 or the fourth area 1440, and when a specific button (e.g., OK button) is selected afterwards, the display screen is changed from FIG. 35A to FIG. 35B.

More specifically, as shown in FIG. 35B, the display apparatus 1400 according to an embodiment of the present invention stops the display of the lists that were previously displayed in the second area 1420 and the third area 1430, and also output only the video data of the broadcast program in the entire area of the display screen.

Figure 36A:
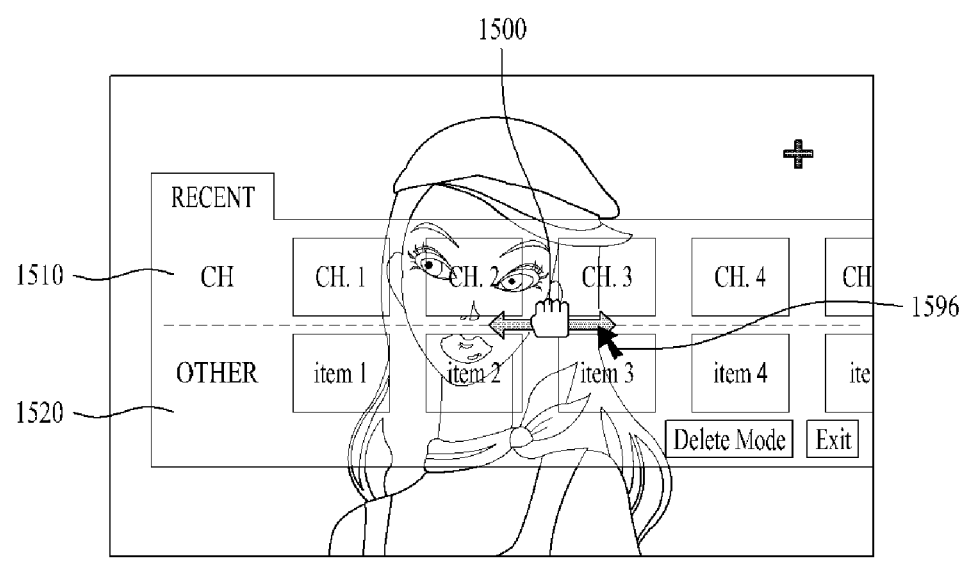
FIGS. 36A and 36B include display screens illustrating a sixth process of executing the Recent function respective to multiple groups according to an embodiment of the present invention.
Figure 36B:
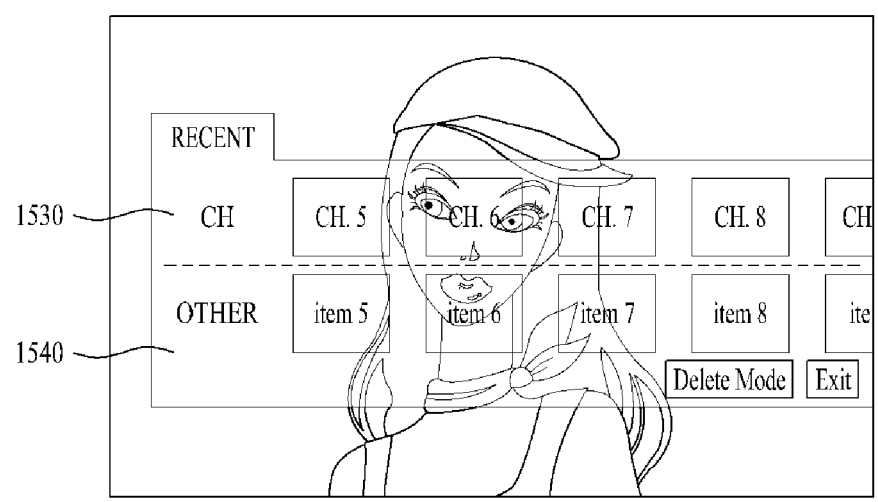

FIGS. 36A and 36B illustrate a sixth process of executing the Recent function respective to multiple groups according to an embodiment of the present invention. Meanwhile, as described above, although the terms "first process" to "sixth process" are used, these are merely exemplary terms used to facilitate the description of the present invention. Therefore, the present invention is not limited to the above-described order of each process.

As shown in FIG. 36A, a list of recently tuned channels is displayed in the first area 1510, and a list of recently executed items is displayed in the second area 1520. However, both of the areas 1510 and 1520 occupy only a limited space within the display screen. Therefore, it is difficult to simultaneously display all of the contents included in the list stored in the memory of the display apparatus.

Accordingly, in order to overcome such disadvantage, when the contents included in the list stored in the memory cannot be displayed in a single display screen at the same time (e.g., when the number of channels or items listed in the list exceeds 5), graphic data 1500 enabling the user to turn to a next page are output as shown in FIG. 36A.

At this point, the indicator 1596 of the remote controller 1595 is placed over the graphic data 1500, thereby enabling the user to turn the page leftwards or rightwards. For example, when the indicator 1596 selects a Right arrow (i.e., an arrow pointing the right side) of the graphic data 1500, the display screen is changed from FIG. 36A to FIG. 36B.

Referring to FIG. 36A, channel 1 (CH. 1), channel 2 (CH. 2), channel 3 (CH. 3), channel 4 (CH. 4), and channel 5 (CH. 5) were listed in the first area 1510, and item 1, item 2, item 3, item 4, and item 5 were listed in the second area 1520. However, in FIG. 36B, channel 6 (CH. 6), channel 7 (CH. 7), channel 8 (CH. 8), channel 9 (CH. 9), and channel 10 (CH. 10) are listed in the first area 1530, and item 6, item 7, item 8, item 9, and item 10 are listed in the second area 1540. Therefore, the display apparatus in FIGS. 36A and 36B allows the user to verify the contents listed in the above-described list in group units or page units.

Figure 37:
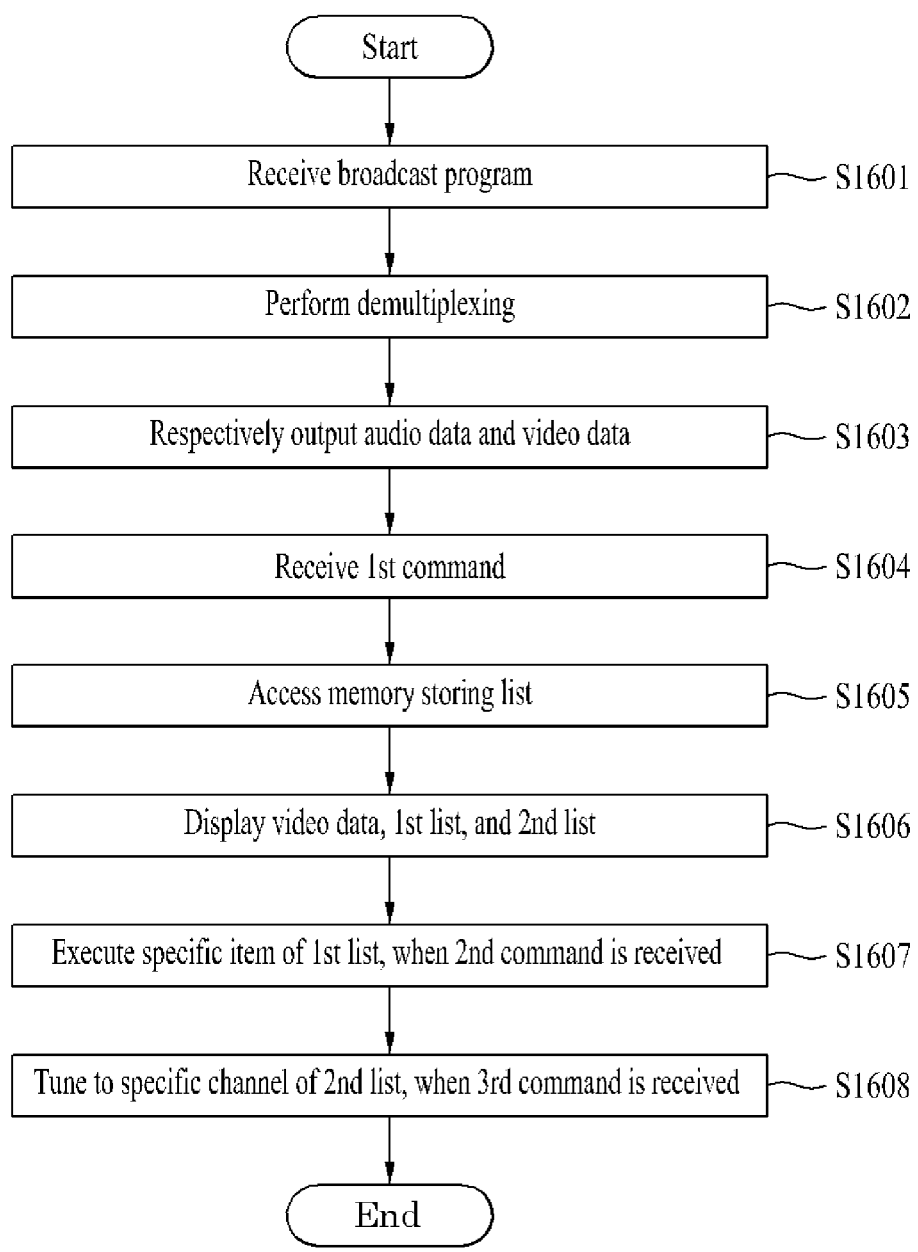
FIG. 37 is a flow chart illustrating a method of controlling a display apparatus executing the Recent function respective to multiple groups according to an embodiment of the present invention.

Next, FIG. 37 is a flow chart illustrating a method of controlling a display apparatus executing the Recent function respective to multiple groups according to an embodiment of the present invention. As shown, the display apparatus according to an embodiment of the present invention receives a broadcast program from a broadcasting station (S1601). Here, for example, the broadcast program includes audio data and video data. Thereafter, the display apparatus demultiplexes the received audio data and video data (S1602).

The display apparatus outputs each of the demultiplexed audio data and video data (S1603). Then, the display apparatus receives a first command through the user interface (S1604). Here, the user interface can communicating with the remote controller as described above.

The display apparatus accesses the memory, which stores a first list listing at least one or more items that were previously used and a second list listing at least one or more channels that were previously tuned (S1605). Subsequently, the display apparatus displays the demultiplexed video data and the first list and the second list both stored in the memory (S1606). Reference may be made to FIG. 30 for more details on this process.

When a second command is received, the display apparatus executes a specific item, among the at least one or more items listed in the first list (S1607). Reference may be made to FIG. 32 for more details on this process. When a third command is received, the display apparatus tunes to a specific channel, among the at least one or more channels listed in the second list (S1608). Reference may be made to FIG. 31 for more details on this process.

According to another embodiment of the present invention, step S1605 may further include storing a first address of the memory starting from an item having a history of being recently executed based upon a current time, storing a second address of the memory starting from a channel having a history of being recently tuned based upon the current time, and accessing each of the first address and the second address of the memory. Reference may be made to FIG. 28 and FIG. 29 for more details on this process.

According to yet another embodiment of the present invention, step S1606 may further include displaying the demultiplexed video data in a first area and displaying the first list and the second list in a second area, ceasing to display the first list and the second list, when the display apparatus receives a fourth command for selecting the first area instead of the second area, controlling the display apparatus so that the video data can be output in the first area. Reference may be made to FIGS. 35A and 35B for more details on this process.

According to yet another embodiment of the present invention, step S1606 may further include displaying a guidance indicator, when a number of items listed in the first list or a number of channels listed in the second list is equal to or more than a predetermined threshold value, and displaying a third list including items or channels that are not displayed on the current display screen. Reference may be made to FIGS. 36A and 36B for more details on this process.

According to yet another embodiment of the present invention, step S1606 may further include displaying an indicator for the first list, the second list, and a Delete mode, changing first graphic data indicating items or channels listed in each of the lists to second graphic data, when the indicator is selected, selecting a specific item or a specific channel by referring to the second graphic data, and deleting the selected specific item or the selected specific channel from the memory and ceasing to display the specific item or channel within the corresponding list. Reference may be made to FIGS. 34A and 34B for more details on this process.

The above description of the present invention describes the display apparatus as a TV, for example. However, the present invention can also be applied to network devices (e.g., STB) that do not include a display module. With the exception for the absence of the display module, the description of the present invention applied to a network device is identical to the description of the present invention being applied to a display apparatus.

More specifically, the network device according to an embodiment of the present invention includes a network interface configured to receive contents being transmitted through a network (here, the contents include audio data and video data), a demultiplexer configured to demultiplex the received audio data and video data, a memory configured to store data listing at least one or more contents, a user interface configured to receive a command associated with the data stored in the memory, an ODS generator configured to generate graphic data listing the at least one or more contents by using the data stored in the memory, and a mixer configured to mix the video data of a content and the graphic data generated by the OSD generator.

Furthermore, according to another embodiment of the present invention, the network device further includes a transmission module configured to transmit the mixed video data and graphic data to an external display device. In addition, the transmission module may be replaced with the above-described network interface.

Also, the graphic data that list the at least one or more contents include a first area configured to display an order of recently accessed channels, and a second area configured to display an order of recently accessed items. Alternatively, the graphic data that list the at least one or more contents includes an area that displays an order of recently accessed contents, wherein the contents include both channels and items.

Meanwhile, although an example of categorizing a Channel list and an Other Items list and executing a Recent function is described herein, an embodiment of the present invention is not limited only to the example given herein. For example, only the Channel list may be output, or only the Other Items list may be output, or all contents (channels and items) of a single list may be displayed by the accessed order.

Furthermore, an embodiment of the present invention is not limited only to the recently accessed order. For example, the listed order of the contents within a respective list may be adjusted based upon SNS-associated additional information (e.g., number of recommendations). Also, an embodiment of the present invention includes assigning priority levels to the most frequently used contents during a specific time period, so as to adjust the displayed order of the contents based upon the assigned priority levels.

In addition, according to an embodiment of the present invention, the above-described various embodiments of the present invention may be fixed to a default value, or the details and order of the list may be arbitrarily changed in accordance with the user's preference.

Finally, the term "network" used in the description of the present invention corresponds, for example, to a broadcast network or an IP network. Therefore, the above-described interface module can receive at least one of data being transmitted through a broadcast network and data being transmitted through an IP network.

Furthermore, although the drawings have been distinguished and divided in order to facilitate the description of the present invention, the present invention may be designed to form a new embodiment by combining some of the above-described embodiments of the present invention. Moreover, whenever required by anyone skilled in the art, an embodiment of the present invention includes designing a recording medium readable by a computer, the computer having a program for executing the above-described embodiments of the present invention recorded therein.

As described above, the display apparatus for processing multiple applications and the method for controlling the same have the following advantages. According to an embodiment of the present invention, the display apparatus for processing multiple applications and the method for controlling the same provide a solution enabling applications stored in the memory of the display apparatus to be quickly managed and easily edited. For example, system applications, premium applications, and downloaded applications may be edited in group units.

Also, according to another embodiment of the present invention, the display apparatus for processing multiple applications and the method for controlling the same provide a user interface that varies depending upon the application type.

Additionally, according to yet another embodiment of the present invention, the display apparatus for processing multiple applications and the method for controlling the same may include a plurality of application editing guide on screen displays (OSDs) respective to diverse remote controller types. In addition, for example, the remote controller corresponds to a device configured to process RF signals, a device configured to process IR signals, or a device configured to process both RF signals and IR signals.

Moreover, according an embodiment of the present invention, the display apparatus for processing multiple applications and the method for controlling the same provide a solution enabling a usage history of contents (e.g., channels, items, etc.) receiving through at least one or more paths to be easily managed.

Meanwhile, according to another embodiment of the present invention, the display apparatus for processing multiple applications and the method for controlling the same provide a technique for storing a plurality of content groups, each corresponding to a different content group type, by using two memory addresses for each content group.

Finally, according to yet another embodiment of the present invention, the display apparatus for processing multiple applications and the method for controlling the same may include a user interface capable of more quickly accessing a content group recently used by the user.

Meanwhile, the method of operating the display apparatus according to the present invention may be realized as a code that can be read by a processor provided in the image display device in a recording medium that can be read by a processor. The recording medium that can be read by the processor includes all types of recording devices storing data that can be read by the processor. Examples of the recording media that can be read by a processor may include ROMs, RAMs, CD-ROMs, magnetic tapes, floppy disks, optical data storing devices, and so on. Also, an exemplary recording medium being realized in the form of a carrier wave, such as a transmission via Internet, may also be included. Also, the recording medium that can be read by a processor may be scattered within a computer system, which is connected through a network. Also, a code that can be read by the processor may be stored and executed by using a dispersion (or scattering) method.

It will be apparent to those skilled in the art that various modifications and variations can be made in the present invention without departing from the spirit or scope of the inventions. Thus, it is intended that the present invention covers the modifications and variations of this invention provided they come within an embodiment of the appended claims and their equivalents. It is also apparent that such variations of the present invention are not to be understood individually or separately from the technical scope or spirit of the present invention.

What is claimed is:

1. A television having an Internet browsing function, the television comprising:
   a network interface configured to access the Internet;
   a display module;
   a memory;
   a user interface configured to receive command signals from a remote controller; and
   a controller configured to:
   access a first webpage through a web-browser,
   store, in the memory, a first URL of the first webpage and a first accessed screen of the first webpage accessed by the television,
   access a second webpage through the web-browser,
   store, in the memory, a second URL of the second webpage and a second accessed screen of the second webpage accessed by the television,
   display a broadcast program in a first area, wherein the broadcast program is received via the network interface, an external device interface or a tuner,
   while displaying the broadcast program in the first area, display a thumbnail list in a second area, wherein the thumbnail list includes a first thumbnail generated from the first accessed screen and a second thumbnail generated from the second accessed screen, wherein the second area is within a portion of the first area in which the broadcast program is displayed, and the second area overlaps with the first area, and
   display, the first webpage in the web-browser, based on the first URL stored in the memory in response to a command signal for selecting the first thumbnail,
   wherein the second thumbnail corresponds to the second webpage most recently accessed by the television and the first thumbnail corresponds to the first webpage accessed right before the second webpage.

2. The television of claim 1, wherein the first accessed screen of the first webpage is last screen of the first webpage accessed by the television and the second accessed screen of the second webpage is last screen of the second webpage accessed by the television.

3. The television of claim 1, wherein the controller is further configured to control the display module to display the second webpage based on the second URL stored in the memory in response to a command signal for selecting the second thumbnail.

4. The television of claim 1, wherein the first thumbnail and the second thumbnail are arranged according to an order most recently accessed by the television.

5. The television of claim 1, wherein the first thumbnail of the first webpage includes an image of the first webpage at a point of time in which a user accessed the first webpage.

6. The television of claim 1, wherein the controller is further configured to display first information related to the first webpage with the first thumbnail.

7. The television of claim 1, wherein the controller is further configured to discriminate the first thumbnail in response to the command signal for selecting the first thumbnail of the first webpage.

8. The television of claim 1, wherein the controller is further configured to:
   in response to a remove request from the remote controller, remove the first thumbnail from the second area.

9. The television of claim 1, wherein the controller is further configured to:
   display an icon on the display module, and
   in response to a command signal for selecting the icon, display a thumbnail list of recently executed applications on the second area of the display module.

10. The television of claim 1, wherein the second area is located at a lower portion of the display module.

11. The television of claim 1, wherein thumbnail list displayed in the second area is overlaid with the broadcast program displayed in the first area.

12. The television of claim 1, wherein the television corresponds to a smart television, a network TV, an Internet TV, a web TV or an IPTV.

13. The television of claim 1, wherein the thumbnail list excludes broadcast channels.

14. A method of controlling a television having an Internet browsing function, the method comprising:
   accessing, via a network interface of the television, a first webpage through a web-browser;
   storing a first URL of the first webpage and a first accessed screen of the first webpage accessed by the television in a memory;
   accessing a second webpage through the web-browser,
   storing, a second URL of the second webpage and a second accessed screen of the second webpage accessed by the television in the memory,
   displaying, via a display module of the television, a broadcast program in a first area, wherein the broadcast program is received via the network interface, an external device interface or a tuner;

while displaying the broadcast program in the first area, displaying, via the display module, a thumbnail list in a second area, wherein the thumbnail list includes a first thumbnail generated from the first accessed screen and a second thumbnail generated from the second accessed screen, wherein the second area is within a portion of the first area in which the broadcast program is displayed, and the second area overlaps with the first area;

receiving, via a user interface of the television and from a remote controller, a command signal for selecting the first thumbnail; and in response to receiving the command signal, displaying, via the display module, the first webpage in the webbrowser, based on the first URL stored in the memory, wherein the second thumbnail corresponds to the second webpage most recently accessed by the television and the first thumbnail corresponds to the first webpage accessed right before the second webpage.

15. The method of claim 14, wherein the first accessed screen of the first webpage is last screen of the first webpage accessed by the television and the second accessed screen of the second webpage is last screen of the second webpage accessed by the television.

16. The method of claim 14, wherein the method further comprises:

displaying, via the display module, the second webpage based on the second URL stored in the memory in response to a command signal for selecting the second thumbnail.

17. The method of claim 14, wherein the first thumbnail and the second thumbnail are arranged an order most recently accessed by the television.

18. The method of claim 14, wherein first information related to the first webpage is displayed with the first thumbnail.

19. The method of claim 14, wherein the first thumbnail of the first webpage includes an image of the first webpage at a point of time in which a user accessed the first webpage.

20. The television of claim 6, wherein the first information includes the first URL.

21. The method of claim 18, wherein the first information includes the first URL.

* * * * *